United States Patent
Gunji et al.

(10) Patent No.: US 8,758,178 B2
(45) Date of Patent: Jun. 24, 2014

(54) WHEEL HUB MOTOR

(75) Inventors: Daisuke Gunji, Fujisawa (JP); Yasuyuki Matsuda, Fujisawa (JP); Gen Kimura, Fujisawa (JP)

(73) Assignee: NSK Ltd., Tokyo (JP)

( * ) Notice: Subject to any disclaimer, the term of this patent is extended or adjusted under 35 U.S.C. 154(b) by 279 days.

(21) Appl. No.: 13/318,651

(22) PCT Filed: May 20, 2011

(86) PCT No.: PCT/JP2011/061660
§ 371 (c)(1),
(2), (4) Date: Nov. 3, 2011

(87) PCT Pub. No.: WO2011/145726
PCT Pub. Date: Nov. 24, 2011

(65) Prior Publication Data
US 2012/0190491 A1   Jul. 26, 2012

(30) Foreign Application Priority Data

May 21, 2010 (JP) ................. 2010-117657
Jul. 9, 2010 (JP) ................. 2010-156991
Jul. 9, 2010 (JP) ................. 2010-157024
Sep. 3, 2010 (JP) ................. 2010-198107

(51) Int. Cl.
*F16H 3/72* (2006.01)
*F16H 37/06* (2006.01)
*B60K 1/00* (2006.01)

(52) U.S. Cl.
USPC .................. 475/5; 475/4; 475/10; 180/65.51; 180/65.6; 180/65.7

(58) Field of Classification Search
USPC ................... 475/1–10; 180/65.51, 65.6, 65.7
See application file for complete search history.

(56) References Cited

U.S. PATENT DOCUMENTS

| 1,870,076 | A  | * | 8/1932  | Thomson ....................... 318/13 |
| 5,067,932 | A  |   | 11/1991 | Edwards |
| 7,326,141 | B2 | * | 2/2008  | Lyons et al. .................... 475/28 |
| 8,308,593 | B2 | * | 11/2012 | Kumazaki et al. ................ 475/5 |
| 8,424,625 | B2 | * | 4/2013  | Ishii ........................... 180/65.31 |
| 2002/0117916 | A1 |  | 8/2002 | Terada |
| 2012/0196713 | A1 | * | 8/2012 | He et al. ........................... 475/5 |

FOREIGN PATENT DOCUMENTS

| JP | 06-505938   |   | 7/1994  |
| JP | 2002079838  | A | 3/2002  |
| JP | 2002252955  | A | 9/2002  |
| JP | 2003042191  | A | 2/2003  |
| JP | 2005-081932 | A | 3/2005  |
| JP | 2006015785  | A | 1/2006  |
| JP | 2009262872  | A | 11/2009 |

OTHER PUBLICATIONS

International Search Report PCT/JP2011/061660; Aug. 2, 2011.

* cited by examiner

*Primary Examiner* — Tisha Lewis
(74) *Attorney, Agent, or Firm* — Sughrue Mion, PLLC

(57) ABSTRACT

An electric vehicle driving device 10 includes a first motor 11, a second motor 12, a first planetary gear mechanism 20, a second planetary gear mechanism 30, a clutch device 40, and a wheel bearing 50. The first planetary gear mechanism 20 is a planetary gear device of single pinion type. The second planetary gear mechanism 30 is a planetary gear device of double pinion type. The first motor 11 is connected to a first sun gear 21 and a second sun gear 31. The second motor 12 is connected to a first ring gear 24. The clutch device 40 is connected to a first carrier 23. A second carrier 33 is connected to the first ring gear 24. A second ring gear 34 is connected to the wheel bearing 50.

22 Claims, 47 Drawing Sheets

A-A VIEW

B-B VIEW

C-C
VIEW

D-D
VIEW

WHEEL HUB MOTOR

CROSS-REFERENCE TO RELATED APPLICATION

This application is a National Stage of PCT international application Ser. No. PCT/JP2011/061660 filed on May 20, 2011 which designates the United States, incorporated herein by reference, and which is based upon and claims the benefit of priority from Japanese Patent Application No. 2010-117657, filed on May 21, 2010, Japanese Patent Application No. 2010-156991, filed on Jul. 9, 2010, Japanese Patent Application No. 2010-157024, filed on Jul. 9, 2010, and Japanese Patent Application No. 2010-198107, filed on Sep. 3, 2010, the entire contents of which are incorporated herein by reference.

TECHNICAL FIELD

The present invention relates to a wheel hub motor for driving an electric vehicle.

BACKGROUND ART

Among electric vehicle driving devices, especially a device directly driving a wheel is called a wheel hub motor. The wheel hub motor mentioned herein is a driving device provided near a wheel of an electric vehicle. The wheel hub motor does not have to be accommodated inside the wheel. The wheel hub motor needs to be disposed inside or near the wheel. However, the inside of the wheel or the vicinity of the wheel has a comparatively narrow space. Therefore, the wheel hub motor needs to be decreased in size.

The wheel hub motor may be categorized into a type with a speed reduction mechanism and a direct drive type without a speed reduction mechanism. The wheel hub motor with the speed reduction mechanism may easily ensure a sufficient rotational force for driving the electric vehicle at the time of starting the electric vehicle or going an uphill (ascending a slope). However, since the wheel hub motor of the type with the speed reduction mechanism transmits the rotational force to the wheel through the speed reduction mechanism, friction loss occurs in the speed reduction mechanism. In the wheel hub motor of the type with the speed reduction mechanism, a rotation speed of an output shaft of a motor is normally faster than that of the wheel. Therefore, in the wheel hub motor of the type with the speed reduction mechanism, energy loss increases due to friction loss at the speed reduction mechanism especially when the electric vehicle runs rapidly.

On the other hand, since the direct drive type wheel hub motor transmits the rotational force to the wheel without using the speed reduction mechanism, energy loss may be reduced. However, the direct drive type wheel hub motor cannot amplify the rotational force using the speed reduction mechanism. Accordingly, it is difficult for the direct drive type wheel hub motor to ensure a sufficient rotational force for driving the electric vehicle at the time of starting the electric vehicle or going an uphill. As a technique for ensuring the sufficient rotational force for driving the electric vehicle, for example, Patent Literature 1 discloses a technique which is not concerned with the wheel hub motor, but includes a speed reduction mechanism with a planetary gear mechanism, and two motors.

CITATION LIST

Patent Literature

Patent Literature 1: Japanese Patent Application Laid-Open No. 2005-081932

SUMMARY OF INVENTION

Technical Problem

The technique disclosed in Patent Literature 1 includes a power circulation path. In the technique disclosed in Patent Literature 1, a rotational force is first converted into electric power inside the power circulation path and the electric power is converted again into the rotational force. Therefore, in the technique disclosed in Patent Literature 1, the power circulation path needs to include an electric generator and a motor. However, as described above, in the wheel hub motor, there has been a demand for a decrease in size of the electric vehicle driving device, and therefore it is difficult to ensure a space for installing the electric generator and the motor near the wheel. Further, the technique disclosed in Patent Literature 1 converts power into electric power, and then converts electric power back into power. Therefore, in the technique disclosed in Patent Literature 1, energy loss occurs at the time of converting energy.

The invention is contrived in consideration of the above-described circumstance, and it is an object of the invention to provide a wheel hub motor capable of ensuring a sufficient rotational force for driving an electric vehicle and reducing energy loss.

Solution to Problem

According to an aspect of the present invention, a wheel hub motor includes: a first motor; a second motor; a first sun gear connected to the first motor; a first pinion gear that meshes with the first sun gear; a first carrier that, rotatably and revolvably about the first sun gear, holds the first pinion gear; a clutch device capable of regulating a rotation of the first carrier; a first ring gear that meshes with the first pinion gear, the first ring gear being connected to the second motor; a second sun gear connected to the first motor; a second pinion gear that meshes with the second sun gear; a third pinion gear that meshes with the second pinion gear; a second carrier that, individually rotatably and revolvably about the second sun gear, holds the second pinion gear and the third pinion gear, the second carrier being connected to the first ring gear; and a second ring gear that meshes with the third pinion gear, the second ring gear being connected to a wheel of an electric vehicle.

Further, according to an aspect of the present invention, a wheel hub motor includes: a first motor; a second motor; a first sun gear connected to the first motor; a first pinion gear that meshes with the first sun gear; a first carrier that, rotatably and revolvably about the first sun gear, holds the first pinion gear; a first ring gear that meshes with the first pinion gear, the first ring gear being connected to a wheel of an electric vehicle; a second sun gear connected to the first motor; a second pinion gear that meshes with the second sun gear; a third pinion gear that meshes with the second pinion gear; a second carrier that, individually rotatably and revolvably about the second sun gear, holds the second pinion gear and the third pinion gear; a clutch device capable of regulating a rotation of the second carrier; and a second ring gear that meshes with the third pinion gear, the second ring gear being connected to the first carrier, the second ring gear being connected to the second motor.

According to another aspect of the present invention, the first motor and the second motor are assembled in a casing, and the casing includes a first casing having a first motor insertion portion for positioning the first motor and a second motor insertion portion for positioning the second motor, and includes a second casing and a third casing attached to the first casing, the first motor insertion portion and the second motor insertion portion being separated from each other. A stator core of the first motor is inserted into the first motor insertion portion so as to be positioned, and is held in a pressed state by the second casing, and a stator core of the second motor is inserted into the second motor insertion portion so as to be positioned, and is held in a pressed state by the third casing.

According to another aspect of the present invention, the wheel hub motor further includes: an outer race fixed to a casing where the first motor and the second motor are assembled, and including a first orbit and a second orbit formed in a circumferential direction in an inner peripheral surface; a plurality of first rolling elements that roll on the first orbit; a plurality of second rolling elements that roll on the second orbit; a first retainer that supports the first rolling elements; a second retainer that supports the second rolling elements; a first inner race that includes a third orbit formed in a circumferential direction in an outer peripheral surface of the first inner race and an inner gear formed in an inner peripheral surface of the first inner race, the first rolling elements rolling on the third orbit; a wheel support portion formed at an end of the first inner race, and provided with a plurality of attachment points for attaching the wheel; and a second inner race that includes a forth orbit formed in a circumferential direction in an outer peripheral surface of the second inner race, an inner peripheral surface of the second inner race contacting the outer peripheral surface of the first inner race, the second rolling elements rolling on the forth orbit.

According to another aspect of the present invention, the clutch device includes: a first member, a second member rotatable relative to the first member, and a plurality of sprags that transmit a rotational force between the first member and the second member when a rotational force in a first direction acts on the second member and do not transmit a rotational force between the first member and the second member when a rotational force in a second direction opposite to the first direction acts on the second member, the clutch device being capable of regulating the rotation of the first carrier. The first direction is a direction in which the second member rotates when the first motor outputs a rotational force so as to advance the electric vehicle and the second motor does not operate.

According to another aspect of the present invention, the clutch device includes: a first member, a second member rotatable relative to the first member, and a plurality of sprags that transmit a rotational force between the first member and the second member when a rotational force in a first direction acts on the second member and do not transmit a rotational force between the first member and the second member when a rotational force in a second direction opposite to the first direction acts on the second member, the clutch device being capable of regulating the rotation of the second carrier. The first direction is a direction in which the second member rotates when the first motor outputs a rotational force so as to advance the electric vehicle and the second motor does not operate.

According to another aspect of the present invention, each of the first motor and the second motor includes: a rotor core, a motor stator disposed outside the rotor core in a radial direction, a rotor disk disposed inside the rotor core in the radial direction so as to support the rotor, and a resolver having a resolver rotor fixed to the rotor disk and a resolver stator disposed facing the resolver rotor. The rotor core is a magnetic body, and the rotor disk is a non-magnetic body.

According to another aspect of the present invention, the wheel hub motor further includes: a first bearing inner race of a cylinder shape; a second bearing inner race disposed inside the first bearing inner race in a radial direction, and rotating integral with the second ring gear and coaxially with the second ring gear; a bearing outer race that surrounds an outside in the radial direction of the first bearing inner race and the second bearing inner race; a plurality of rolling elements disposed between the first bearing inner race and the bearing outer race, and between the second bearing inner race and the bearing outer race; a seal portion disposed facing a brake disk of the electric vehicle so as to close a gap between the second bearing inner race and the bearing outer race; and a first shield portion disposed between the seal portion and the brake disk so as to cover the seal portion and an end portion of the bearing outer race in a side of the brake disk.

According to another aspect of the present invention, the wheel hub motor further includes: a first bearing inner race of a cylinder shape; a second bearing inner race disposed inside the first bearing inner race in the radial direction, and rotating integrally with the first ring gear and coaxially with the first ring gear; a bearing outer race that surrounds an outside in the radial direction of the first bearing inner race and the second bearing inner race; a plurality of rolling elements disposed between the first bearing inner race and the bearing outer race, and between the second bearing inner race and the bearing outer race; a seal portion disposed facing a brake disk of the electric vehicle so as to close a gap between the second bearing inner race and the bearing outer race; and a first shield portion disposed between the seal portion and the brake disk so as to cover the seal portion and an end of the bearing outer race in a side of the brake disk.

According to another aspect of the present invention, a plurality of protrusions are provided in an outer periphery of the second ring gear at an equal interval in a circumferential direction, and the wheel hub motor further includes: an inner race that includes a cylindrical portion of a cylinder shape and a wheel attachment portion closing one opening of the cylindrical portion, concave portions extending in an axial direction and convex portions extending in the axial direction and an annular concave portion of an annular shape in the circumferential direction being formed in an inner periphery of the cylindrical portion, respectively, the concave portions being as many as the protrusions, the convex portions being as many as the protrusions, the annular concave portion being continuous to the concave portions, center angles of the concave portions being equal to each other when a circumferential length of each of the concave portions is set to an arc and an axis thereof is set to a center, center angles of the convex portions being equal to each other when a circumferential length of each of the convex portions is set to an arc and an axis thereof is set to a center, the center angles of the concave portions when the circumferential length of the concave portion is set to the arc and the axial is set to the center and the center angles of the convex portions when the circumferential length of the convex portion is set to the arc and the axial is set to the center are equal to each other, the circumferential length of the concave portion being larger than the circumferential length of the protrusion; and a key member formed in a curved plate shape corresponding to a bottom surface of the concave portion, and inserted into each of the concave portions so as to disable a rotation of the second ring gear relative to the inner race, after the protrusions are inserted up to a position of the annular concave portion into the concave portions and the second ring gear is rotated so that the protrusions are fitted to the annular concave portion.

According to another aspect of the present invention, a plurality of protrusions are provided in an outer periphery of the first ring gear at an equal interval in a circumferential direction, and the wheel hub motor further includes: an inner race that includes a cylindrical portion of a cylinder shape and a wheel attachment portion closing one opening of the cylindrical portion, concave portions extending in an axial direction and convex portions extending in the axial direction and an annular concave portion of an annular shape in the circumferential direction being formed in an inner periphery of the cylindrical portion, respectively, the concave portions being as many as the protrusions, the convex portions being as many as the protrusions, the annular concave portion being continuous to the concave portions, center angles of the concave portions being equal to each other when a circumferential length of each of the concave portions is set to an arc and an axis thereof is set to a center, center angles of the convex portions being equal to each other when a circumferential length of each of the convex portions is set to an arc and an axis thereof is set to a center, the center angles of the concave portions when the circumferential length of the concave portion is set to the arc and the axial is set to the center and the center angles of the convex portions when the circumferential length of the convex portion is set to the arc and the axial is set to the center are equal to each other, the circumferential length of the concave portion being larger than the circumferential length of the protrusion; and a key member formed in a curved plate shape corresponding to a bottom surface of the concave portion, and inserted into each of the concave portions so as to disable a rotation of the first ring gear relative to the inner race, after the protrusions are inserted up to a position of the annular concave portion into the concave portions and the first ring gear is rotated so that the protrusions are fitted to the annular concave portion.

According to another aspect of the present invention, the clutch device includes: a first member, a second member disposed facing an inner peripheral surface of the first member, rotatably relative to the first member, a transmission portion that transmits a rotational force between the first member and the second member when a rotational force in a first direction acts on the second member, and that does not transmit a rotational force between the first member and the second member when a rotational force in a second direction opposite to the first direction acts on the second member, a first bearing portion disposed at a side of the first motor of the transmission portion, and rotatably supporting the first member and the second member, and a second bearing portion disposed at a side opposite to the first bearing portion of the transmission portion, and rotatably supporting the first member and the second member, the clutch device being capable of regulating the rotation of the first carrier, and the first direction is a direction in which the second member rotates when the first motor outputs a rotational force so as to advance the electric vehicle and the second motor does not operate.

According to another aspect of the present invention, the clutch device includes: a first member, a second member disposed facing an inner peripheral surface of the first member, rotatably relative to the first member, a transmission portion that transmits a rotational force between the first member and the second member when a rotational force in a first direction acts on the second member, and that does not transmit a rotational force between the first member and the second member when a rotational force in a second direction opposite to the first direction acts on the second member, a first bearing portion disposed at a side of the first motor of the transmission portion, and rotatably supporting the first member and the second member, and a second bearing portion disposed at a side opposite to the first bearing portion of the transmission portion, and rotatably supporting the first member and the second member, the clutch device being capable of regulating the rotation of the second carrier, and the first direction is a direction in which the second member rotates when the first motor outputs a rotational force so as to advance the electric vehicle and the second motor does not operate.

According to another aspect of the present invention, the clutch device is capable of regulating the rotation of the first carrier, and the second carrier is integrally formed with the first ring gear, a rotor of the second motor being fixed to an outer peripheral surface of the second carrier.

According to another aspect of the present invention, the clutch device is capable of regulating the rotation of the second carrier, and the first carrier is integrally formed with the second ring gear, a rotor of the second motor being fixed to an outer peripheral surface of the first carrier.

Advantageous Effect of the Invention

The invention may provide the wheel hub motor capable of ensuring a sufficient rotational force for driving the electric vehicle and reducing energy loss.

DESCRIPTION OF EMBODIMENTS

Figure 1:
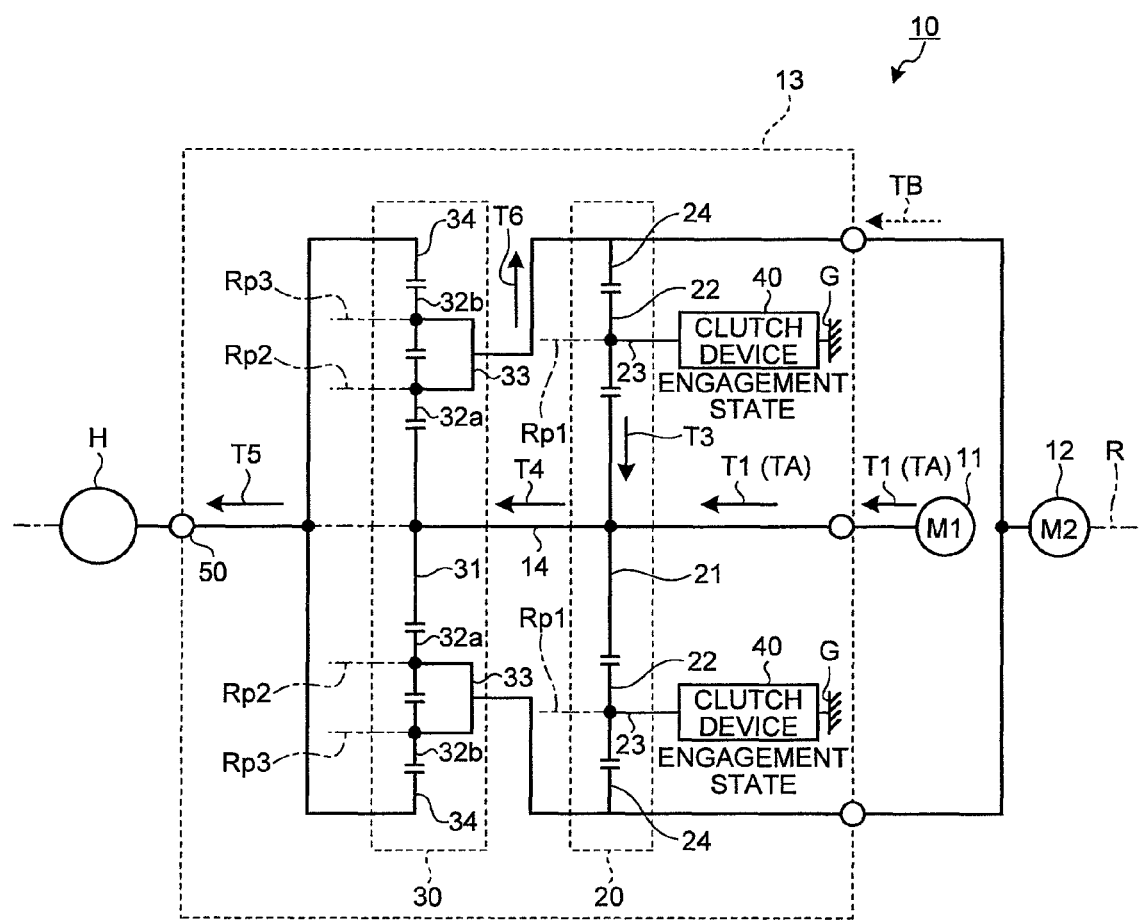
FIG. 1 is a diagram illustrating a configuration of an electric vehicle driving device of a first embodiment and a path for transmitting a rotational force when the electric vehicle driving device is in a first speed change state.

A mode for carrying out the invention (embodiment) will be specifically described by referring to the drawings. The invention is not limited to the description of the embodiments below. Further, the components described below include the component which may be easily supposed by the person skilled in the art and the substantially same component. Furthermore, the components to be described later may be appropriately combined with each other. Further, various omissions, substitutions, or modifications may be made within the scope without departing from the spirit of the invention.

First Embodiment

FIG. 1 is a diagram illustrating a configuration of an electric vehicle driving device of a first embodiment and a path for transmitting a rotational force when the electric vehicle driving device is in a first speed change state. As shown in FIG. 1, an electric vehicle driving device 10 serving as a wheel hub motor includes a casing G, a first motor 11, a second motor 12, a shift mechanism 13, and a wheel bearing 50. The casing G accommodates the first motor 11, the second motor 12, and the shift mechanism 13. The first motor 11 may output a first rotational force TA. The second motor 12 may output a second rotational force TB. The shift mechanism 13 is connected to the first motor 11. Accordingly, when the first motor 11 is operated, the first rotational force TA is transmitted (input) to the shift mechanism 13. The operation of the motor mentioned herein indicates that electric power is supplied to a motor so that an output shaft thereof rotates. Further, the shift mechanism 13 is connected to the second motor 12. Accordingly, when the second motor 12 is operated, the second rotational force TB is transmitted (input) to the shift mechanism 13. The shift mechanism 13 is connected to the wheel bearing 50, and transmits (outputs) a rotational force obtained by a speed change operation to the wheel bearing 50. A wheel H of an electric vehicle is attached to the wheel bearing 50.

The shift mechanism 13 includes a first planetary gear mechanism 20, a second planetary gear mechanism 30, and a clutch device 40. The first planetary gear mechanism 20 is a planetary gear mechanism of single pinion type. The first planetary gear mechanism 20 includes a first sun gear 21, a first pinion gear 22, a first carrier 23, and a first ring gear 24. The second planetary gear mechanism 30 is a planetary gear mechanism of double pinion type. The second planetary gear mechanism 30 includes a second sun gear 31, a second pinion gear 32a, a third pinion gear 32b, a second carrier 33, and a second ring gear 34.

The first sun gear 21 is supported inside the casing G so as to turn (rotate) about the rotary axis R. The first sun gear 21 is connected to the first motor 11. Therefore, when the first motor 11 is operated, the first rotational force TA is transmitted to the first sun gear 21. Accordingly, when the first motor 11 is operated, the first sun gear 21 rotates about the rotary axis R. The first pinion gear 22 meshes with the first sun gear 21. The first carrier 23 holds the first pinion gear 22 so that the first pinion gear 22 turns (rotates) about the first pinion rotary axis Rp1. The first pinion rotary axis Rp1 is parallel to, for example, the rotary axis R.

The first carrier 23 is supported inside the casing G so as to turn (rotate) about the rotary axis R. Accordingly, the first carrier 23 holds the first pinion gear 22 so that the first pinion gear 22 revolves about the first sun gear 21, that is, the rotary axis R. The first ring gear 24 may turn (rotate) about the rotary axis R. The first ring gear 24 meshes with the first pinion gear 22. Further, the first ring gear 24 is connected to the second motor 12. Therefore, when the second motor 12 is operated, the second rotational force TB is transmitted to the first ring gear 24. Accordingly, when the second motor 12 is operated, the first ring gear 24 turns (rotates) about the rotary axis R.

The clutch device 40 may regulate the rotation of the first carrier 23. Specifically, the clutch device 40 may switch to a case of regulating (braking) the rotation of the first carrier 23 about the rotary axis R and a case of permitting the rotation. Hereinafter, a case of causing the clutch device 40 to regulate (brake) the rotation is referred to as an engagement state, and a case of permitting the rotation is referred to as a disengagement state. The clutch device 40 will be specifically described later.

The second sun gear 31 is supported inside the casing G so as to turn (rotate) about the rotary axis R. The second sun gear 31 is connected to the first motor 11 through the first sun gear 21. Specifically, the first sun gear 21 and the second sun gear 31 are integrally formed with the sun gear shaft 14 so as to rotate along the same axis (the rotary axis R). Then, the sun gear shaft 14 is connected to the first motor 11. Accordingly, when the first motor 11 is operated, the second sun gear 31 rotates about the rotary axis R.

The second pinion gear 32a meshes with the second sun gear 31. The third pinion gear 32b meshes with the second pinion gear 32a. A second carrier 33 holds the second pinion gear 32a so that the second pinion gear 32a turns (rotates) about the second pinion rotary axis Rp2. Further, the second carrier 33 holds the third pinion gear 32b so that the third pinion gear 32b turns (rotates) about the third pinion rotary axis Rp3. The second pinion rotary axis Rp2 and the third pinion rotary axis Rp3 are parallel to, for example, the rotary axis R.

The second carrier 33 is supported inside the casing G so as to turn (rotate) about the rotary axis R. Accordingly, the second carrier 33 holds the second pinion gear 32a and the third pinion gear 32b so that the second pinion gear 32a and the third pinion gear 32b revolve about the second sun gear 31, that is, the rotary axis R. Further, the second carrier 33 is connected to the first ring gear 24. Accordingly, when the first ring gear 24 turns (rotates), the second carrier 33 turns (rotates) about the rotary axis R. The second ring gear 34 may turn (rotate) about the rotary axis R. The second ring gear 34 meshes with the third pinion gear 32b. Further, the second ring gear 34 is connected to the wheel bearing 50. Accordingly, when the second ring gear 34 turns (rotates), the wheel bearing 50 rotates. Next, a rotational force transmission mechanism in the electric vehicle driving device 10 will be described.

The electric vehicle driving device 10 may realize two speed change states, a first speed change state and a second speed change state. First, a case will be described in which the first speed change state used for starting the electric vehicle or going an uphill (ascending a slope), a so-called low gear state is realized by the electric vehicle driving device 10. In the first speed change state, the first motor 11 is operated. The rotational force output from the first motor 11 in the first speed change state is set to a first rotational force T1. Further, in the first speed change state, the second motor 12 is not operated, that is, rotates idly. Further, the clutch device 40 is in an engagement state. That is, in the first speed change state, the first pinion gear 22 may not revolve about the casing G. Respective rotational forces, a first rotational force T1, a circulation rotational force T3, a resultant rotational force T4, a first distributed rotational force T5, and a second distributed rotational force T6 shown in FIG. 1 indicate torques acting on respective components, and the unit thereof is Nm.

The first rotational force T1 output from the first motor 11 is input to the first sun gear 21. Then, the first rotational force T1 merges with the circulation rotational force T3 at the first sun gear 21. The circulation rotational force T3 is a rotational force transmitted from the first ring gear 24 to the first sun gear 21. The circulation rotational force T3 will be specifically described later. Accordingly, the resultant rotational force T4 obtained by synthesizing the first rotational force T1 and the circulation rotational force T3 is transmitted to the second sun gear 31. The resultant rotational force T4 is amplified by the second planetary gear mechanism 30. Further, the resultant rotational force T4 is distributed into the first distributed rotational force T5 and the second distributed rotational force T6 by the second planetary gear mechanism 30. The first distributed rotational force T5 is a rotational force distributed to the second ring gear 34. The second distributed rotational force T6 is a rotational force distributed to the second carrier 33.

The first distributed rotational force T5 is transmitted from the second ring gear 34 to the wheel bearing 50. Accordingly, the wheel H rotates, and the electric vehicle runs. The second distributed rotational force T6 is input to the first planetary gear mechanism 20. Specifically, the second distributed rotational force T6 is transmitted to the first ring gear 24. The second distributed rotational force T6 is reduced by the first planetary gear mechanism 20. Specifically, the second distributed rotational force T6 is reduced due to a speed change when being transmitted from the first ring gear 24 to the first sun gear 21 through the first pinion gear 22. Further, when the second distributed rotational force T6 is transmitted from the first ring gear 24 to the first sun gear 21 through the first pinion gear 22, the rotation direction (of the second distributed rotational force T6) is reversed. Accordingly, the second distributed rotational force T6 is transmitted to the first sun gear 21 as the circulation rotational force T3.

In this manner, the first rotational force T1 input from the first motor 11 to the first sun gear 21 is amplified, and a part of the amplified rotational force is output as the first distributed rotational force T5. Then, the other rotational force of the amplified rotational force is transmitted from the second carrier 33 to the first sun gear 21 as the circulation rotational force T3 through the first ring gear 24 and the first pinion gear 22. The circulation rotational force T3 transmitted to the first sun gear 21 merges with the first rotational force T1 so as to become the resultant rotational force T4 and is transmitted to the second sun gear 31.

As described above, in the electric vehicle driving device 10, a part of the rotational force circulates between the first planetary gear mechanism 20 and the second planetary gear mechanism 30. Accordingly, the electric vehicle driving device 10 may realize the larger speed change ratio. That is, the electric vehicle driving device 10 may transmit the larger rotational force to the wheel H in the first speed change state. Hereinafter, an example of values from the first rotational force T1 to the second distributed rotational force T6 will be described.

The number of teeth of the second sun gear 31 is denoted by Z1, the number of teeth of the second ring gear 34 is denoted by Z4, the number of teeth of the first sun gear 21 is denoted by Z5, and the number of teeth of the first ring gear 24 is denoted by Z7. Hereinafter, the ratio of the rotational force (the circulation rotational force T3, the resultant rotational force T4, the first distributed rotational force T5, and the second distributed rotational force T6 shown in FIG. 1) acting on the respective components of the electric vehicle driving device 10 with respect to the first rotational force T1 is expressed by equations. In the equation (1) to the equation (4) below, the rotational force opposite to the direction of the first rotational force T1 has a negative value.

Equation 1

$$T3 = \frac{-1}{\frac{Z1 \times Z7}{(Z1 - Z4) \times Z5} + 1} \times T1 \quad (1)$$

Equation 2

$$T4 = \frac{1}{1 + \frac{Z5}{Z7} \times \left(1 - \frac{Z4}{Z1}\right)} \times T1 \quad (2)$$

Equation 3

$$T5 = \frac{1}{\frac{Z1}{Z4} + \frac{Z5}{Z7} \times \left(\frac{Z1}{Z4} - 1\right)} \times T1 \quad (3)$$

Equation 4

$$T6 = \frac{1}{\frac{Z1}{Z1 - Z4} + \frac{Z5}{Z7}} \times T1 \quad (4)$$

As an example, the number of teeth Z1 is set to 31, the number of teeth Z4 is set to 71, the number of teeth Z5 is set to 37, and the number of teeth Z7 is set to 71. The first rotational force T1 is set to 75 Nm. Then, the circulation rotational force T3 becomes 154.0 Nm, the resultant rotational force T4 becomes 229.0 Nm, the first distributed rotational force T5 becomes 524.4 Nm, and the second distributed rotational force T6 becomes −295.4 Nm. In this manner, in the electric vehicle driving device 10, as an example, the first rotational force T1 output by the first motor 11 may be amplified by 6.99 times and be output to the wheel H. Next, the angular velocities of the respective components in the first speed change state will be described by using an collinear diagram.

Figure 2:
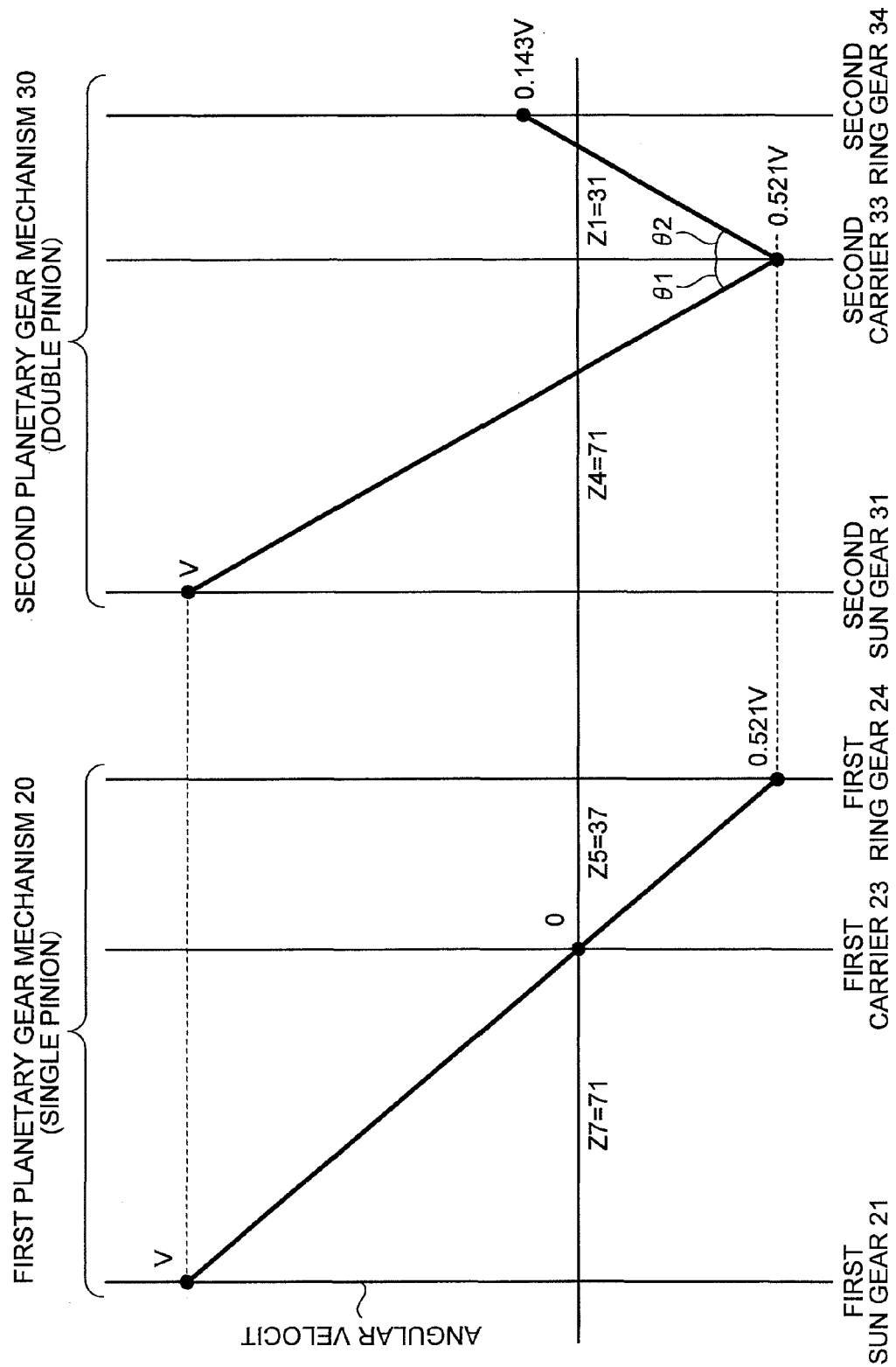
FIG. 2 is a collinear diagram illustrating rotation speeds of respective components when the electric vehicle driving device of the first embodiment is in the first speed change state.

FIG. 2 is a collinear diagram illustrating rotation speeds of respective components when the electric vehicle driving device of the first embodiment is in the first speed change state. Hereinafter, as an example, the angular velocity of the first sun gear 21 is set to V [rad/s]. The angular velocity with a negative value indicates that the rotation direction is opposite to that of the first rotational force TA. As shown in FIG. 2, the angular velocity of the first sun gear 21 is V [rad/s]. The rotation of the first carrier 23 is regulated by the clutch device 40. Therefore, the angular velocity of the first carrier 23 is 0 [rad/s]. The angular velocity of the first ring gear 24 is 0.521 V [rad/s]. The second sun gear 31 is connected to the first sun gear 21. Therefore, the angular velocity of the second sun gear 31 is V [rad/s]. The second carrier 33 is connected to the first ring gear 24. Therefore, the angular velocity of the second carrier 33 is 0.521 V [rad/s].

Since the second planetary gear mechanism 30 is a planetary gear mechanism of double pinion type including two pinion gears, the rotational force transmitted from the second sun gear 31 to the second ring gear 34 is reversed at the second carrier 33. When the rotational force is transmitted from the second carrier 33 to the second ring gear 34, the rotational force is transmitted while being reversed to the change rate obtained by multiplying the change rate when transmitting the rotational force from the second sun gear 31 to the second carrier 33 by −1. That is, in FIG. 2, θ1 is equal to θ2. Accordingly, the angular velocity of the second ring gear 34 becomes 0.143 V [rad/s]. Accordingly, the speed change ratio of the shift mechanism 13 becomes V/0.143V=6.99. Next, the second speed change state will be described.

Figure 3:
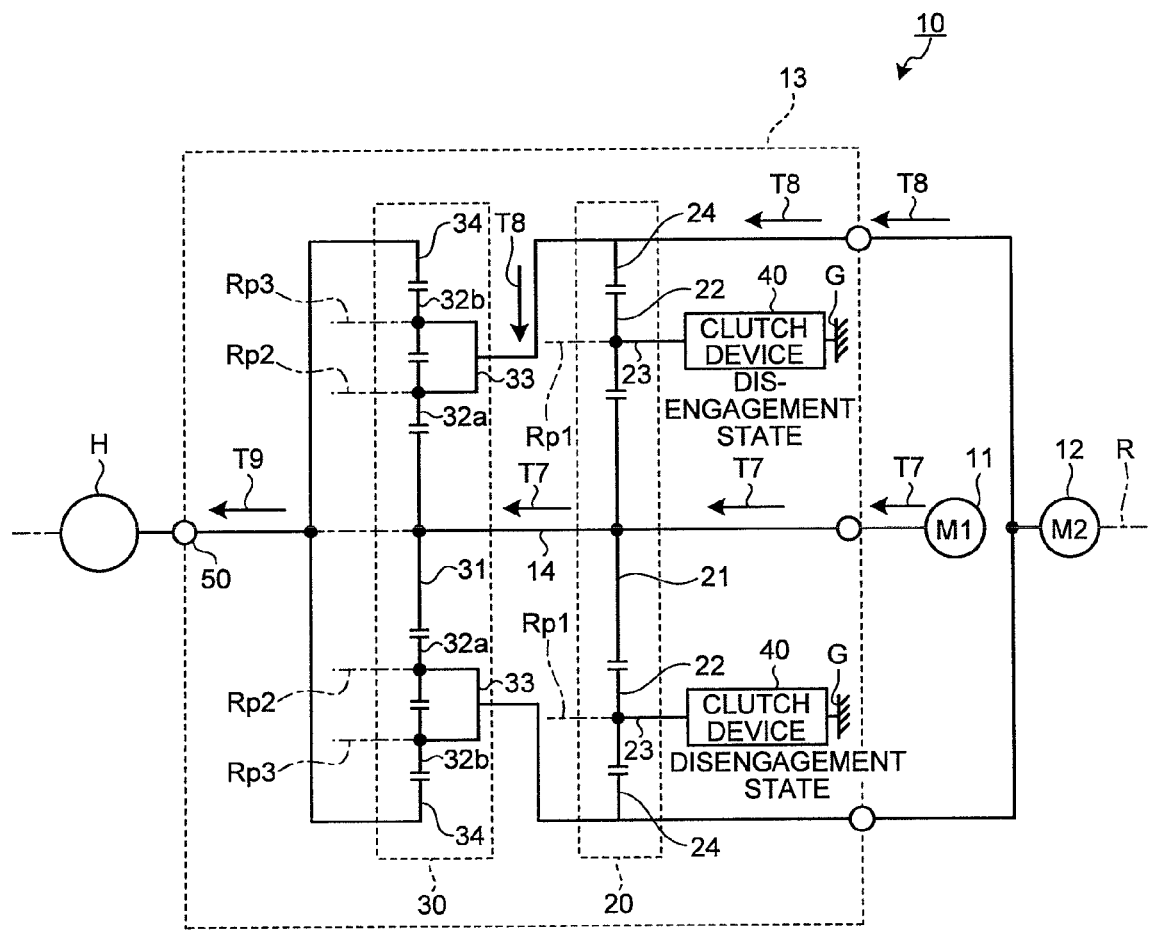
FIG. 3 is a diagram illustrating a path for transmitting a rotational force when the electric vehicle driving device of the first embodiment is in a second speed change state.

FIG. 3 is a diagram illustrating a path for transmitting a rotational force when the electric vehicle driving device of the first embodiment is in a second speed change state. In the second speed change state, the first motor 11 is operated. The rotational force output from the first motor 11 in the second speed change state is set to the first rotational force T7. Further, in the second speed change state, the second motor 12 is operated. The rotational force output from the second motor 12 in the second speed change state is set to the second rotational force T8. Further, the clutch device 40 is in a disengagement state. That is, in the second speed change state, the first pinion gear 22 may become a state rotatable relative to the casing G. Accordingly, in the second speed change state, the circulation of the rotational force between the first planetary gear mechanism 20 and the second planetary gear mechanism 30 is interrupted. Further, since the first carrier 23 may freely revolve (turn) in the second speed change state, the first sun gear 21 and the first ring gear 24 may relatively freely turn (rotate). The resultant rotational force T9 shown in FIG. 3 indicates a torque transmitted to the wheel bearing 50, and the unit thereof is Nm.

In the second speed change state, the ratio between the first rotational force T7 and the second rotational force T8 is determined by the ratio between the number of teeth Z1 of the second sun gear 31 and the number of teeth Z4 of the second ring gear 34. The first rotational force T7 merges with the second rotational force T8 at the second carrier 33. Accordingly, the resultant rotational force T9 is transmitted to the second ring gear 34. The first rotational force T7, the second rotational force T8, and the resultant rotational force T9 satisfies the following equation (5).

Equation 5

$$T9 = T7 + T8 = \frac{Z4}{Z1} \times T7 \quad (5)$$

Here, since the first sun gear 21 and the first ring gear 24 turn (rotate) in the opposite directions with respect to each other, the second sun gear 31 and the second carrier 33 also turn (rotate) in the opposite directions with respect to each other. When the angular velocity of the second sun gear 31 is made constant, the angular velocity of the second ring gear 34 becomes faster as the angular velocity of the second carrier 33 becomes faster. Further, the angular velocity of the second ring gear 34 becomes slower as the angular velocity of the second carrier 33 becomes slower. In this manner, the angular velocity of the second ring gear 34 continuously changes due to the angular velocity of the second sun gear 31 and the angular velocity of the second carrier 33. That is, the electric vehicle driving device 10 may continuously change the speed change ratio in a manner such that the angular velocity of the second rotational force T8 output from the second motor 12 continuously changes.

The electric vehicle driving device 10 includes a plurality of combinations of the angular velocity of the first rotational force T7 output from the first motor 11 and the angular velocity of the second rotational force T8 output from the second motor 12 when the angular velocity of the second ring gear 34 is made constant. That is, even when the angular velocity of the first rotational force T7 output from the first motor 11 changes due to a change in angular velocity of the second rotational force T8 output from the second motor 12, the angular velocity of the second ring gear 34 may be made to be constant. Accordingly, the electric vehicle driving device 10 may reduce a change amount of the angular velocity of the second ring gear 34 when switching from the first speed change state to the second speed change state. As a result, the electric vehicle driving device 10 may reduce a speed change shock.

Next, the second rotational force T8 output from the second motor 12 will be described. The second motor 12 needs to output the rotational force of the second rotational force T8 or more satisfying the following equation (6). In the following equation (6), 1−(Z4/Z1) indicates the rotational force ratio between the second sun gear 31 and the second ring gear 34.

Equation 6

$$T8 = -\left(1 - \frac{Z4}{Z1}\right) \times T7 \quad (6)$$

Therefore, in order to adjust the rotational force and the angular velocity of the second ring gear 34 when the first motor 11 arbitrarily turns, the first rotational force TA, the second rotational force TB, the number of teeth Z1, and the number of teeth Z4 may satisfy the following equation (7). The first rotational force TA is the rotational force of the arbitrary angular velocity of the first motor 11, and the second rotational force TB is the rotational force of the arbitrary angular velocity of the second motor 12.

Equation 7

$$\frac{TB}{TA} = \left|1 - \frac{Z4}{Z1}\right| \quad (7)$$

Figure 4:
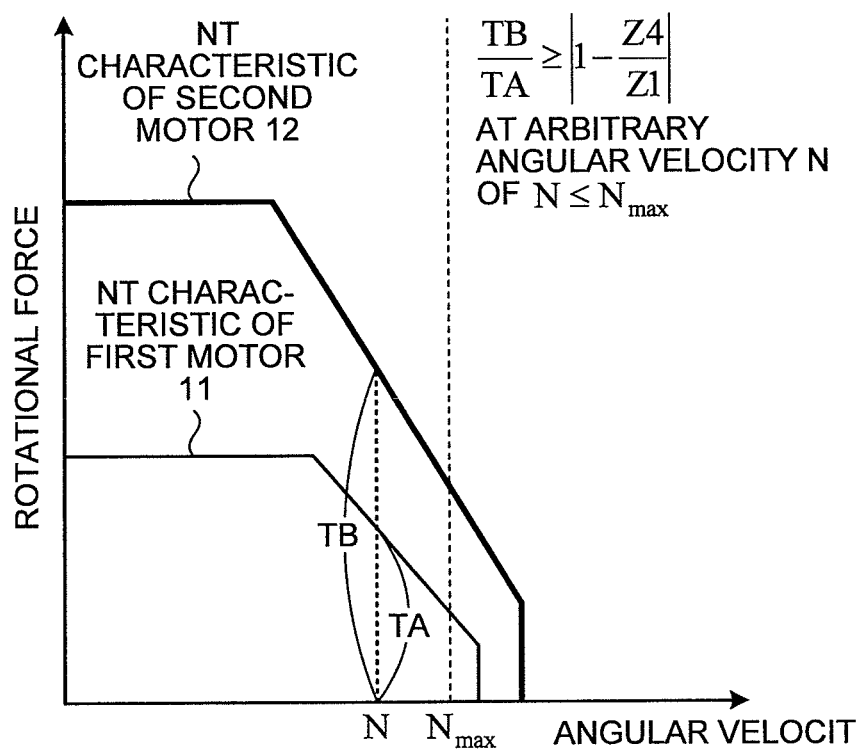
FIG. 4 is a graph illustrating an example of an angular velocity-rotational force characteristic of a first motor and a second motor of the first embodiment.

FIG. 4 is a graph illustrating an example of an angular velocity-rotational force characteristic of a first motor and a second motor of the first embodiment. There is a relation between an angular velocity of the output shaft of the motor and the maximal rotational force output in the angular velocity. This relation is referred to as an angular velocity-rotational force characteristic (the number of rotations-torque characteristic and the NT characteristic) of the motor. Therefore, the first rotational force TA, the second rotational force TB, the number of teeth Z1, and the number of teeth Z4 need to satisfy the equation (7) within the range in which the angular velocity of the output shaft of the first motor 11 is from 0 to the maximal angular velocity Nmax to be supposed. The angular velocity-rotational force characteristic shown in FIG. 4 is an example of the angular velocity-rotational force characteristic of the first motor 11 and the second motor 12 when the first rotational force TA, the second rotational force TB, the number of teeth Z1, and the number of teeth Z4 satisfy the equation (7) within the range in which the angular velocity of the output shaft of the first motor 11 is from 0 to the maximal angular velocity Nmax to be supposed. Next, the clutch device 40 will be described.

The clutch device 40 is, for example, a one-way clutch device. The one-way clutch device transmits only the rotational force in the first direction, but does not transmit the rotational force in the second direction opposite to the first direction. That is, the one-way clutch device becomes the engagement state when the first carrier 23 shown in FIGS. 1 and 3 rotate in the first direction, and becomes the disengagement state when the first carrier 23 rotates in the second direction. The one-way clutch device is, for example, a cam clutch device or a roller clutch device. Hereinafter, on the assumption that the clutch device 40 is the cam clutch device, the configuration of the clutch device 40 will be described.

Figure 5:
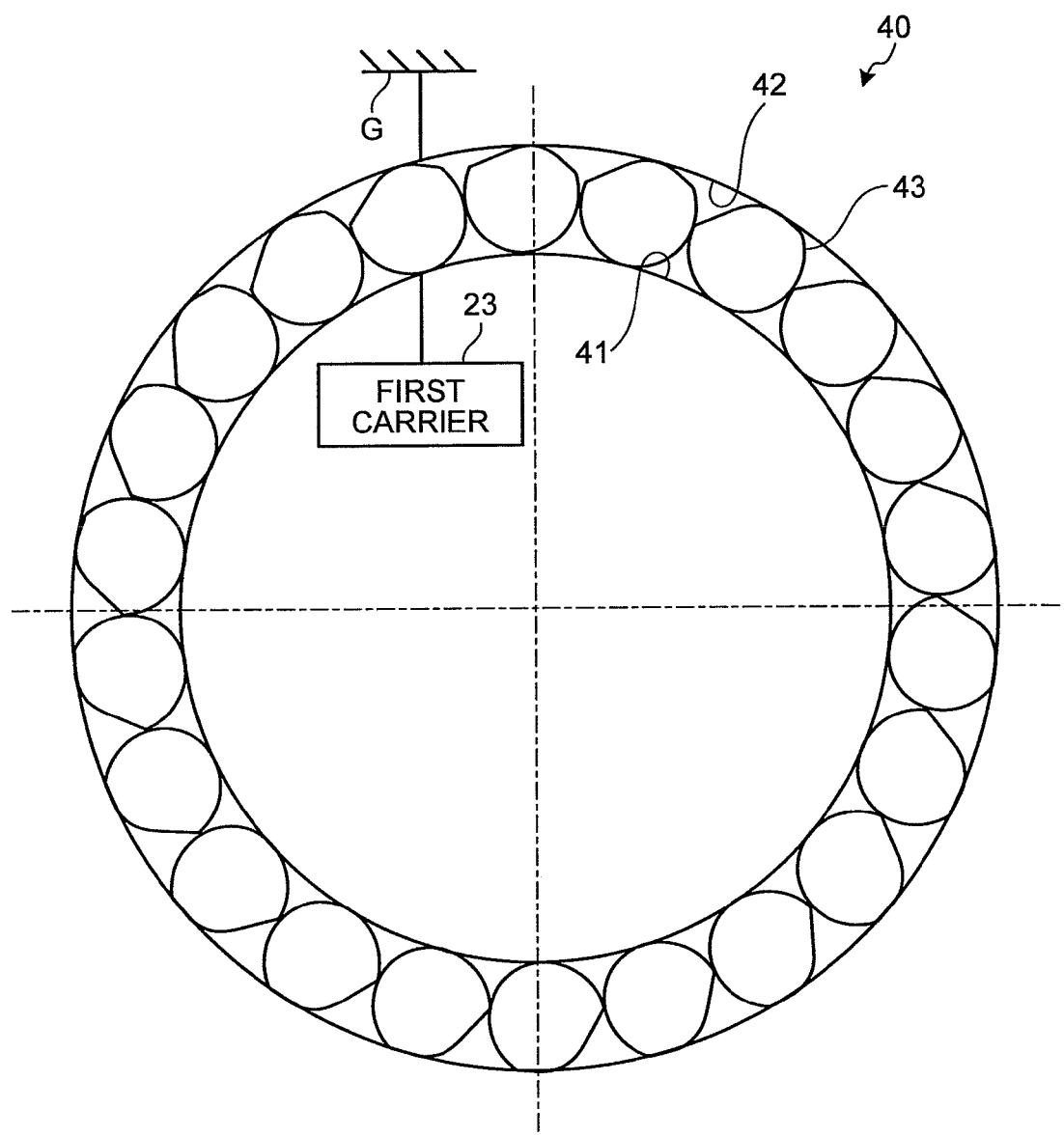
FIG. 5 is a diagram illustrating a clutch device of the first embodiment.
Figure 6:
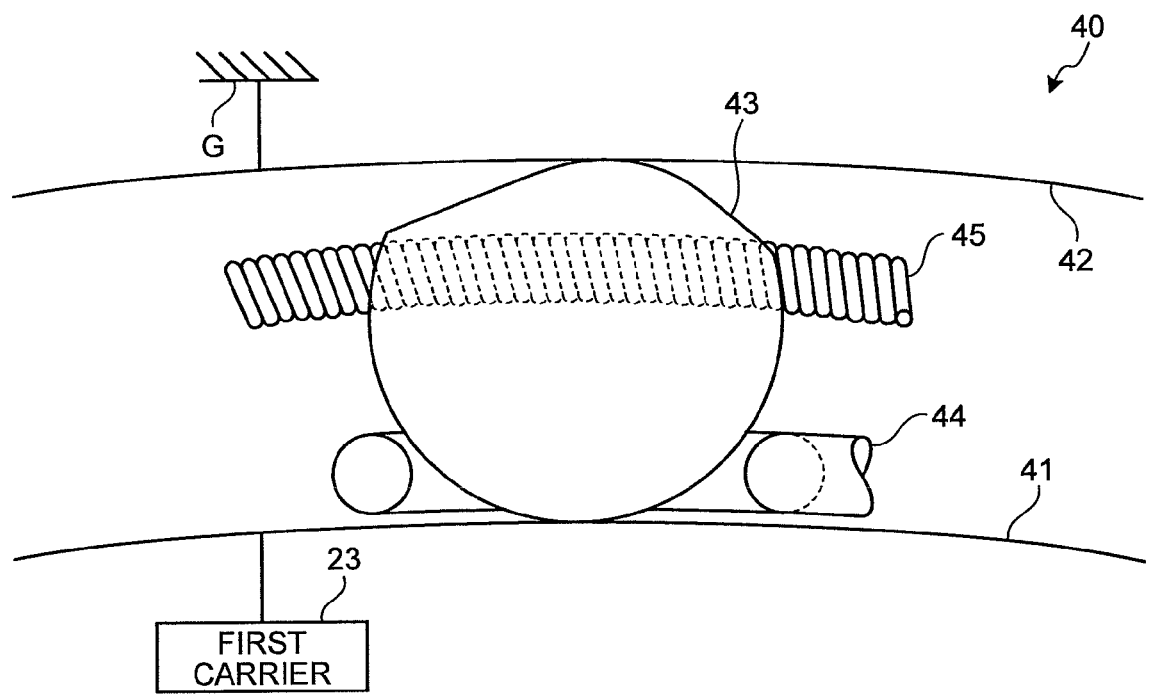
FIG. 6 is a diagram magnifying a cam of the clutch device of the first embodiment.

FIG. 5 is a diagram illustrating a clutch device of the first embodiment. FIG. 6 is a diagram magnifying a cam of the clutch device of the first embodiment. As shown in FIG. 5, the clutch device 40 includes an inner race 41 serving as a second member, an outer race 42 serving as a first member, and a cam 43 serving as an engagement member. The inner race 41 may serve as the first member, and the outer race 42 may serve as the second member. The inner race 41 and the outer race 42 are cylindrical members. The inner race 41 is disposed inside the outer race 42. One of the inner race 41 and the outer race 42 is connected to the first carrier 23, and the other thereof is connected to the casing G. In the embodiment, the inner race 41 is connected to the first carrier 23, and the outer race 42 is connected to the casing G. The cam 43 is a bar-shaped member with a substantially cylindrical shape. However, the cross-sectional shape of the cam 43 taken along the imaginary plane perpendicular to the center axis of the bar-shaped member is not a true circular shape, but a distorted shape. A plurality of cams 43 are provided between the outer peripheral portion of the inner race 41 and the inner peripheral portion of the outer race 42 along the circumferential direction of the inner race 41 and the outer race 42.

As shown in FIG. 6, the clutch device 40 includes a wire gauge 44 and a garter spring 45. The wire gauge 44 is an elastic member. The wire gauge 44 arranges so that the plurality of cam 43 are not dispersed. The garter spring 45 applies a force to the cam 43 so that the cam 43 normally comes into contact with the inner race 41 and the outer race 42. Accordingly, when the rotational force acts on the inner race 41 or the outer race 42, the cam 43 may promptly mesh with the inner race 41 and the outer race 42. Therefore, the clutch device 40 may reduce a time necessary for switching from the disengagement state to the engagement state. In the disengagement state, no force is transmitted between the inner race 41 and the outer race 42. In the engagement state, a force is transmitted between the inner race 41 and the outer race 42.

In the clutch device 40, when the rotational force acts on the inner race 41 in the first direction, the cam 43 meshes with the inner race 41 and the outer race 42. Accordingly, the rotational force is transmitted between the inner race 41 and the outer race 42, and the first carrier 23 receives a reaction force from the casing G. Therefore, the clutch device 40 may regulate the rotation of the first carrier 23. Further, in the clutch device 40, when the rotational force acts on the inner race 41 in the second direction, the cam 43 does not mesh with the inner race 41 and the outer race 42. Accordingly, the rotational force is not transmitted between the inner race 41 and the outer race 42, and the first carrier 23 does not receive a reaction force from the casing G. Therefore, the clutch device 40 does not regulate the rotation of the first carrier 23. In this manner, the clutch device 40 may realize a function as the one-way clutch device.

In the case of the embodiment, in the first speed change state, that is, the state where the second motor 12 is not operated and the first motor 11 outputs the rotational force so as to advance the electric vehicle, when the inner race 41 turns in the direction where the first carrier 23 shown in FIG. 1 turns (rotates), the clutch device 40 becomes the engagement state. The above-described first direction is a direction in which the first motor 11 outputs the rotational force so as to advance the electric vehicle, and the inner race 41 serving as the second member rotates when the second motor is not operated. In this state, when the second motor 12 is operated, the rotation direction of the second carrier 33 is reversed. Accordingly, the clutch device 40 becomes a disengagement state in the case of the second speed change state, that is, the case where the second motor 12 is operated and the first motor 11 outputs the rotational force so as to advance the electric vehicle. Accordingly, the clutch device 40 may switch to the engagement state and the disengagement state in a following manner depending on whether the second motor 12 is operated.

The clutch device 40 may be a roller clutch device. However, the capacity of the rotational force (torque) of the cam clutch device is larger than that of the roller clutch device. That is, in the cam clutch device, the magnitude of a force transmitted between the inner race 41 and the outer race 42 is larger than that of the roller clutch device. Therefore, the clutch device 40 may transmit the larger rotational force in the case of the cam clutch device.

Instead of the one-way clutch device, the clutch device 40 may be a clutch device of a type in which two rotary members engage with each other by a piston inside a cylinder moved by a hydraulic fluid or two rotary members engage with each other by an electromagnetic actuator. However, such a clutch device needs to have a mechanism for moving the piston or electric power for operating the electromagnetic actuator. In contrast, when the clutch device 40 is the one-way clutch device, the mechanism for moving the piston is not needed, and the electric power for operating the electromagnetic actuator is not needed. When the clutch device 40 is the one-way clutch device, the engagement state and the disengagement state may be switched by switching the direction of the rotational force acting on the inner race 41 or the outer race 42 (in the embodiment, the inner race 41). Therefore, the clutch device 40 may decrease the number of components and decrease the size (of the clutch device 40) in the case of the one-way clutch device. Next, an example of a structure of the electric vehicle driving device 10 will be described.

Figure 7:
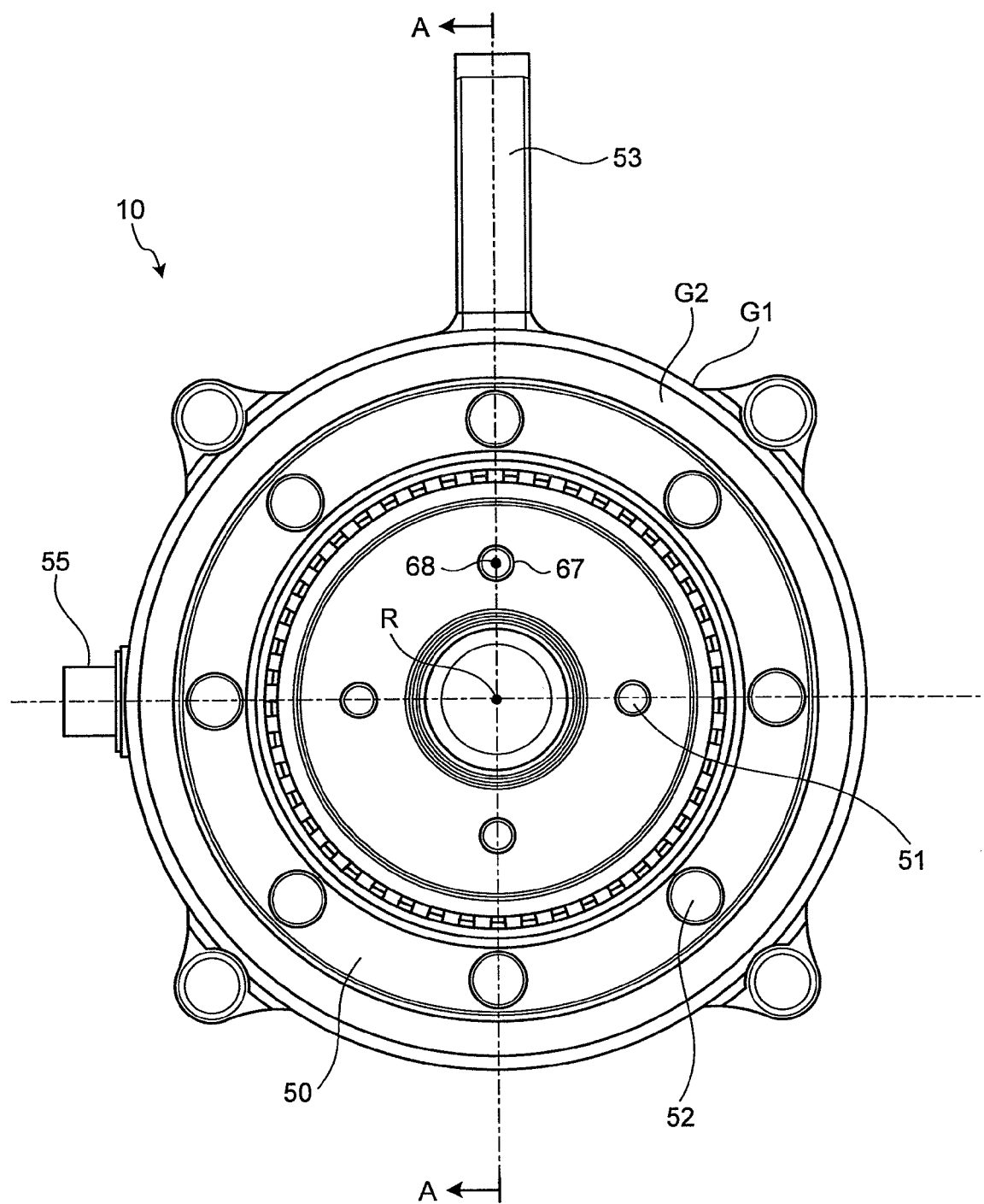
FIG. 7 is a diagram schematically illustrating an appearance of the electric vehicle driving device of the first embodiment.
Figure 8:
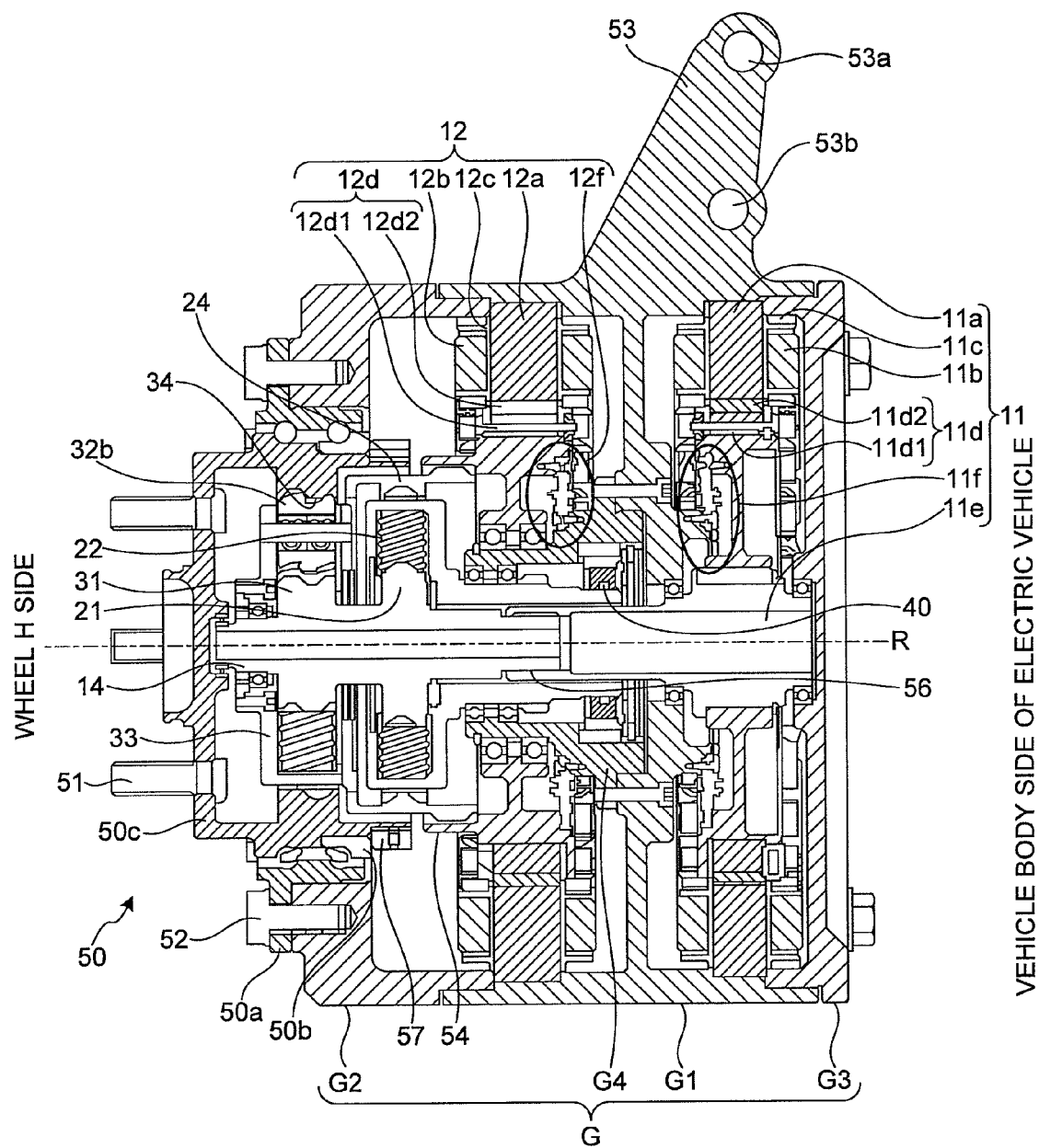
FIG. 8 is a cross-sectional view taken along the line A-A of FIG. 7.
Figure 9:
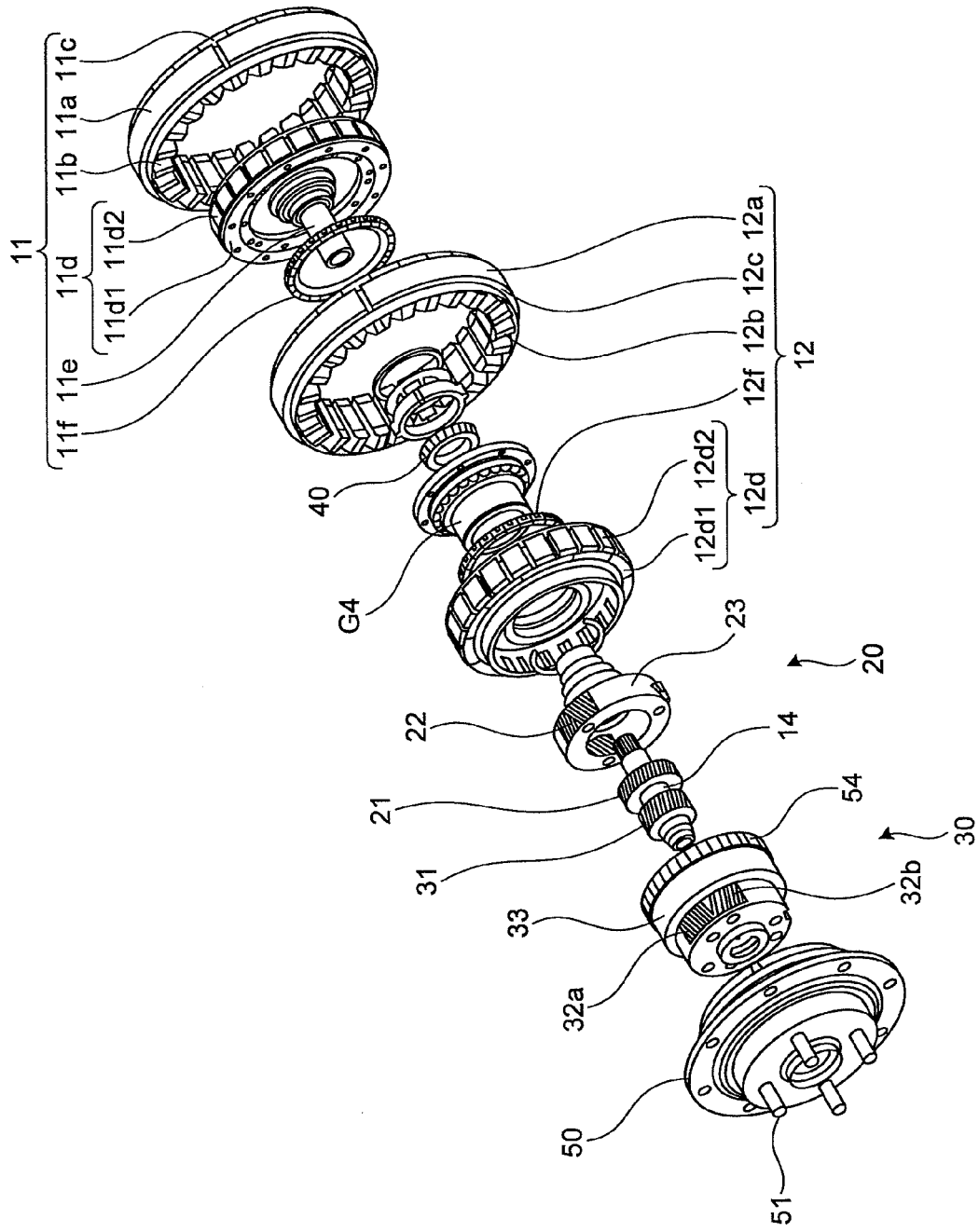
FIG. 9 is a diagram illustrating a disassembled electric vehicle driving device of the first embodiment.

FIG. 7 is a diagram schematically illustrating an appearance of the electric vehicle driving device of the first embodiment. FIG. 8 is a cross-sectional view taken along the line A-A of FIG. 7. FIG. 9 is a diagram illustrating a disassembled electric vehicle driving device of the first embodiment. Hereinafter, in the above-described components, the same descriptions are not repeated, but described by the same reference signs. As shown in FIG. 8, the casing G includes a first casing G1, a second casing G2, a third casing G3, and a fourth casing G4. The first casing G1, the second casing G2, and the fourth casing G4 are cylindrical members. The second casing G2 is provided on the wheel H side in relation to the first casing G1. The first casing G1 and the second casing G2 are fastened by, for example, four bolts.

The third casing G3 is provided at the opening end opposite to the second casing G2 in two opening ends of the first casing G1, that is, the opening end of the first casing G1 in the vehicle body side of the electric vehicle. The first casing G1 and the third casing G3 are fastened by, for example, four bolts. Accordingly, the third casing G3 closes the opening of the first casing G1. The fourth casing G4 is provided inside the first casing G1. The first casing G1 and the fourth casing G4 are fastened by, for example, eight bolts.

As shown in FIGS. 8 and 9, the first motor 11 includes a first stator core 11a, a first coil 11b, a first insulator 11c, a first rotor 11d, a first motor output shaft 11e, and a first resolver 11f. The first stator core 11a is a cylindrical member. As shown in FIG. 8, the first stator core 11a is positioned (fixed) by being interposed between the first casing G1 and the third casing G3. The first coil 11b is provided at a plurality of portions of the first stator core 11a. The first coil 11b is wound on the first stator core 11a through the first insulator 11c.

The first rotor 11d is provided inside the first stator core 11a in the radial direction. The first rotor 11d includes a first rotor core 11d1 and a first magnet 11d2. The first rotor core 11d1 is a cylindrical member. A plurality of first magnets 11d2 are provided in the outer periphery of the first rotor core 11d1. The first motor output shaft 11e is a bar-shaped member. The first motor output shaft 11e is connected to the first rotor core 11d1. The first resolver 11f is provided at the first rotor core 11d1. The first resolver 11f detects the rotary angle of the first rotor core 11d1.

The second motor 12 includes a second stator core 12a, a second coil 12b, a second insulator 12c, a second rotor 12d, and a second resolver 12f. The second stator core 12a is a cylindrical member. The second stator core 12a may be positioned (fixed) by being interposed between the first casing G1 and the second casing G2. The second coil 12b is provided at a plurality of portions of the second stator core 12a. The second coil 12b is wound around the second stator core 12a through the second insulator 12c.

The second rotor 12d is provided inside the second stator core 12a in the radial direction. The second rotor 12d is supported by the fourth casing G4, rotatably about the rotary axis R together with the clutch device 40. The second rotor 12d includes a second rotor core 12d1 and a second magnet 12d2. The second rotor core 12d1 is a cylindrical member. A plurality of second magnets 12d2 are provided in the outer periphery of the second rotor core 12d1. The second resolver 12f is provided at the second rotor core 12d1. The second resolver 12f detects the rotary angle of the second rotor core 12d1.

The more desirable aspect of the first stator core 11a and the second stator core 12a will be described. The wheel hub motor needs to be decreased in size and the larger rotational force needs to be transmitted to the wheel. Such a wheel hub motor tends to include a permanent magnet synchronous motor. In the permanent magnet synchronous motor, a stator core or a rotor core is formed by laminating magnetic steel sheets molded by pressing in order to suppress energy loss due to an eddy current.

A shear force generated between the stator core and the rotor core of the permanent magnet synchronous motor, that is, a so-called air gap is proportional to a surface area of a portion facing the air gap. This is because the density in the air gap of the shear force acting between the stator core and the rotor core is determined by the magnetic flux density of the air gap, and the effective magnetic flux density of the air gap is determined by a material characteristic such as a remaining magnetic flux density of a permanent magnet and a saturated magnetization (saturated magnetic flux density) of a nondirectional magnetic steel sheet of a material of a rotor core.

There is a neodymium magnet as a magnet having a satisfactory characteristic when used as a permanent magnet for a permanent magnet synchronous motor. However, the remaining magnetic flux density of the neodymium magnet is about 1.4 [T]. On the other hand, the saturated magnetization (saturated magnetic flux density) of the nondirectional magnetic steel sheet of the core material is about 1.9 [T]. Accordingly, the density of the shear force inside the air gap of the permanent magnet synchronous motor substantially becomes constant regardless of the size of the motor, except for a motor especially designed to rapidly rotate an output shaft or a motor especially designed to output a large rotational force.

Therefore, when the cross-sectional shape of the stator core and the cross-sectional shape of the rotor core are the same, the rotational force output from the motor is proportional to the dimensions of the stator core and the rotor core in the direction of the rotary axis. This is because the radius of the air gap is the same even when the size of the motor is different if the cross-sectional shape of the stator core and the cross-sectional shape of the rotor core are the same. The cross-sectional shape mentioned herein is the cross-sectional shape of the imaginary plane perpendicular to the rotary axis of the motor. The 'same' mentioned herein also includes a case in which the cross-sectional shape is different due to a manufacturing error or a dimension error.

Accordingly, the electric vehicle driving device 10 may be designed such that the first rotational force TA, the second rotational force TB, the number of teeth Z1, and the number of teeth Z4 satisfy the above equation (7) by adjusting the dimension of the first stator core 11a in the direction of the rotary axis R and the dimension of the second stator core 12a in the direction of the rotary axis R. For example, when the cross-sectional shape of the first stator core 11a along the imaginary plane perpendicular to the rotary axis R (hereinafter, referred to as a cross-sectional shape of the first stator core 11a) and the cross-sectional shape of the second stator core 12a along the imaginary plane perpendicular to the rotary axis R (hereinafter, referred to as a cross-sectional shape of the second stator core 12a) are the same, the ratio between the dimension of the first stator core 11a in the direction of the rotary axis R and the dimension of the second stator core 12a in the direction of the rotary axis R is set to be equal to the ratio between the first rotational force TA and the second rotational force TB calculated in the equation (7). Accordingly, in the electric vehicle driving device 10, the first rotational force TA, the second rotational force TB, the number of teeth Z1, and the number of teeth Z4 satisfy the equation (7).

In the electric vehicle driving device 10 of the embodiment, the cross-sectional shape of the first stator core 11a and the cross-sectional shape of the second stator core 12a are the same. Accordingly, the electric vehicle driving device 10 has the effect described below. In the design of the motor, since the cross-sectional shape of the stator core is largely concerned with the magnetic characteristic of the motor, when the cross-sectional shape of the stator core is changed, an effort necessary for designing the motor increases. In the electric vehicle driving device 10, since the cross-sectional shape of the first stator core 11a and the cross-sectional shape of the second stator core 12a are formed to be the same, an effort necessary for the design may be reduced. When the cross-sectional shape of the first stator core 11a and the cross-sectional shape of the second stator core 12a are the same, the first stator core 11a and the second stator core 12a may formed by the same mold. Therefore, in the electric vehicle driving device 10, an effort necessary for the manufacture may be reduced. Further, in the electric vehicle driving device 10, a cost necessary for the manufacture may be reduced.

As described above, the electric vehicle driving device 10 needs to be decreased in size. The electric vehicle driving device 10 is disposed below the shock absorber in the vertical direction. Therefore, the electric vehicle driving device 10 needs to be decreased in weight. Therefore, it is not desirable to make the dimension of the second stator core 12a in the direction of the rotary axis R excessively large. As shown in the above equation (5), the rotational force acting on the second ring gear 34 is determined by the ratio between the number of teeth Z1 of the second sun gear 31 and the number of teeth Z4 of the second ring gear 34. Therefore, even when the rotational force output from the second motor 12 increases, the magnitude of the rotational force transmitted from the second ring gear 34 to the wheel H does not largely change. Accordingly, it is not desirable that the dimension of the second stator core 12a in the direction of the rotary axis R be made to be excessively large so that the second rotational force TB output from the second motor 12 becomes excessively larger than the first rotational force TA output from the first motor 11. Hereinafter, a method of setting a desirable dimension of the second stator core 12a in the direction of the rotary axis R will be described.

Figure 10:
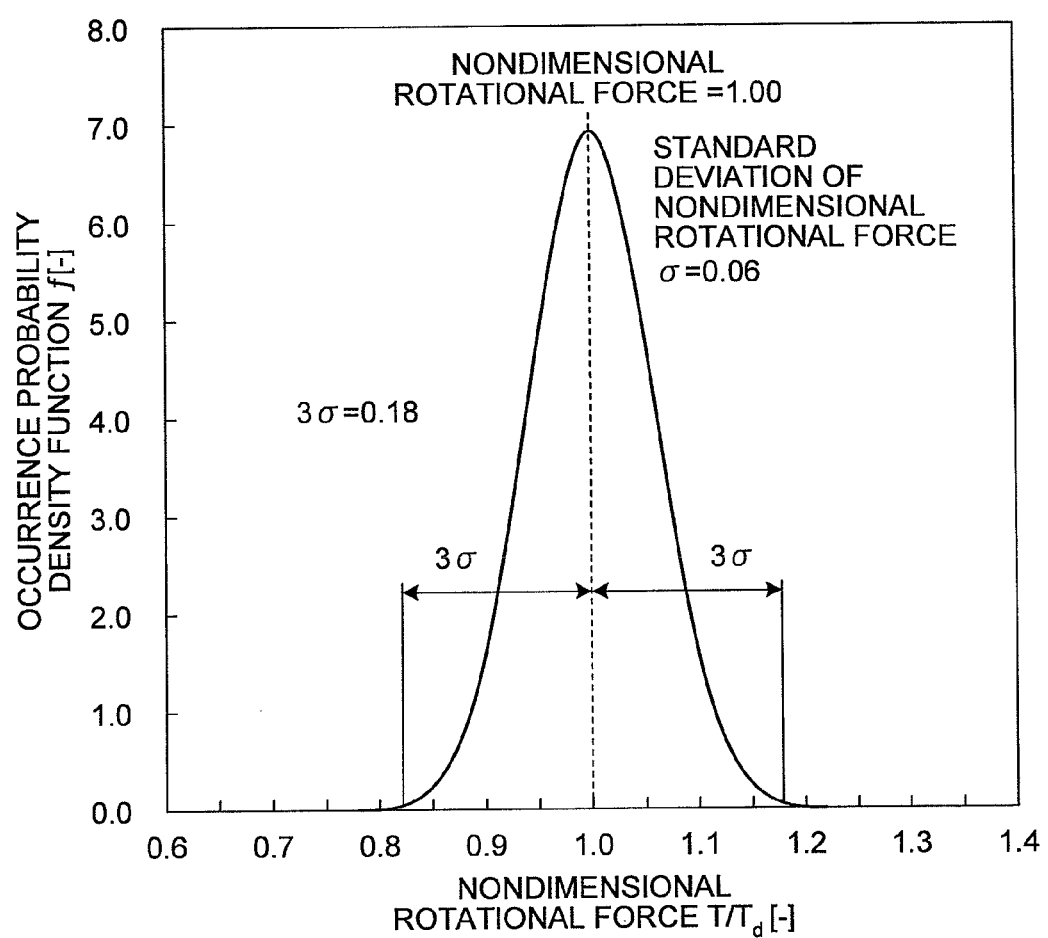
FIG. 10 is a graph illustrating probability of occurrence of an individual difference of a rotational force output from a motor.

FIG. 10 is a graph illustrating probability of occurrence of an individual difference of a rotational force output from a motor. FIG. 10 illustrates an individual difference of a non-dimensinoal rotation force which is a ratio between the rotational force T [Nm] output from the motor and the rotational force Td in the design value. The vertical axis of FIG. 10 indicates occurrence probability density of an individual difference, and the horizontal axis indicates the nondimensinoal rotational force. The rotational force output from the motor has an error of about 18% at maximum with respect to the design value due to a factor such as a dimension of a motor or a magnetic characteristic, as shown in FIG. 10. As shown in FIG. 10, a standard deviation σ of the nondimensional rotational force is about 0.06.

Therefore, the ratio between the first rotational force TA and the second rotational force TB is set to be 82% or more of the rotational force ratio acting between the second sun gear 31 and the second carrier 33. In the embodiment, since the cross-sectional shape of the first stator core 11a and the cross-sectional shape of the second stator core 12a are the same, the ratio between the dimension of the first stator core 11a in the direction of the rotary axis R and the dimension of the second stator core 12a in the direction of the rotary axis R is set to be within 3σ, that is, 18% of the ratio between the first rotational force TA and the second rotational force TB calculated from the equation (7). That is, the ratio between the dimension of the first stator core 11a in the direction of the rotary axis R and the dimension of the second stator core 12a in the direction of the rotary axis R is set to be from 82% to 118% of the rotational force ratio. Accordingly, the electric vehicle driving device 10 may reduce a concern that the first rotational force TA, the second rotational force TB, the number of teeth Z1, and the number of teeth Z4 may not satisfy the equation (7) due to the individual difference between the first motor 11 and the second motor 12.

In the embodiment, a case has been described in which the cross-sectional shape of the first stator core 11a and the cross-sectional shape of the second stator core 12a are the same. Further, in the embodiment, the cross-sectional shape of the first rotor core 11d1 and the cross-sectional shape of the second rotor core 12d1 are also the same. Accordingly, in the electric vehicle driving device 10, an effort necessary for designing and manufacturing the first motor 11 and the second motor 12 may be reduced. Further, a cost necessary for manufacturing the first motor 11 and the second motor 12 may be reduced.

The electric vehicle driving device 10 further includes a stud bolt 51 shown in FIGS. 7, 8, and 9, a bolt 52 shown in FIGS. 7 and 8, a shock absorber attachment portion 53, a first serration 54, a waterproof panel connector 55 shown in FIG. 7, a second serration 56 shown in FIG. 8, and a locknut 57. As shown in FIG. 7, the wheel bearing 50 is fastened to the second casing G2 by, for example, eighth bolts 52. The waterproof panel connector 55 is provided in the first casing G1. The waterproof panel connector 55 is electrically connected to an electric power source so as to supply electric power to the first motor 11 and the second motor 12 provided inside the casing G.

As shown in FIG. 8, the wheel bearing 50 includes an outer race 50a, a first inner race 50b, and a second inner race 50c. The outer race 50a, the first inner race 50b, and the second inner race 50c are cylindrical members. The first inner race 50b is disposed inside of the radial direction (the rotary axis R side) in relation to the outer race 50a, and the second inner race 50c is provided inside of the radial direction (the rotary axis R side) in relation to the first inner race 50b. The second inner race 50c is provided so as to cover the second planetary gear mechanism 30. That is, the second planetary gear mechanism 30 is provided inside of the radial direction (the rotary axis R side) in relation to the second inner race 50c.

The first inner race 50b and the second inner race 50c may turn (rotate) about the rotary axis R relative to the outer race 50a by providing a rolling element between the outer periphery (of the first inner race 50b and the second inner race 50c) and the inner periphery of the outer race 50a. Further, in the second inner race 50c, a second ring gear 34 is provided in the inner periphery (of the second inner race 50c). The second ring gear 34 is integrally formed with, for example, the second inner race 50c. For example, four stud bolts 51 are provided in the flange portion of the second inner race 50c. The stud bolt 51 is inserted into a hole provided in a wheel (not shown), and a wheel nut is threaded thereinto. Accordingly, the wheel is attached to the wheel bearing 50. The locknut 57 applies an appropriate preload to the wheel bearing 50. Accordingly, the wheel bearing 50 may improve the rigidity.

The shock absorber attachment portion 53 is provided in the first casing G1. Specifically, the shock absorber attachment portion 53 is provided in the first casing G1 at an upper portion in the vertical direction when the electric vehicle driving device 10 is attached to the vehicle body of the electric vehicle. The shock absorber attachment portion 53 includes a first bolt hole 53a and a second bolt hole 53b. The bolt is inserted into the first bolt hole 53a and the second bolt hole 53b and the bolt is threaded into the nut, thereby the electric vehicle driving device 10 is fastened to the vehicle body of the electric vehicle.

The first serration 54 is formed in the second carrier 33. Specifically, the serration is formed at the outer periphery in the vehicle body side of the electric vehicle among both ends of the second carrier 33. The first serration 54 is fitted to the serration formed in the second rotor 12d of the second motor 12. Accordingly, the rotational force of the second rotor 12d is connected to the second carrier 33. Further, in the second carrier 33, the first ring gear 24 is formed in the inner periphery of the portion provided with the first serration 54. The second serration 56 is formed at the end in the side of the first motor output shaft 11e in the sun gear shaft 14. The second serration 56 is fitted to the first motor output shaft 11e. Accordingly, the sun gear shaft 14 is connected to the first motor 11.

With the above-described configuration, the electric vehicle driving device 10 holds the wheel and transmits the rotational force output from the first motor 11 and the second motor 12 to the wheel, so that the electric vehicle may run. In the embodiment, the first motor 11, the second motor 12, the first sun gear 21, the first carrier 23, the first ring gear 24, the second sun gear 31, the second carrier 33, the second ring gear 34, and the wheel bearing 50 are coaxially disposed. However, in the electric vehicle driving device 10, these components do not need to be disposed coaxially. Further, in the electric vehicle driving device 10 of the embodiment, the second ring gear 34 is directly connected to the wheel bearing 50. However, the second ring gear 34 may be connected to the wheel bearing 50 through a gear or a joint.

The configuration of the first embodiment may be appropriately applied to the embodiments below. The same configuration as that of the embodiment has the same effect.

Second Embodiment

Figure 11:
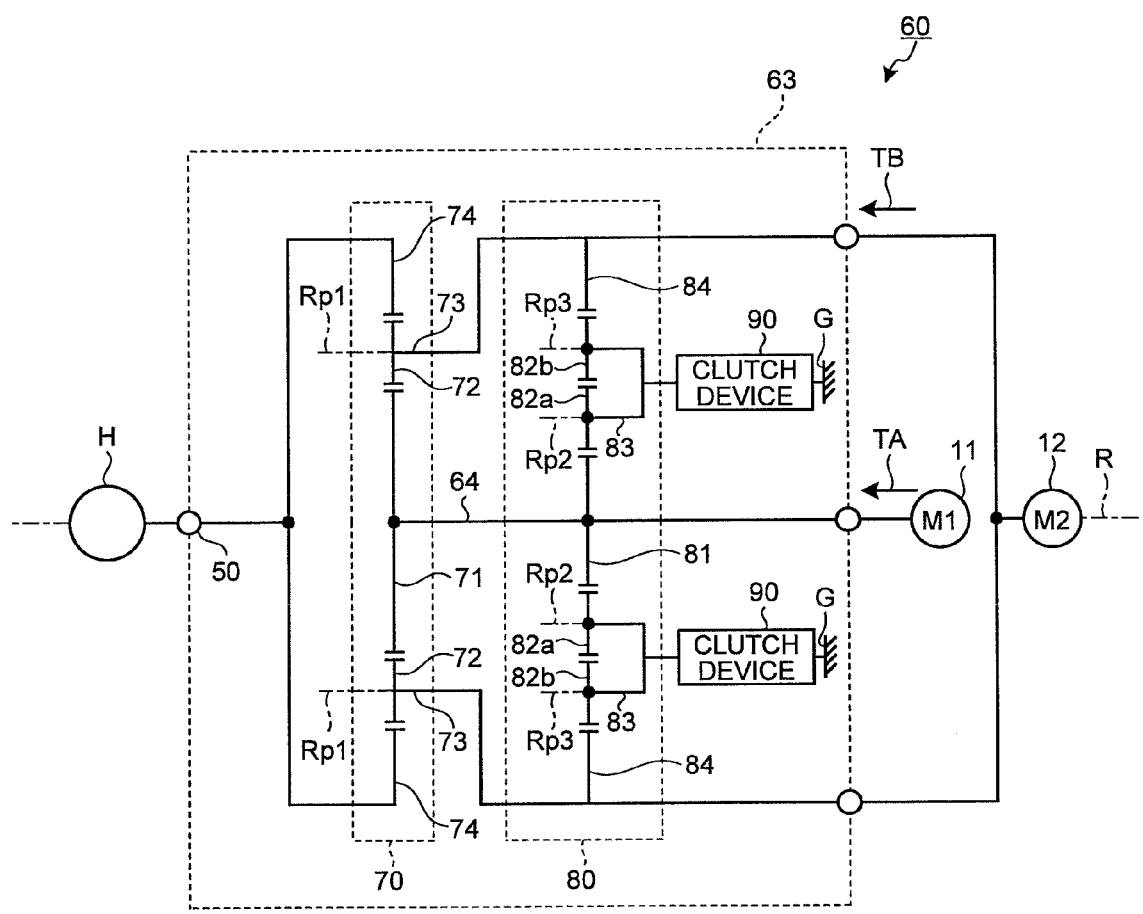
FIG. 11 is a diagram illustrating a configuration of an electric vehicle driving device of a second embodiment.

FIG. 11 is a diagram illustrating a configuration of an electric vehicle driving device of a second embodiment. A shift mechanism of an electric vehicle driving device 60 serving as a wheel hub motor shown in FIG. 11 has a different configuration from that of the electric vehicle driving device 10 of the first embodiment. Hereinafter, the same reference signs will be given to the same components as those of the electric vehicle driving device 10 of the first embodiment, and the description thereof will not be repeated. The electric vehicle driving device 60 includes a shift mechanism 63. The shift mechanism 63 is connected to the first motor 11, so that the rotational force output from the first motor 11 is transmitted (input) thereto. Further, the shift mechanism 63 is connected to the second motor 12, so that the rotational force output from the second motor 12 is transmitted (input) thereto. The shift mechanism 63 is connected to the wheel bearing 50, so that the rotational force obtained by the speed change operation is transmitted (output) to the wheel bearing 50. The wheel H of the electric vehicle is attached to the wheel bearing 50.

The shift mechanism 63 includes a first planetary gear mechanism 70, a second planetary gear mechanism 80, and a clutch device 90. The first planetary gear mechanism 70 is a planetary gear mechanism of single pinion type. The first planetary gear mechanism 70 includes a first sun gear 71, a first pinion gear 72, a first carrier 73, and a first ring gear 74. The second planetary gear mechanism 80 is a planetary gear mechanism of double pinion type. The second planetary gear mechanism 80 includes a second sun gear 81, a second pinion gear 82a, a third pinion gear 82b, a second carrier 83, and a second ring gear 84. The second planetary gear mechanism 80 is disposed in the side of the first motor 11 and the second motor 12 compared to the first planetary gear mechanism 70.

The second sun gear 81 is supported inside the casing G so as to turn (rotate) about the rotary axis R. The second sun gear 81 is connected to the first motor 11. Therefore, when the first motor 11 is operated, the first rotational force TA is transmitted to the second sun gear 81. Accordingly, when the first motor 11 is operated, the second sun gear 81 turns about the rotary axis R. The second pinion gear 82a meshes with the second sun gear 81. The third pinion gear 82b meshes with the second pinion gear 82a. The second carrier 83 holds the second pinion gear 82a so that the second pinion gear 82a turns (rotates) about the second pinion rotary axis Rp2. The second carrier 83 holds the third pinion gear 82b so that the third pinion gear 82b turns (rotates) about the third pinion rotary axis Rp3. The second pinion rotary axis Rp2 is parallel to, for example, the rotary axis R. The third pinion rotary axis Rp3 is parallel to, for example, the rotary axis R.

The second carrier 83 is supported inside the casing G so as to turn about the rotary axis R. Accordingly, the second carrier 83 holds the second pinion gear 82a and the third pinion gear 82b so that the second pinion gear 82a and the third pinion gear 82b revolve about the second sun gear 81, that is, the rotary axis R. The second ring gear 84 may turn (rotate) about the rotary axis R. The second ring gear 84 meshes with the third pinion gear 82b. Further, the second ring gear 84 is connected to the second motor 12. Therefore, when the second motor 12 is operated, the second rotational force TB is transmitted to the second ring gear 84. Accordingly, when the second motor 12 is operated, the second ring gear 84 turns (rotates) about the rotary axis R.

The first sun gear 71 is supported inside the casing G so as to turn (rotate) about the rotary axis R. The first sun gear 71 is connected to the first motor 11 through the second sun gear 81. Specifically, the first sun gear 71 and the second sun gear 81 are integrally formed with a sun gear shaft 64 so as to rotate along the same axis (the rotary axis R). The sun gear shaft 64 is connected to the first motor 11. Accordingly, when the second motor 12 is operated, the first sun gear 71 turns about the rotary axis R.

The first pinion gear 72 meshes with the first sun gear 71. The first carrier 73 holds the first pinion gear 72 so that the first pinion gear 72 turns (rotates) about the first pinion rotary axis Rp1. The first pinion rotary axis Rp1 is parallel to, for example, the rotary axis R. The first carrier 73 is supported inside the casing G so as to turn about the rotary axis R. Accordingly, the first carrier 73 holds the first pinion gear 72 so that the first pinion gear 72 revolves about the first sun gear 71, that is, the rotary axis R.

The first carrier 73 is connected to the second ring gear 84. Accordingly, when the second ring gear 84 turns (rotates), the first carrier 73 turns (rotates) about the rotary axis R. The first ring gear 74 meshes with the first pinion gear 72. Further, the first ring gear 74 is connected to the wheel H. Accordingly, when the first ring gear 74 turns (rotates), the wheel H turns. The clutch device 90 may regulate the rotation of the second carrier 83. Specifically, the clutch device 90 may switch to a case of regulating (braking) the rotation of the second carrier 83 about the rotary axis R and a case of permitting the rotation. Next, for reference, the angular velocities of respective components in the first speed change state will be described by using an collinear diagram.

Figure 12:
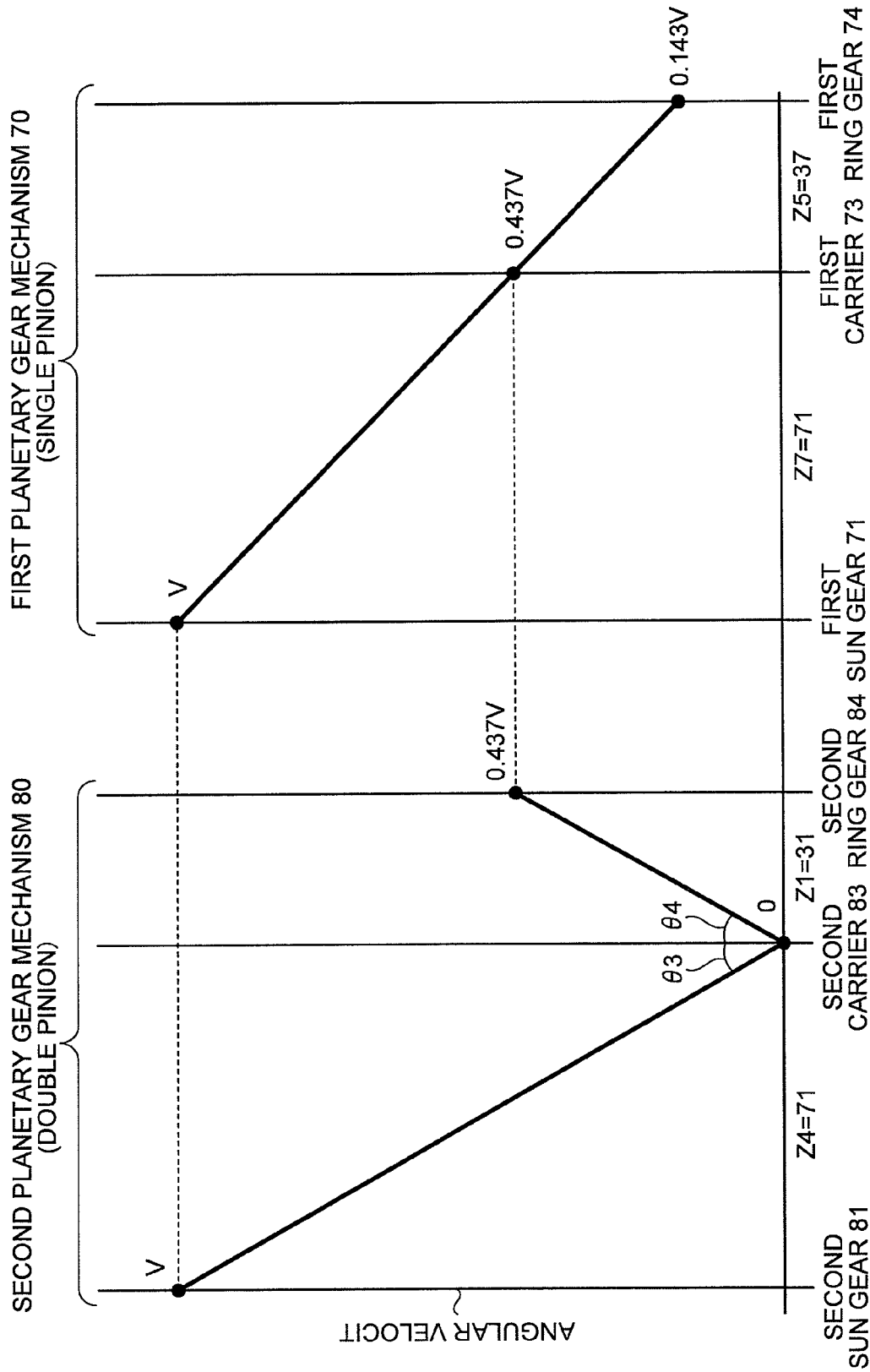
FIG. 12 is a collinear diagram illustrating rotation speeds of respective components when the electric vehicle driving device of the second embodiment is in a first speed change state.

FIG. 12 is a collinear diagram illustrating rotation speeds of respective components when the electric vehicle driving device of the second embodiment is in a first speed change state. Hereinafter, as an example, the angular velocity of the second sun gear 81 is set to V [rad/s]. Z1, Z4, Z5, and Z7 are the same as those of the first embodiment. As shown in FIG. 12, the angular velocity of the second sun gear 81 is V [rad/s]. The rotation of the second carrier 83 is regulated by the clutch device 90. Therefore, the angular velocity of the second carrier 83 is 0 [rad/s]. Since the second planetary gear mechanism 80 is a planetary gear mechanism of double pinion type including two pinion gears, the rotational force transmitted from the second sun gear 81 to the second ring gear 84 is reversed at the second carrier 83. When the rotational force is transmitted from the second carrier 83 to the second ring gear 84, the rotational force is transmitted while being reversed to the change rate obtained by multiplying the change rate when transmitting the rotational force from the second sun gear 81 to the second carrier 83 by −1. That is, in FIG. 12, θ3 is equal to θ4. Accordingly, the angular velocity of the second ring gear 84 is 0.437 V [rad/s].

The first sun gear 71 is connected to the second sun gear 81. Therefore, the angular velocity of the first sun gear 71 is V [rad/s]. The first carrier 73 is connected to the second ring gear 84. Therefore, the angular velocity of the first carrier 73 is 0.437 V [rad/s]. Further, the angular velocity of the first ring gear 74 is 0.143 V [rad/s]. Accordingly, the speed change ratio of the shift mechanism 63 becomes V/0.143V=6.99. In this manner, the electric vehicle driving device 60 may have the same effect as that of the electric vehicle driving device 10 of the first embodiment by the same principle as that of the electric vehicle driving device 10 of the first embodiment.

In an electric vehicle driving device 100, instead of the satisfaction of the equation (7) due to the same principle as that of the electric vehicle driving device 10 of the first embodiment, when the number of teeth of the first sun gear 71 is denoted by Z5 and the number of teeth of the first ring gear is denoted by Z7, the first rotational force TA, the second rotational force TB, the number of teeth Z5, and the number of teeth Z7 satisfy the following equation (8). The ratio between the first rotational force TA and the second rotational force TB of the electric vehicle driving device 100 is set to be 82% or more of the rotational force ratio acting between the first sun gear 71 and the first carrier 73.

Equation 8

$$\frac{TB}{TA} = \left|1 - \frac{Z7}{Z5}\right| \qquad (8)$$

The configuration of the second embodiment may be appropriately applied to the embodiments below. The same configuration as that of the embodiment has the same effect.

The desirable aspects of the first embodiment and the second embodiment are understood as follows. In the first embodiment and the second embodiment, it is desirable that the ratio between the second rotational force output from the second motor and the first rotational force output from the first motor be 82% or more of the rotational force ratio acting between the second sun gear and the second carrier.

In the above-described wheel hub motor, the rotational force TA output from the first motor, the rotational force TB output from the second motor, the number of teeth Z1 of the second sun gear, and the number of teeth Z4 of the second ring gear need to satisfy the equation (7). However, the rotational force output from the motor has an error of about 18% at maximum with respect to the design value due to a factor such as a dimension of a motor or a magnetic characteristic. In this aspect, with the above-described configuration, the rotational force TA output from the first motor, the rotational force TB output from the second motor, the number of teeth Z1 of the second sun gear, and the number of teeth Z4 of the second ring gear may satisfy the equation (7) regardless of the individual difference.

In the first embodiment and the second embodiment, it is desirable that the ratio between the second rotational force output from the second motor and the first rotational force output from the first motor be 82% or more of the rotational force ratio acting between the first sun gear and the first carrier. With the above-described configuration, in this aspect, the rotational force TA output from the first motor, the rotational force TB output from the second motor, the number of teeth Z1 of the second sun gear, and the number of teeth Z4 of the second ring gear may satisfy the equation (7) regardless of the individual difference.

In the first embodiment and the second embodiment, it is desirable that the cross-sectional shape obtained by cutting the stator core of the first motor along the plane perpendicular to the rotary axis of the first motor and the cross-sectional shape obtained by cutting the stator core of the second motor along the plane perpendicular to the rotary axis of the second motor have the same shape.

With the above-described configuration, since the designs of the stator cores of the first motor and the second motor are common, an effort necessary for the design may be reduced. Further, when the cross-sectional shape of the stator core of the first motor and the cross-sectional shape of the stator core of the second motor are the same, the stator core of the first motor and the second stator core of the second motor may be formed by the same mold. Therefore, the wheel hub motor of this aspect may reduce an effort necessary for manufacturing. Further, the wheel hub motor according to the invention may reduce a cost necessary for manufacturing.

In the first embodiment and the second embodiment, it is desirable that the ratio between the dimension of the stator core of the first motor in the direction of the rotary axis of the first motor and the dimension of the stator core of the second motor in the direction of the rotary axis of the second motor be from 82% to 118% of the rotational force ratio.

When the cross-sectional shapes of the stator cores are the same, the magnitude of the rotational force output from the motor is proportional to the dimension of the stator core in the direction of the rotary axis. Therefore, in the wheel hub motor of this aspect, with the above-described configuration, the rotational force TA output from the first motor, the rotational force TB output from the second motor, the number of teeth Z1 of the second sun gear, and the number of teeth Z4 of the second ring gear may satisfy the equation (7).

In the first embodiment and the second embodiment, it is desirable that the cross-sectional shape obtained by cutting the rotor core of the first motor along the plane perpendicular to the rotary axis of the first motor and the cross-sectional shape obtained by cutting the rotor core of the second motor along the plane perpendicular to the rotary axis of the second motor be the same.

With the above-described configuration, since the designs of the rotor cores of the first motor and the second motor are common, an effort necessary for the design may be reduced. Further, when the cross-sectional shape of the rotor core of the first motor and the cross-sectional shape of the rotor core of the second motor are the same, the rotor core of the first motor and the rotor core of the second motor may be formed by the same mold. Therefore, the wheel hub motor of this aspect may reduce an effort necessary for manufacturing. Further, the wheel hub motor according to the invention may reduce a cost necessary for manufacturing.

In the first embodiment and the second embodiment, it is desirable that the ratio between the dimension of the rotor core of the first motor in the direction of the rotary axis of the first motor and the dimension of the rotor core of the second motor in the direction of the rotary axis of the second motor be from 82% to 118% of the rotational force ratio.

When the cross-sectional shapes of the rotor cores are the same, the magnitude of the rotational force output from the motor is proportional to the dimension of the rotor core in the direction of the rotary axis. Therefore, in the wheel hub motor of this aspect, with the above-described configuration, the rotational force TA output from the first motor, the rotational force TB output from the second motor, the number of teeth Z1 of the second sun gear, and the number of teeth Z4 of the second ring gear may satisfy the equation (7).

In the first embodiment and the second embodiment, it is desirable that the clutch device be a one-way clutch device including a first member, a second member rotatable relative to the first member, and an engagement member which transmits a rotational force between the first member and the second member when a rotational force acts on the second member in a first direction and which does not transmit a rotational force between the first member and the second member when a rotational force acts on the second member in a second direction opposite to the first direction. Further, it is desirable that the first direction be a direction in which the second member rotates when the first motor outputs the rotational force so as to advance the electric vehicle and the second motor is not operated.

The one-way clutch device may switch to the engagement state and the disengagement state by switching the direction of the rotational force acting on the second member. Therefore, the one-way clutch device does not need a mechanism for moving a piston or an electromagnetic actuator. Accordingly, the wheel hub motor of this aspect may decrease the number of components and decrease the size (of the clutch device). Further, the one-way clutch device does not need a mechanism for moving a piston or energy for operating an electromagnetic actuator.

In the first embodiment and the second embodiment, it is desirable that the clutch device be a cam clutch device. The roller clutch device is also included in the one-way clutch device. However, the capacity of the rotational force (torque) of the cam clutch device is larger than that of the roller clutch device. That is, in the cam clutch device, the magnitude of a force transmitted between the first member and the second member is larger than that of the roller clutch device. Therefore, in the wheel hub motor of this aspect, the larger rotational force may be transmitted in the case where the clutch device is the cam clutch device.

Third Embodiment

Electric Vehicle Driving Device

Figure 13:
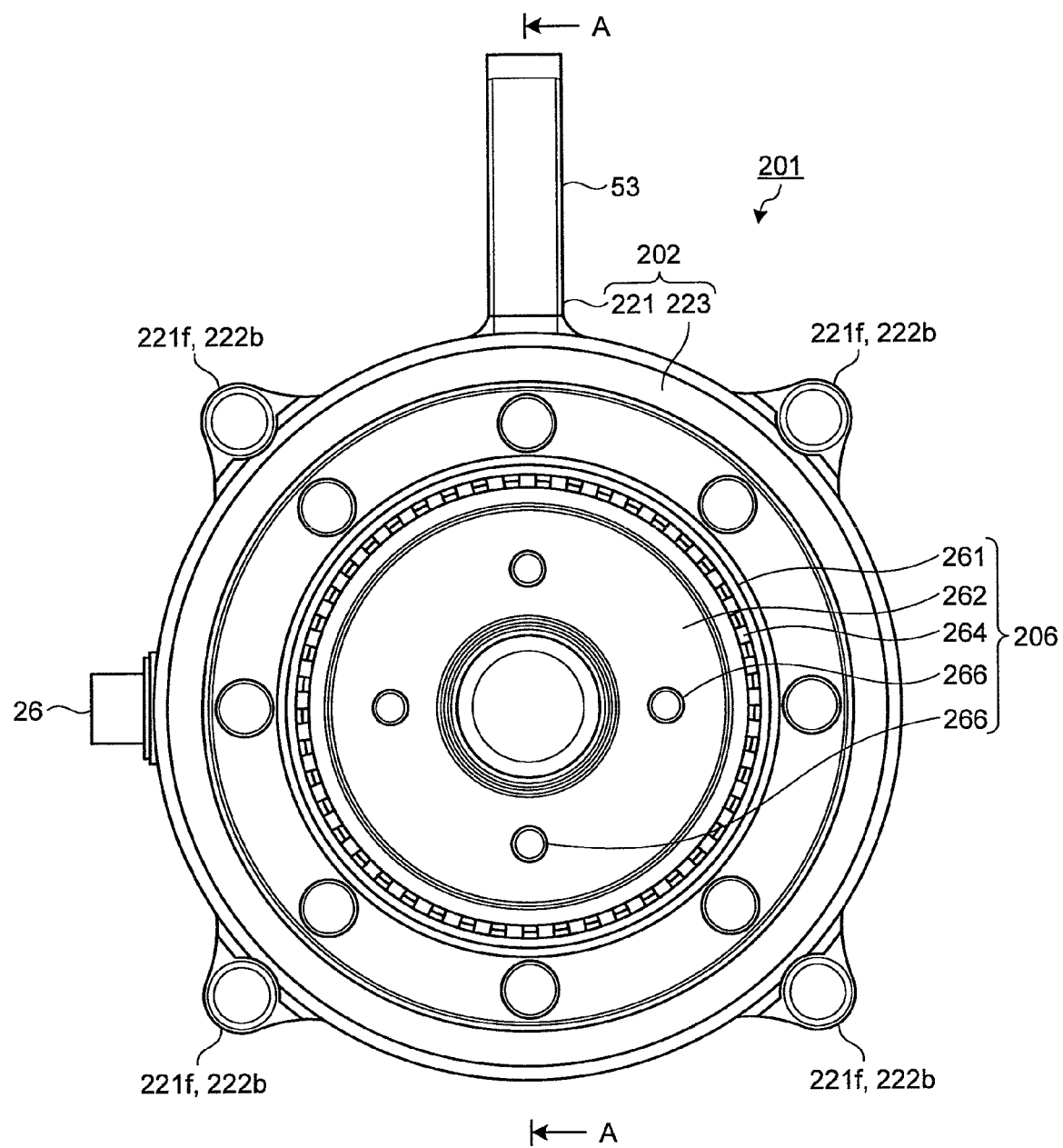
FIG. 13 is a front view illustrating an electric vehicle driving device according to a third embodiment.
Figure 14:
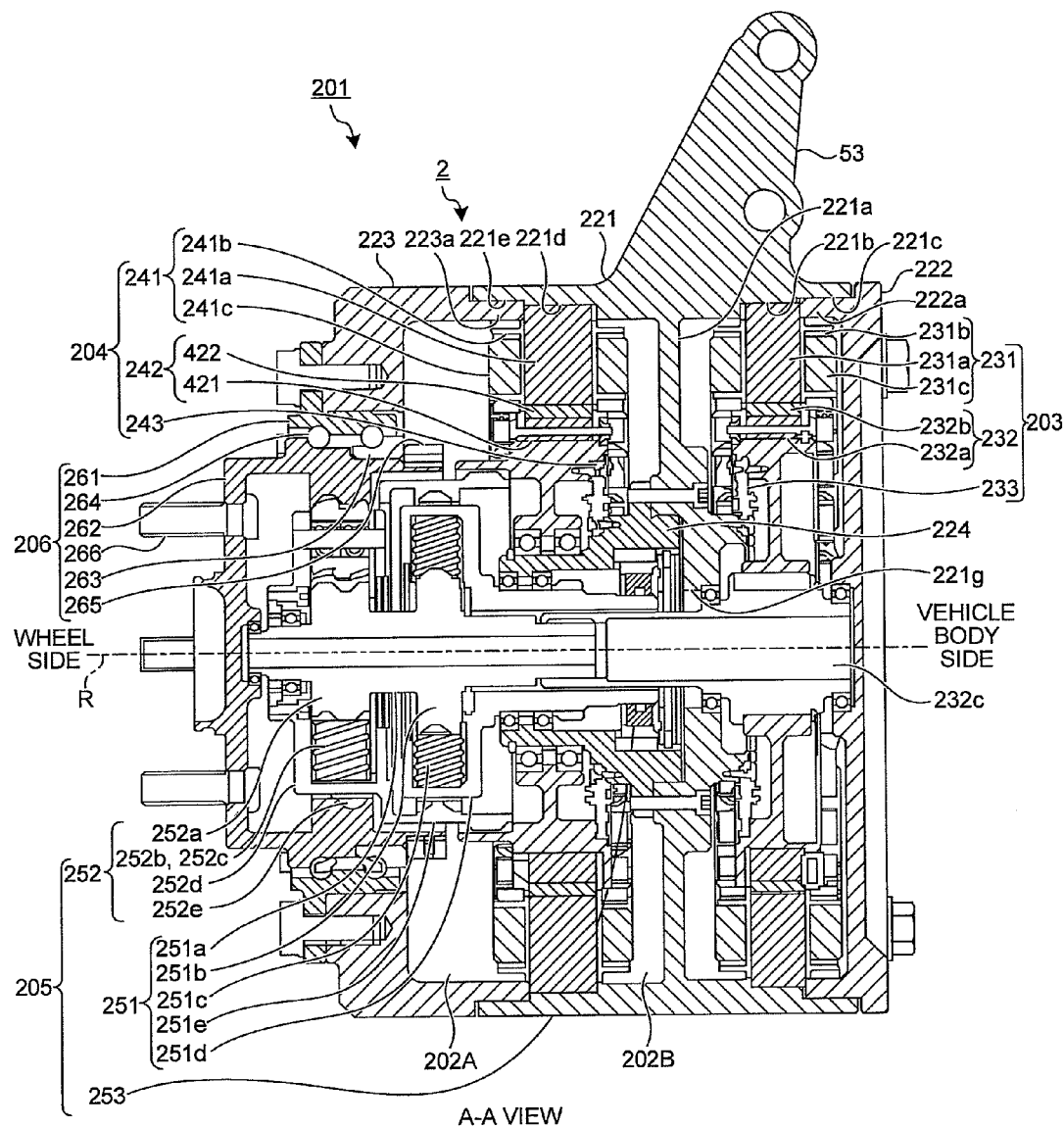
FIG. 14 is a cross-sectional view taken along the line A-A of the electric vehicle driving device described in FIG. 13.
Figure 15:
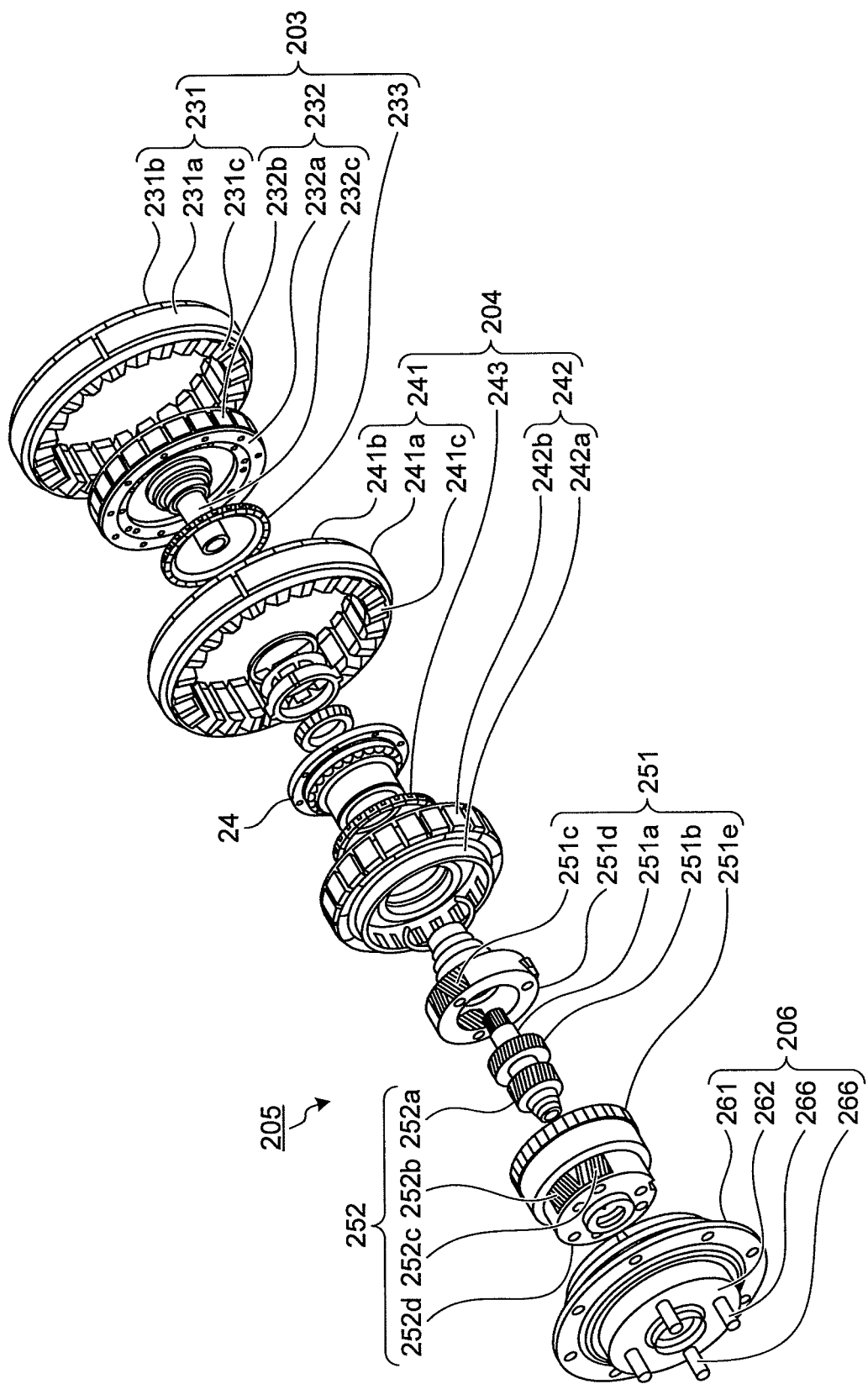
FIG. 15 is a perspective view illustrating an assembled electric vehicle driving device described in FIG. 13.
Figure 16:
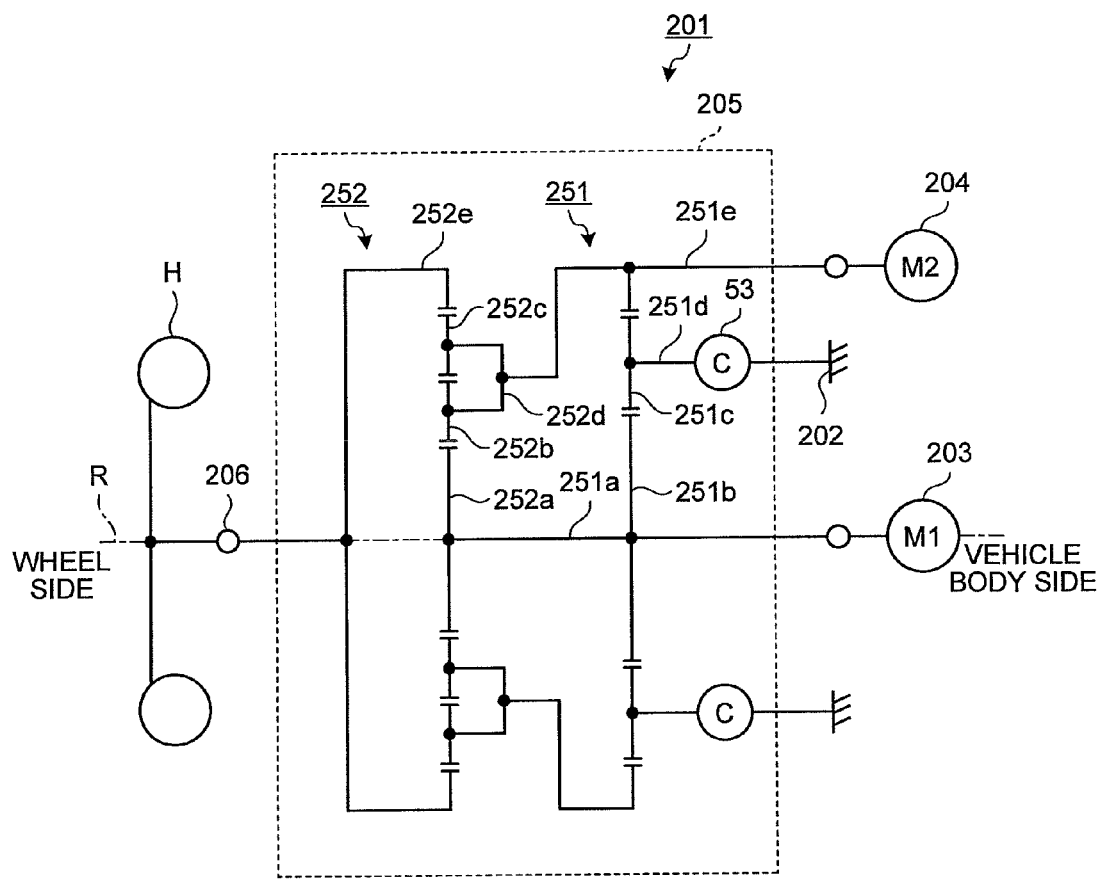
FIG. 16 is a skeleton diagram illustrating the electric vehicle driving device described in FIG. 13.

FIG. 13 is a front view illustrating an electric vehicle driving device according to a third embodiment. FIG. 14 is a cross-sectional view taken along the line A-A of the electric vehicle driving device described in FIG. 13. FIG. 15 is a perspective view illustrating an assembled electric vehicle driving device described in FIG. 13. FIG. 16 is a skeleton diagram illustrating the electric vehicle driving device described in FIG. 13.

An electric vehicle driving device 201 serving as a wheel hub motor is applied to, for example, a driving device of an electric vehicle such as an electric automobile, a hybrid automobile, and an electric four-wheel-drive vehicle, and more particularly, to a wheel hub motor including a shift mechanism with a planetary gear mechanism.

The electric vehicle driving device 201 includes a casing 202, a first motor 203, a second motor 204, a shift mechanism 205, and a wheel bearing 206 (refer to FIGS. 13 and 14).

The casing 202 is a casing that accommodates the first motor 203, the second motor 204, and the shift mechanism 205. The casing 202 includes a first casing 221, a second casing 222, a third casing 223, and a fourth casing 224, and is formed as an assembly thereof. The first casing 221 is formed as a cylindrical member, and includes a partition wall portion 221a formed at the inner peripheral surface thereof. Further, a communication hole 221g is an opening formed in the partition wall portion 221a. The second casing 222 is formed as a cover member, is fitted to the vehicle-body-side opening of the first casing 221, and is fixed thereto by fastening a bolt. The third casing 223 is formed as an annular member, is fitted to the wheel-side opening of the first casing 221, and is fixed thereto by fastening a bolt. Therefore, the inside of the casing 202 is provided with a first motor chamber 202A which is partitioned by the partition wall portion 221a of the first casing 221 and the second casing 222, and the second motor chamber 202B which is partitioned by the partition wall portion 221a and the third casing 223. The fourth casing 224 is formed as an annular member with a flange portion, and the flange portion is fixed to the partition wall portion 221a of the first casing 221 by fastening the bolt.

In the embodiment, the casing 202 includes a rib-shaped shock absorber attachment portion 53 formed at the upper portion of the first casing 221, and a shock absorber (not shown) of a vehicle is fixed to the shock absorber attachment portion 53 by fastening a bolt. The partition wall portion 221a of the first casing 221 is disposed directly below the shock absorber attachment portion 53 of the shock absorber (the range within the cross-section of the base, and substantially the same position with respect to the radial direction of the first casing 221). In such a configuration, a load of a vehicle body is transmitted from the shock absorber to the wheel through the casing 202. At this time, a large load acts on the casing 202 (the body portion of the first casing 221) in the stroke direction of the shock absorber. Therefore, since the partition wall portion 221a is disposed directly below the shock absorber attachment portion 53 of the shock absorber so that the rigidity of the casing 202 against the load from the shock absorber improves.

Further, in the embodiment, the casing 202 includes a plurality of waterproof panel connectors 226 at the side portion of the first casing 221. An external power supply (not shown) of the casing 202 is connected to the first motor 203 and the second motor 204 inside the casing 202 through the waterproof panel connectors 226. The partition wall portion 221a of the first casing 221 is provided with the communication hole 221g in which an output shaft 232c of the first motor 203, an interconnection for power supply or signal transmission, and a pipe of lubricant or cooling oil are disposed.

The first motor 203 and the second motor 204 are power sources of the electric vehicle driving device 201, and are operated by receiving electric power from the external power supply of the casing 202. The first motor 203 is accommodated and held in the first motor chamber 202A (the vehicle-body-side chamber of the vehicle) of the casing 202, and the second motor 204 is accommodated and held in the second motor chamber 202B (the wheel-side chamber of the vehicle) of the casing 202. The structure for holding the first motor 203 and the second motor 204 will be specifically described later.

The first motor 203 includes a stator 231, a rotor 232, and a resolver 233, and is held and fixed to the casing 202 (the first casing 221 and the second casing 222) by the stator 231 (refer to FIGS. 14 and 15). The stator 231 includes a stator core 231a, a plurality of coils 231b, and a plurality of insulators 231c. The stator 231 has a configuration in which each coil 231b is wound around the stator core 231a having an annular structure through the insulator 231c. The rotor 232 includes a rotor core 232a, a plurality of magnets 232b, and an output shaft 232c. The rotor 232 has a configuration in which each magnet 232b is arranged on the outer periphery of the rotor core 232a having an annular structure and the output shaft 232c is fitted into the center of the rotor core 232a. The output shaft 232c of the rotor 232 protrudes to pass through the communication hole 221g of the partition wall portion 221a of the first casing 221 and to be inserted into the second motor chamber 202B of the casing 202, and is rotatably supported and disposed in the partition wall portion 221a using a bearing. The output shaft 232c of the rotor 232 is connected to the shift mechanism 205 (a sun gear shaft 251a of the first gear mechanism 251). The resolver 233 is a sensor that detects a rotary angle of the first motor 203 (the rotor 232). When the rotor 232 turns in accordance with electric power supplied to the stator 231, the first motor 203 outputs the driving torque to the shift mechanism 205 through the output shaft 232c.

The second motor 204 includes a stator 241, a rotor 242, and a resolver 243, and the stator 241 is held and fixed to the casing 202 (the first casing 221 and the third casing 223) (refer to FIGS. 14 and 15). The stator 241 includes a stator core 241a, a plurality of coils 241b, and a plurality of insulators 241c. The stator 241 has a configuration in which each coil 241b is wound on the stator core 241a having an annular structure through the insulator 241cn. The rotor 242 has a configuration in which each magnet 242b is disposed in the outer periphery of the rotor core 242a having an annular structure. The rotor 242 is rotatably assembled to the outer periphery of the fourth casing 224 through a bearing, and the end thereof is connected to the shift mechanism 205 (a ring gear 251e of the first gear mechanism 251 and a carrier 252d of the second gear mechanism 252). The resolver 243 is a sensor that detects a rotary angle of the second motor 204 (the rotor 242). When the rotor 242 rotates in accordance with electric power supplied to the stator 241, the second motor 204 outputs the driving torque to the shift mechanism 205.

In the embodiment, the output shaft 232c of the first motor 203 and the rotor 242 of the second motor 204 are disposed on the same axis, and rotate about the common axis R serving as the rotary axis.

The shift mechanism 205 is a mechanism that changes driving torque from the first motor 203 and the second motor 204 through a speed change operation, and transmits the torque to the wheel bearing 206 (a first inner race 262). The shift mechanism 205 includes a first gear mechanism 251, a second gear mechanism 252, and a clutch mechanism 253, and is accommodated in the second motor chamber 202B of the casing 202.

The first gear mechanism 251 is a planetary gear mechanism of single pinion type, and includes a sun gear shaft 251a, a sun gear 251b, a pinion gear 251c, a carrier 251d, and a ring gear 251e. One end (a vehicle-body-sided end) of the sun gear shaft 251a is fitted and connected to the output shaft 232c of the first motor 203, and the other end (the wheel-side end) is rotatably supported at the first inner race 262 of the wheel bearing 206 so as to rotate about the axis R serving as the rotary axis. The sun gear 251b is formed in the sun gear shaft 251a, and turns along with the sun gear shaft 251a about the axis R serving as the rotary axis. The pinion gear 251c is a gear meshing with the sun gear 251b, and is held by the carrier 251d. The carrier 251d holds the pinion gear 251c, rotatably and revolvably about the axis R. One end of the carrier 251d is disposed at the outer periphery of the sun gear shaft 251a and the inner periphery of the fourth casing 224, and is supported rotatably about the axis R serving as the rotary axis. The ring gear 251e is a gear meshing with the pinion gear 251c, and is supported rotatably about the axis R serving as the rotary axis. Further, the ring gear 251e is connected to the rotor 242 of the second motor 204.

The second gear mechanism 252 is a planetary gear mechanism of double pinion type, and includes a sun gear 252a, a first pinion gear 252b, a second pinion gear 252c, a carrier 252d, and a ring gear 252e. The sun gear 252a is integrally formed with the sun gear shaft 251a together with the sun gear 251b of the first gear mechanism 251, and is connected to the output shaft 232c of the first motor 203. The first pinion gear 252b is a gear meshing with the sun gear 252a. The second pinion gear 252c is a gear meshing with the first pinion gear 252b. The carrier 252d respectively holds the first pinion gear 252b and the second pinion gear 252c rotatably and revolvably about the axis R. The carrier 252d is rotatably supported on the sun gear shaft 251a about the axis R serving as the rotary axis. The carrier 252d is integrally formed with the ring gear 251e of the first gear mechanism 251, and is connected to the rotor 242 of the second motor 204 together with the ring gear 251e. The ring gear 252e is a gear meshing with the second pinion gear 252c. The ring gear 252e is fixed by being integrated with the first inner race 262 of the wheel bearing 206.

The clutch mechanism 253 is a one-way clutch mechanism, and is formed as, for example, a cam clutch mechanism. The clutch mechanism 253 is fixed to the fourth casing 224, and is disposed so that the carrier 251d of the first gear mechanism 251 may engage with or disengage from the casing 202. The clutch mechanism 253 becomes an engagement state (a first speed change state) due to a reaction force from the carrier 252d of the second gear mechanism 252 when the first motor 203 generates a driving torque in a direction in which the vehicle advances and the second motor 204 idly rotates. On the other hand, the clutch mechanism 253 becomes a disengagement state (a second speed change state) due to a rotational torque with respect to the casing 202 of the carrier 251d of the first gear mechanism 251 acting in the opposite direction of the first speed change state when both the first motor 203 and the second motor 204 generate a driving torque.

In the embodiment, a cam clutch mechanism is adopted as the clutch mechanism 253. In such a configuration, since the engagement and disengagement operations of the clutch mechanism 253 may be manually controlled by driving the second motor 204, an actuator for driving the clutch mechanism 253 may not be provided. Accordingly, the configuration of the electric vehicle driving device 201 may be simplified.

The wheel bearing 206 is a bearing of a wheel (not shown) of a vehicle, and includes an outer race 261, a first inner race 262, a second inner race 263, a plurality of rolling elements 264, and a locknut 265 (refer to FIGS. 13 to 15). The outer race 261 is a bearing of the first inner race 262 and the second inner race 263. The outer race 261 is fitted into the wheel-side opening of the third casing 223 and is fixed thereto through eight bolts. The first inner race 262 is formed as a bottomed cylindrical member, and is inserted into the outer race 261 while the bottom surface thereof faces the wheel, so as to be rotatably supported about the axis R serving as the rotary axis. Four stud bolts 266 are attached to the first inner race 262, and the wheel of the vehicle is fixed to the first inner race 262 through the stud bolt 266 and the nut (not shown). The first inner race 262 is fixed to the ring gear 252e of the second gear mechanism 252, and integrally rotates with the ring gear 252e. The second inner race 263 is an annular member which is disposed at the inner periphery of the outer race 261 and the outer periphery of the first inner race 262. The plurality of rolling elements 264 are disposed between the orbit surfaces of the outer race 261 and the first inner race 262 and between the orbit surfaces of the outer race 261 and the second inner race 263, and is supported rotatably and revolvably about the axis R. The locknut 265 is disposed at the vehicle-body-side end of the first inner race 262, and applies a preload to the first inner race 262 to improve rigidity of the first inner race 262.

In the electric vehicle driving device 201, when the first motor 203 and the second motor 204 generate a driving torque, the driving torque is transmitted to the wheel bearing 206 through the speed change operation by the shift mechanism 205 (refer to FIG. 16). Accordingly, the wheel H rotates, so that the vehicle runs.

The electric vehicle driving device 201 may realize two speed change states, the first speed change state and the second speed change state. The first speed change state is a so-called low gear state, and is used at the time of, for example, starting the vehicle or going an uphill. On the other hand, the second speed change state is used for, for example, a normal driving mode.

In the first speed change state, the first motor 203 generates a driving torque and the second motor 204 idles, so that the clutch mechanism 253 becomes an engagement state. Then, in the first gear mechanism 251, the clutch mechanism 253 restrains the carrier 251d so as to prohibit the revolution of the pinion gear 251c. In this state, when the first motor 203 generates a driving torque, the driving torque is transmitted to the wheel bearing 206 through the sun gear shaft 251a and the second gear mechanism 252. At this time, a part of the driving torque is returned from the carrier 252d of the second gear mechanism 252 to the sun gear 251b of the first gear mechanism 251 through the ring gear 251e and the pinion gear 251c of the first gear mechanism 251. Then, a part of the driving torque is transmitted to the wheel bearing 206 through the sun gear shaft 251a and the second gear mechanism 252. Accordingly, the driving torque is amplified, so that the larger speed change ratio is realized.

In the second speed change state, the first motor 203 and the second motor 204 generate a driving torque, so that the clutch mechanism 253 becomes a disengagement state. Then, in the first gear mechanism 251, the clutch mechanism 253 releases the carrier 251d so as to permit the revolution of the pinion gear 251c, and thus, the relative rotation between the sun gear 251b and the ring gear 251e of the first gear mechanism 251 is permitted. In this state, when the second motor 204 changes the driving torque, the speed change ratio changes. Accordingly, since the speed change ratio may be continuously changed, the number of rotations of the motor does not increase in proportion to the vehicle speed, and friction loss may be particularly reduced in the case of a rapid cruise mode.

Furthermore, in the embodiment, the first motor 203 and the second motor 204 are disposed on the same axis R, and are respectively connected to the shift mechanism 205 (refer to FIGS. 14 and 15). In such a configuration, for example, even when the capacity of the casing 202 is small as in the wheel hub motor, this is desirable in that the first motor 203 and the second motor 204 may be efficiently disposed inside the casing 202. However, the invention is not limited thereto, but a configuration may be adopted in which the first motor 203 and the second motor 204 are disposed on different axes and are connected to the shift mechanism 205 through a transmission mechanism such as a gear (not shown).

[Motor Support Structure]

Figure 17:
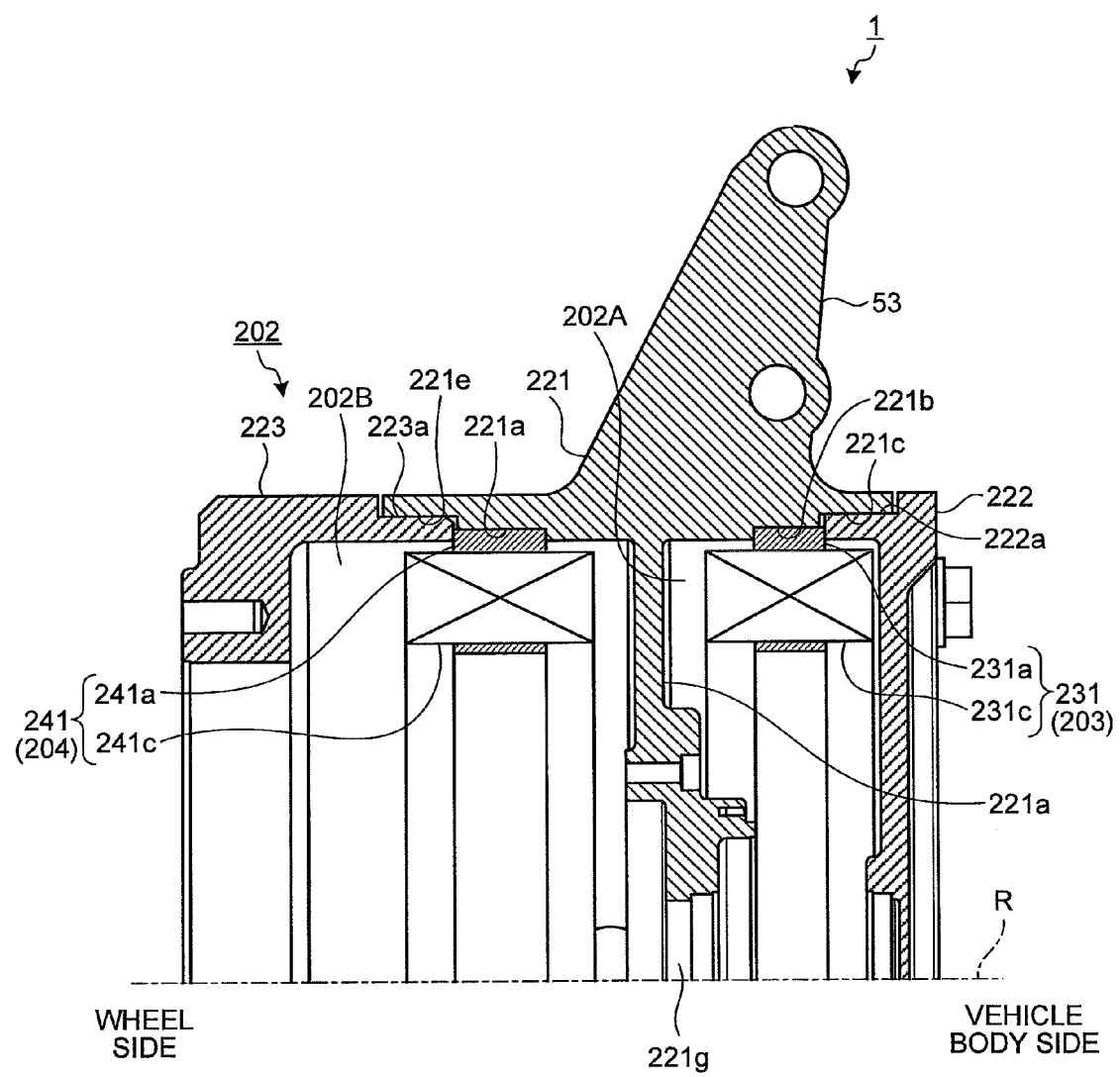
FIG. 17 is a cross-sectional view illustrating a motor holding structure of the electric vehicle driving device according to the third embodiment.
Figure 18:
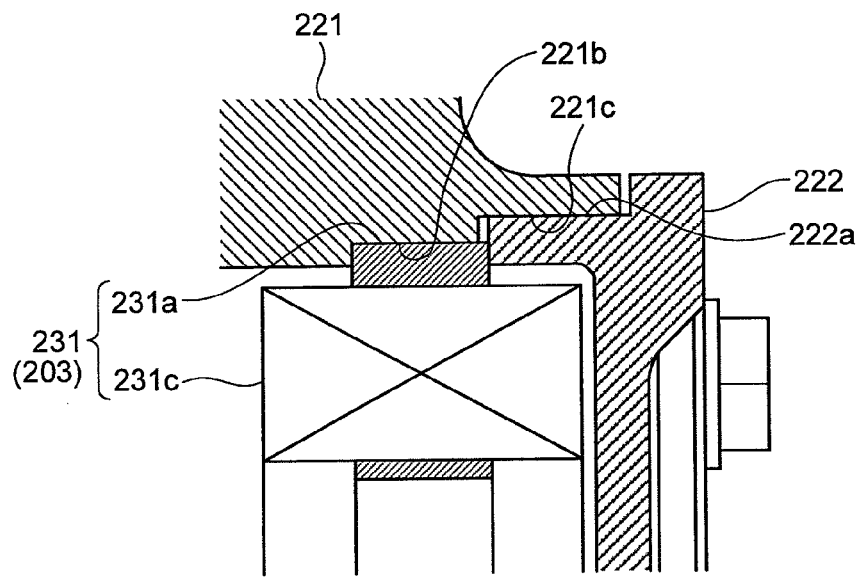
FIG. 18 is an enlarged view illustrating the motor holding structure described in FIG. 17.
Figure 19:
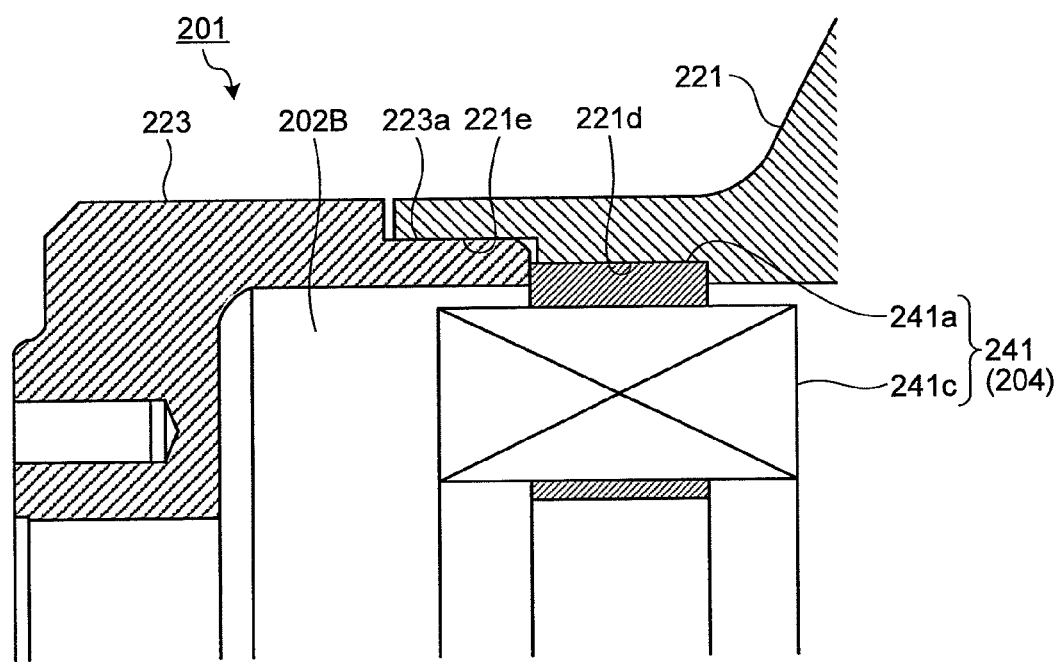
FIG. 19 is an enlarged view illustrating the motor holding structure described in FIG. 17.
Figure 20:
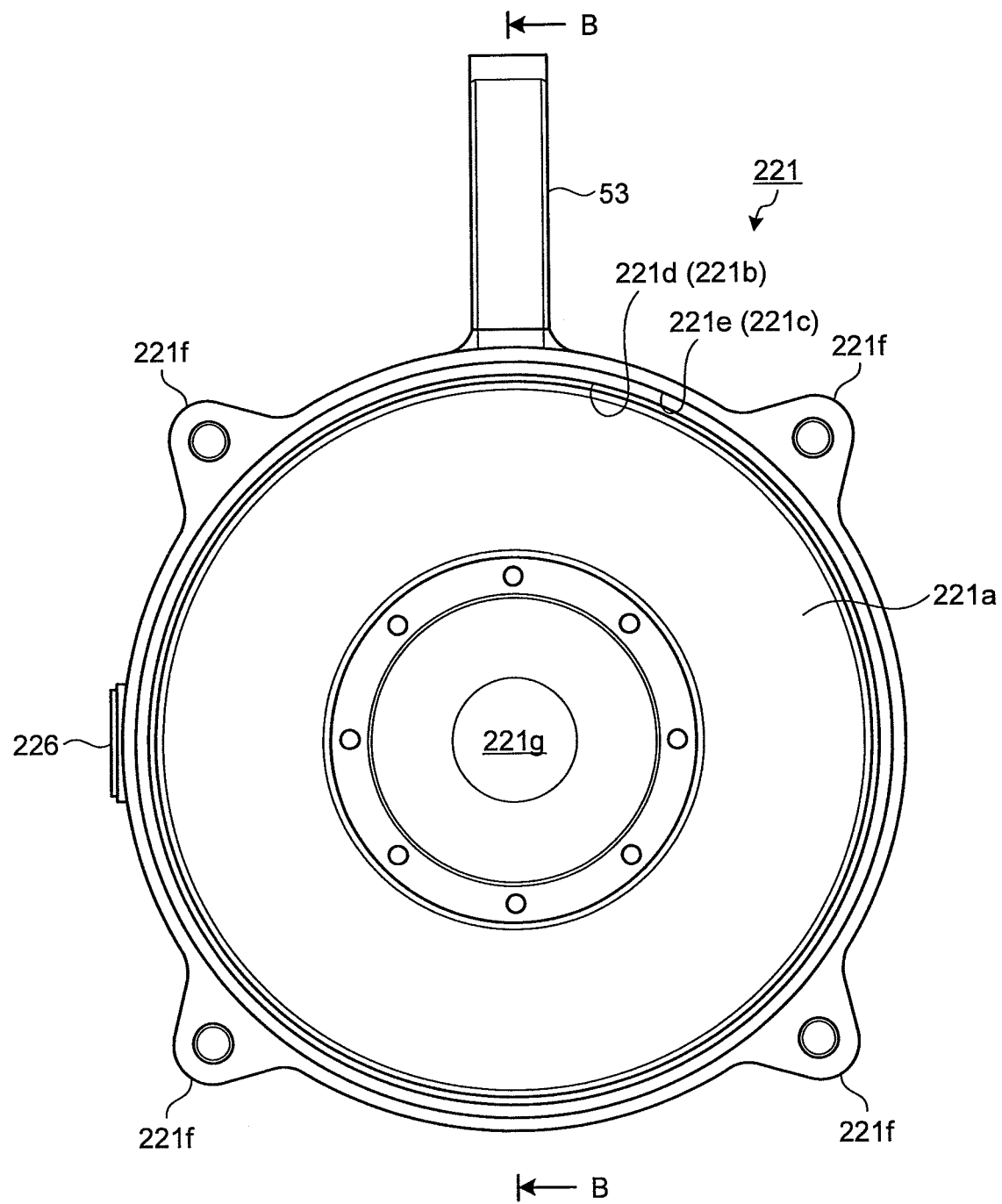
FIG. 20 is a front view illustrating a first casing of the electric vehicle driving device described in FIG. 17.
Figure 21:
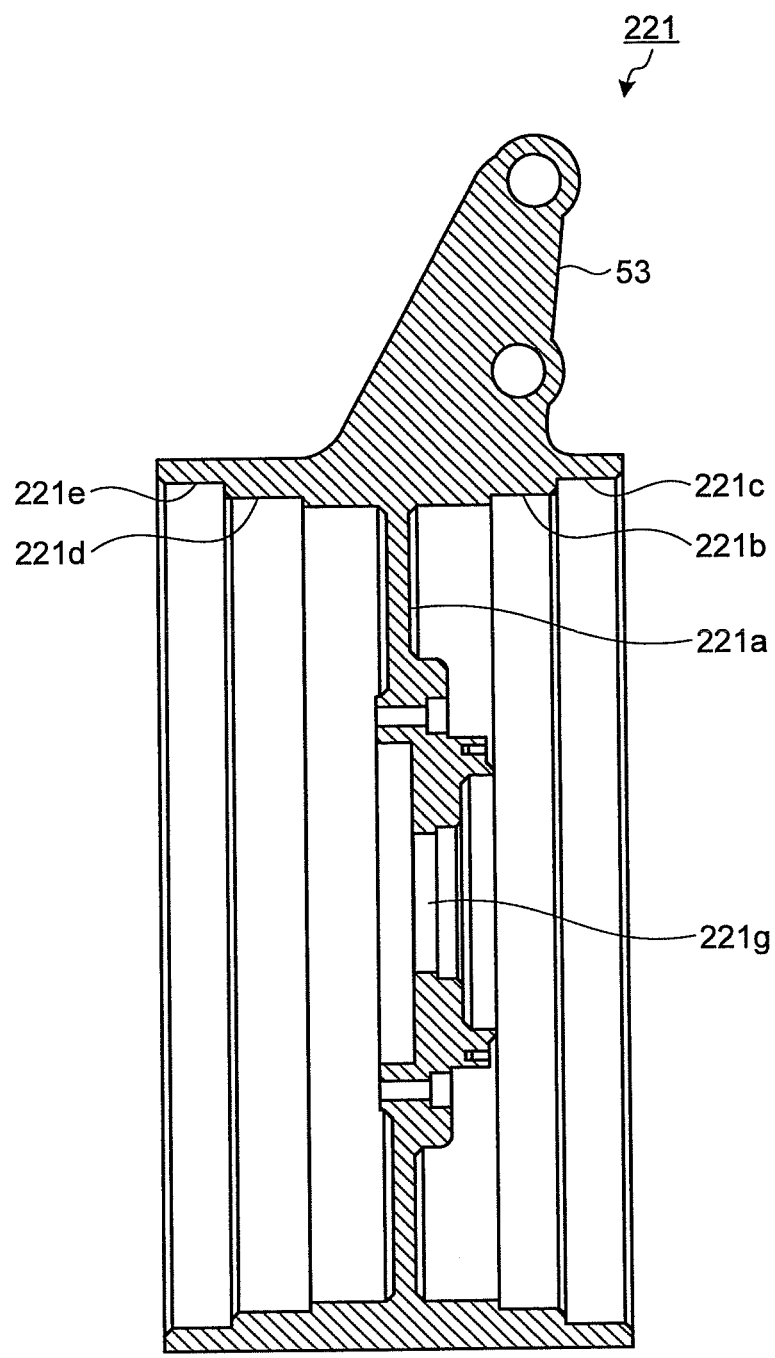
FIG. 21 is a cross-sectional view taken along the line B-B of the electric vehicle driving device described in FIG. 17.
Figure 22:
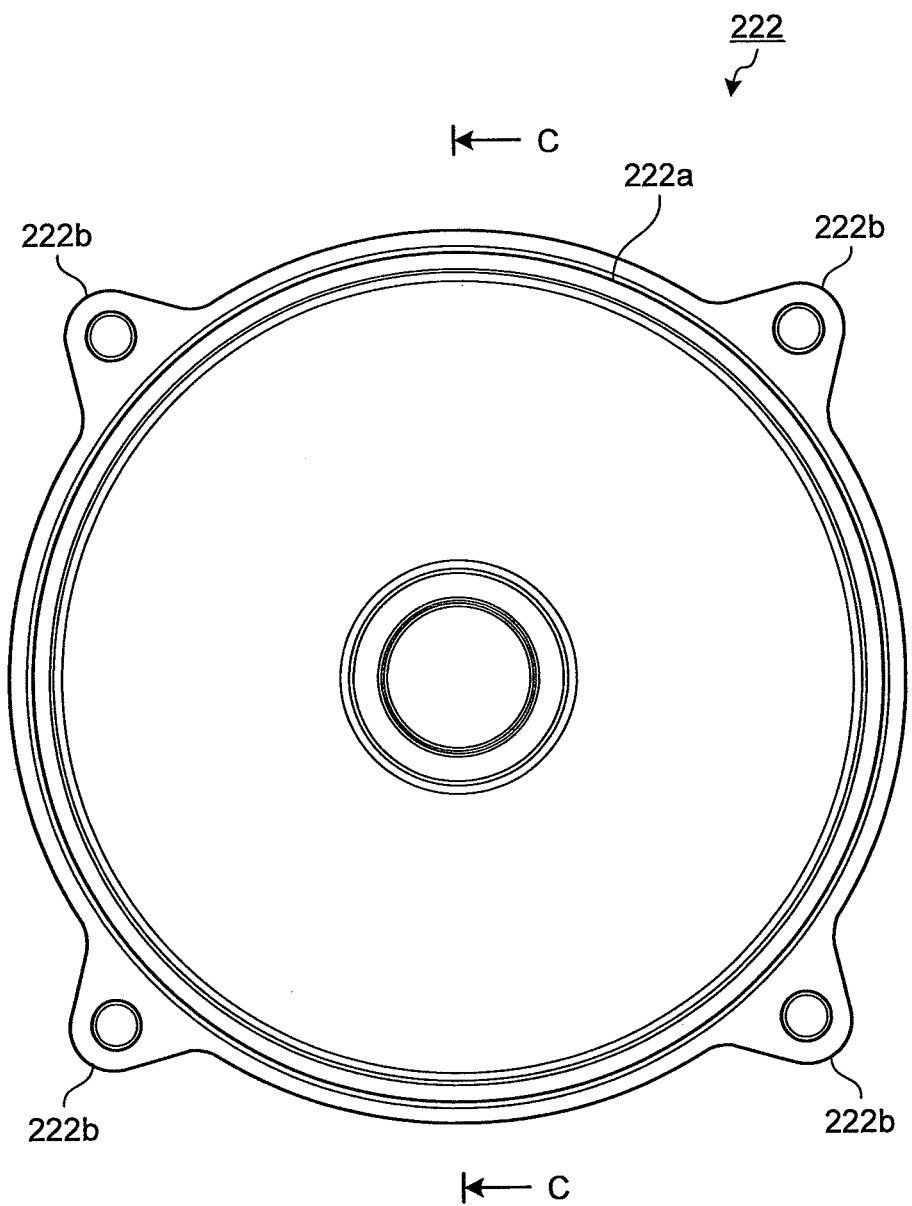
FIG. 22 is a front view illustrating a second casing of the electric vehicle driving device described in FIG. 17.
Figure 23:
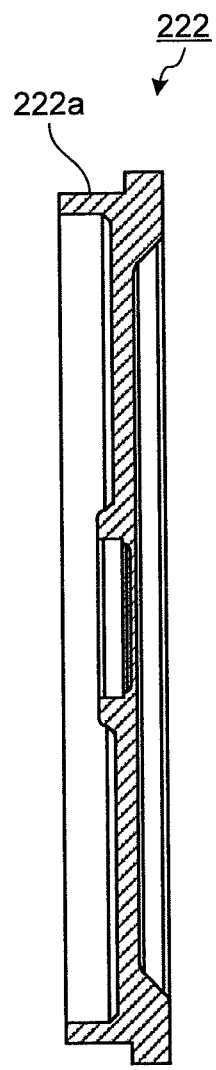
FIG. 23 is a cross-sectional view taken along the line C-C of the second casing of the electric vehicle driving device described in FIG. 17.
Figure 24:
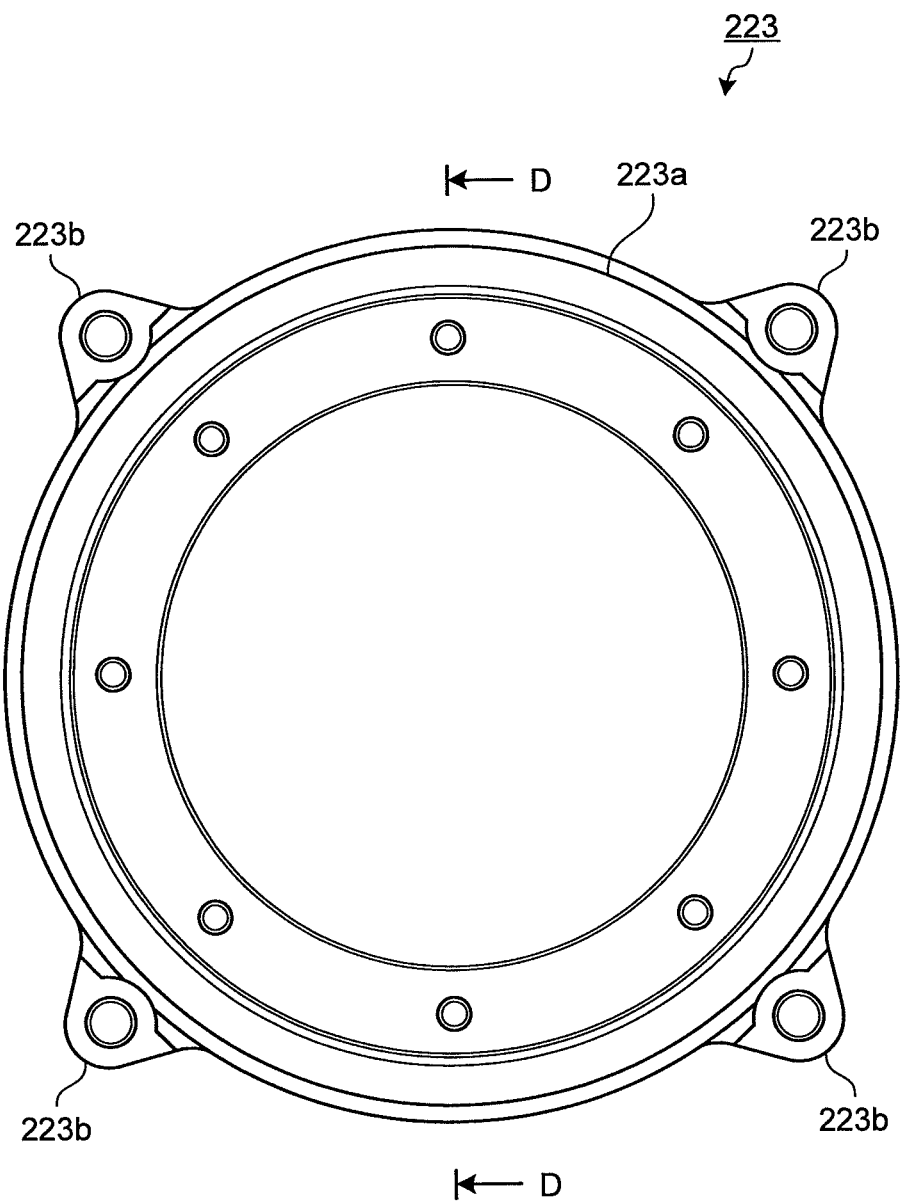
FIG. 24 is a front view illustrating a third casing of the electric vehicle driving device described in FIG. 16.
Figure 25:
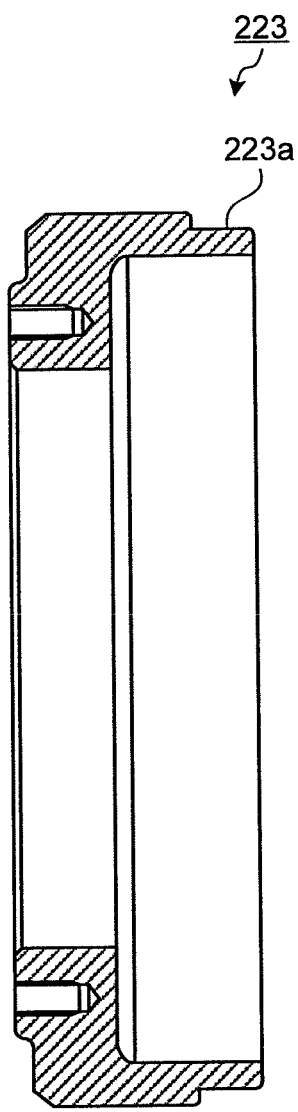
FIG. 25 is a cross-sectional view taken along the line D-D of the third casing of the electric vehicle driving device described in FIG. 16.
Figure 26:
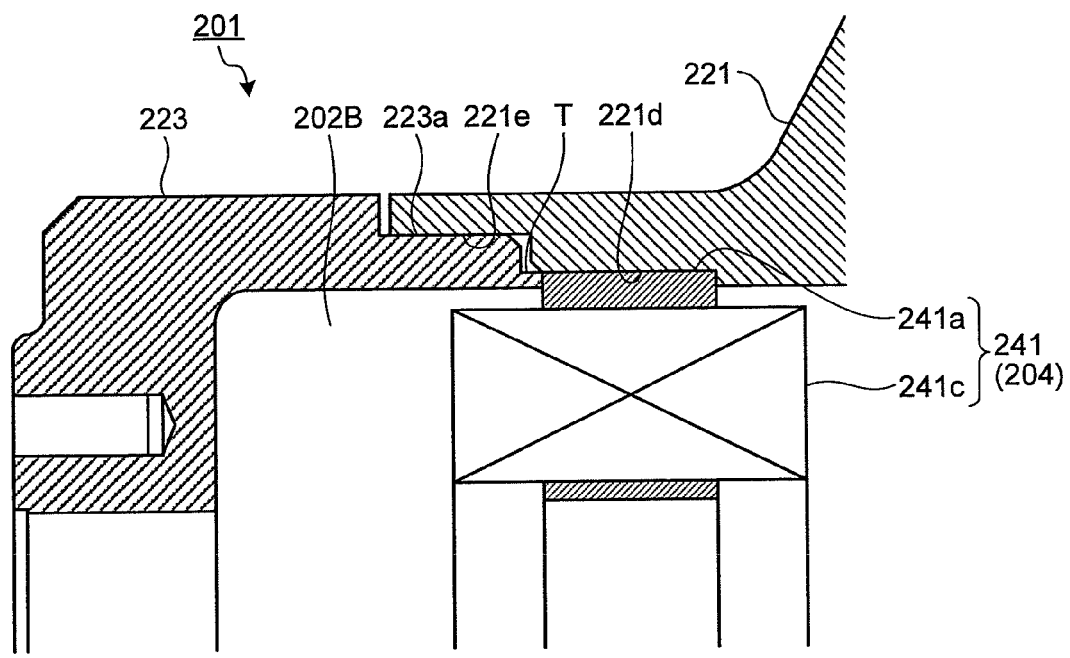
FIG. 26 is an enlarged view illustrating a modified example of the motor holding structure described in FIG. 17.

FIG. 17 is a cross-sectional view illustrating a motor holding structure of the electric vehicle driving device according to the third embodiment. FIGS. 18 and 19 are enlarged views illustrating the motor holding structure described in FIG. 17. In these drawings, FIG. 18 illustrates a structure for holding the first motor 203, and FIG. 19 illustrates a structure for holding the second motor 204. FIGS. 20 and 21 are a front view (FIG. 20) illustrating the first casing of the electric vehicle driving device described in FIG. 17 and a cross-sectional view (FIG. 21) taken along the line B-B. FIGS. 22 and 23 are a front view (FIG. 22) illustrating the second casing of the electric vehicle driving device described in FIG. 17 and a cross-sectional view (FIG. 23) taken along the line C-C. FIGS. 24 and 25 are a front view (FIG. 24) illustrating the third casing of the electric vehicle driving device described in FIG. 16 and a cross-sectional view (FIG. 25) taken along the line D-D. FIG. 26 is an enlarged view illustrating a modified example of the motor holding structure described in FIG. 17.

The electric vehicle driving device 201 has the following motor holding structure. That is, as described above, the casing 202 has a structure in which the casing may be separated into a first casing 221, a second casing 222, and a third casing 223 (refer to FIGS. 20 to 25). Further, the casing 202 includes the first motor chamber 202A which is partitioned by the partition wall portion 221a of the first casing 221 and the second casing 222, and the second motor chamber 202B which is portioned by the partition wall portion 221a and the third casing 223. The first motor 203 is accommodated in the first motor chamber 202A, and is held by being interposed between the first casing 221 and the second casing 222 (refer to FIGS. 17 and 18). The second motor 204 is accommodated in the second motor chamber 202B, and is held by being interposed between the first casing 221 and the third casing 223 (refer to FIGS. 17 and 19).

For example, in the embodiment, the first casing 221 is formed as a cylindrical member, and the inside thereof is divided by the partition wall portion 221a (refer to FIGS. 20 and 21). The second casing 222 is attached to the one-side (vehicle-body side) opening of the first casing 221, and the third casing 223 is attached to the other-side (wheel-side) opening, thereby forming the casing 202 (refer to FIG. 17). Further, in the first casing 221, the inner diameter surface of the one-side opening is provided with a first motor insertion portion 221b for inserting the first motor 203 and a fitting portion 221c for fitting the second casing 222 (refer to FIG. 21). Further, in the first casing 221, the inner diameter surface of the other-side opening is provided with a second motor insertion portion 221d for inserting the second motor 204 and a fitting portion 221e for fitting the third casing 223. Specifically, with the cutting work, the inner peripheral surface of the first casing 221 is widened in a step shape so as to form the first motor insertion portion 221b (the second motor insertion portion 221d), and the inlet portion of the first motor insertion portion 221b (the second motor insertion portion 221d) is widened in a step shape so as to form the fitting portion 221c (221e). For this reason, the inside of the first casing 221 is provided with a step portion (a stepwise inner diameter portion) which is widened in two stages on the basis of the inner diameter surface having the partition wall portion 221a by the first motor insertion portion 221b (the second motor insertion portion 221d) and the fitting portion 221c (221e). Further, the first motor insertion portion 221b and the fitting portion 221c in the side of the vehicle body, and the second motor insertion portion 221d and the fitting portion 221e in the side of the wheel are respectively disposed on the same axis R. Since the stator core 231a of the first motor 203 and the stator core 241a of the second motor 204 have the same diameter, the first motor insertion portion 221b and the second motor insertion portion 221d have the same diameter. The inner peripheral surface of the first motor insertion portion 221b (the second motor insertion portion 221d) is highly precisely processed so as to be fitted into the outer peripheral surface of the stator core 231a (241a) of the first motor 203 (the second motor 204) with a gap therebetween. The axial dimension of the first motor insertion portion 221b (the second motor insertion portion 221d) is set to be shorter than that of the stator core 231a (241a). Four flange portions 221f, each of which includes a female screw portion, are provided in the outer peripheral surface of the first casing 221 at the same interval.

The fitting surface between the second casing 222 and the first casing 221 is provided with a fitting portion 222a (refer to FIGS. 22 and 23). The fitting portion 222a has an outer diameter in which it is fitted into the fitting portion 221c of the first casing 221 with a gap therebetween. Further, the second casing 222 has an outer diameter in which the outer peripheral surface is flush with the first casing 221 while being fitted to the first casing 221. Further, a flange portion 222b including a bolt hole is provided in the outer peripheral surface of the second casing 222 so as to correspond to a flange portion 221f of the first casing 221.

In the same manner, the fitting surface between the third casing 223 and the first casing 221 is provided with a fitting portion 223a (refer to FIGS. 24 and 25). The fitting portion 223a has an outer diameter in which it is fitted into the fitting portion 221e of the first casing 221 with a gap therebetween. The third casing 223 has an outer diameter in which the outer peripheral surface is flush with the first casing 221 while being fitted into the first casing 221. A flange portion 223b having a bolt hole is provided in the outer peripheral surface of the third casing 223 so as to correspond to the flange portion 221f of the first casing 221.

In the assembly process of the electric vehicle driving device 201, first, the first motor 203 is fitted by inserting the stator core 231a of the stator 231 into the first motor insertion portion 221b of the first casing 221 (refer to FIGS. 17 and 18). At this time, since the stator core 231a is fitted into the first motor insertion portion 221b with a gap therebetween, it is displaceable to slide in the axial direction of the first motor 203. Further, the end surface of the stator core 231a is made to come into contact with the step portion on the inner side (the side of the partition wall portion 221a) of the first motor insertion portion 221b. In this state, since the axial dimension of the first motor insertion portion 221b is shorter than that of the stator core 231a, the end of the stator core 231a protrudes from the first motor insertion portion 221b into the fitting portion 221c.

Next, the second casing 222 is attached to the one side (vehicle body side) opening of the first casing 221 by fitting the fitting portion 222a into the fitting portion 221c of the first casing 221. At this time, the end surface of the second casing 222 (the opening edge of the fitting portion 222a) comes into contact with the end surface of the stator core 231a, so that the stator core 231a is held by being interposed between the first casing 221 (the step portion on the inner side of the first motor insertion portion 221b) and the end surface of the second casing 222. Accordingly, the radial position and the axial position of the first motor 203 are positioned with respect to the casing 202 (the first casing 221). In this state, the flange portion 221f of the first casing 221 and the flange portion 222b of the second casing 222 are fastened to each other by a bolt, so that the stator core 231a is held in a pressed state.

In the same manner, the second motor 204 is fitted by inserting the stator core 241a of the stator 241 into the second motor insertion portion 221d of the first casing 221 (refer to FIGS. 17 and 19). At this time, since the stator core 241a is fitted into the second motor insertion portion 221d with a gap therebetween, it is displaceable to slide in the axial direction of the second motor 204. Further, the end surface of the stator core 241a is made to come into contact with the step portion on the inner side (the side of the partition wall portion 221a) of the second motor insertion portion 221d. In this state, since the axial dimension of the second motor insertion portion 221d is shorter than that of the stator core 241a, the end of the stator core 241a protrudes from the second motor insertion portion 221d into the fitting portion 221e.

Next, the third casing 223 is attached to the one side (wheel side) opening of the first casing 221 by fitting the fitting portion 223a into the fitting portion 221e of the first casing 221. At this time, the end surface of the third casing 223 (the opening edge of the fitting portion 223a) come into contact with the end surface of the stator core 241a, so that the stator core 241a is held by being interposed between the first casing 221 (the step portion on the inner side of the second motor insertion portion 221d) and the end surface of the third casing 223. Accordingly, the radial position and the axial position of the second motor 204 are positioned with respect to the casing 202 (the first casing 221). In this state, the flange portion 221f of the first casing 221 and the flange portion 223b of the third casing 223 are fastened to each other by a bolt, so that the stator core 241a is held in a pressed state.

In the electric vehicle driving device 201, the first motor insertion portion 221b (the second motor insertion portion 221d) of the first casing 221 includes a key groove or a rotation stopper, and a rotation stopper or a key groove engaging therewith may be provided in the stator core 231a (241a) of the first motor 203 (the second motor 204) (not shown). In such a configuration, when the first motor insertion portion 221b (the second motor insertion portion 221d) is fitted into the stator core 231a (241a) with a gap therebetween, such a rotation stopper/key groove regulates the displacement of the first motor 203 (the second motor 204) with respect to the casing 202 in the rotation direction. Accordingly, the positioning state of the first motor 203 (the second motor 204) in the circumferential direction is appropriately maintained. The processing of the stator core 231a (241a) is carried out by, for example, press molding or wire cutting.

In the electric vehicle driving device 201, an abutting portion T may be formed at the end of the fitting portion 223a (222a) of the third casing 223 (the second casing 222) (refer to FIG. 26). Then, the third casing 223 (the second casing 222) may hold the stator core 241a (231a) by pressing the abutting portion T against the end surface of the stator core 241a (231a). Accordingly, even when the axial dimension of the second motor insertion portion 221d (the first motor insertion portion 221b) is shorter than that of the stator core 241a (231a), the stator core 241a (231a) may be appropriately held.

[Effect]

As described above, the electric vehicle driving device 201 includes the casing 202, and the first motor 203 and the second motor 204 assembled to the casing 202 (refer to FIG. 17). The casing 202 includes the first casing 221 with the first motor insertion portion 221b and the second motor insertion portion 221d which are separately provided (for example, on the vehicle body side and the wheel side of the vehicle in the setting state of the electric vehicle driving device 201) so as to respectively position the first motor 203 and the second motor 204, the second casing 222 and the third casing 223 which are attached to the first casing 221 (refer to FIGS. 20 to 25). The stator core 231a of the first motor 203 is positioned by being inserted into the first motor insertion portion 221b, and is held in a pressed state by the second casing 222 (refer to FIGS. 17 and 18). The stator core 241a of the second motor 204 is inserted and positioned into the second motor insertion portion 221d, and is held in a pressed state by the third casing 223 (refer to FIGS. 17 and 19).

In such a configuration, since the first casing 221 includes the first motor insertion portion 221b and the second motor insertion portion 221d which are separated from each other, the axial lengths of the first motor insertion portion 221b and the second motor insertion portion 221d may be shortened compared to the configuration in which the motor insertion portions are integrally formed with each other. Accordingly, since it is possible to decrease the size of the highly precise inner diameter processing area necessary for positioning the first motor 203 and the second motor 204 (the stator cores 231a and 241a), there is an advantage in that the casing 202 is easily processed. Further, since the fitting surface between the first motor 203 (the second motor 204) and the first motor insertion portion 221b (the second motor insertion portion 221d) is shortened, there is an advantage in that the assembly process of the first motor 203 (the second motor 204) is easily performed. Further, since the first motor insertion portion 221b and the second motor insertion portion 221d are separated from each other, there is an advantage in that the first motor 203 and the second motor 204 are fixed while ensuring the positioning precision thereof regardless of whether the stator cores 231a and 241a have the same diameter.

For example, in a configuration (not shown) in which the casing includes a motor insertion portion formed to be elongated toward one side, and the first motor and the second motor are sequentially inserted and assembled to the motor insertion portion, the configuration is not desirable in that it is difficult to highly precisely process the elongated motor insertion portion. Further, such a configuration is not desirable in that it is essential to firstly insert the inner-side motor into the casing for assembly in the assembly process of the device and the degree of freedom of the assembly procedure is low. Further, such a configuration is not desirable in that there is a need to halfway process the motor insertion portions so as to have different inner diameters when the outer diameter of the first motor (the stator core) is different from the outer diameter of the second motor (the stator core). On the other hand, in a configuration in which the outer diameter of the first motor and the outer diameter of the second motor are equal to each other, the configuration is not desirable in that there is a need to interpose a spacer between the motors.

In the electric vehicle driving device 201, since the first motor insertion portion 221b (the second motor insertion portion 221d) is formed by widening the inner diameter of the vehicle-body-side opening (the wheel-side opening) of the first casing 221 in a step shape, a step portion (a stepwise inner diameter) is formed on the inner side of the first motor insertion portion 221b (the second motor insertion portion 221d) (refer to FIG. 21). Then, the stator core 231a (241a) of the first motor 203 (the second motor 204) is held by being interposed between the step portion and the second casing 222 (the third casing 223) (refer to FIGS. 17 to 19). In such a configuration, the axial position of the stator core 231a (241a) is positioned by the step portion of the inner peripheral surface of the first casing 221 and the first motor insertion portion 221b (the second motor insertion portion 221d), and the radial position of the stator core 231a (241a) is positioned by the first motor insertion portion 221b (the second motor insertion portion 221d). Furthermore, the stator core 231a (241a) is interposed between the step portion and the second casing 222 (the third casing 223), so that the first motor 203 (the second motor 204) is stably held. Accordingly, there is an advantage in that the first motor 203 (the second motor 204) is stably held while being appropriately positioned to the casing 202.

In the electric vehicle driving device 201, the stator core 231a (241a) of the first motor 203 (the second motor 204) is inserted and fitted into the first motor insertion portion 221b (the second motor insertion portion 221d) with a gap therebetween (refer to FIGS. 18 and 19). In such a configuration, since it is possible to smoothly set the fitting condition of the stator core 231a (241a) and the first motor insertion portion 221b (the second motor insertion portion 221d), there is an advantage in that the assembly process of the first motor 203 (the second motor 204) is easily carried out. Even in such a case, since the stator core 231a (241a) is held to be pressed by the second casing 222 (the third casing 223), there is an advantage in that the first motor 203 (the second motor 204) is appropriately fixed.

For example, in a configuration (not shown) in which the stator core is fitted to the motor insertion portion by shrinkage fastening (for example, press-fitting, cold fitting, baking fitting, and the like), there is a need to highly precisely process the fitting surface of the motor insertion portion. However, in a configuration in which a stator core having a large diameter such as the wheel hub motor is provided, this is not desirable in that highly precise processing is difficult. Particularly, when the material (light metal such as aluminum) of the casing is different from the material (generally, a magnetic steel sheet) of the stator core, this is not desirable in that there is a concern that the fixation of the stator core may be loosened due to a different thermal expansion rate.

In the electric vehicle driving device 201, it is desirable that the key groove or the rotation stopper be provided in the outer peripheral surface of the stator core 231a (241a) of the first motor 203 (the second motor 204) (not shown). In such a configuration, the key groove or the rotation stopper of the stator core 231a (241a) engages with the rotation stopper or the key groove in the first motor insertion portion 221b (the second motor insertion portion 221d), so that the rotational displacement of the stator core 231a (241a) in the circumferential direction is prohibited. Accordingly, there is an advantage in that the stator core 231a (241a) is held in the manner non-rotatable relative to the casing 202.

In the electric vehicle driving device 201, the second casing 222 (the third casing 223) may include the abutting portion T, and the abutting portion T may be press-inserted into the stator core 231a (241a) of the first motor 203 (the second motor 204) so as to hold the stator core 231a (241a) (refer to FIG. 26). In such a configuration, for example, even when the axial dimension of the second motor insertion portion 221d (the first motor insertion portion 221b) is shorter than that of the stator core 241a (231a), there is an advantage in that the stator core 241a (231a) is appropriately held.

In the electric vehicle driving device 201, the first casing 221 includes the partition wall portion 221a dividing the first motor insertion portion 221b and the second motor insertion portion 221d (refer to FIGS. 17 and 21). In such a configuration, since the rigidity of the casing 202 is appropriately ensured by the partition wall portion 221a, there is an advantage in that the positioning state of the first motor 203 (the second motor 204) is appropriately ensured.

In the electric vehicle driving device 201, it is desirable that the partition wall portion 221a of the first casing 221 include the communication hole 221g for communicating the first motor insertion portion 221b and the second motor insertion portion 221d with each other (refer to FIGS. 17 and 21). In such a configuration, for example, the output shaft 232c of the first motor 203, the interconnection for power supply or signal transmission, and the pipe of lubricant or cooling oil may be disposed through the communication hole 221g of the partition wall portion 221a. Accordingly, there is an advantage in that the inner structure of the casing 202 is easily disposed.

In the electric vehicle driving device 201, in a configuration in which a shock absorber (not shown) is disposed at the outer periphery of the first casing 221, it is desirable that the partition wall portion 221a of the first casing 221 be disposed directly below the shock absorber. In such a configuration, since the rigidity of the casing 202 is appropriately ensured by the partition wall portion 221a, even when the load of the vehicle body is transmitted from the shock absorber to the casing 202, there is an advantage in that the positioning state of the first motor 203 (the second motor 204) is appropriate ensured.

The desirable aspect of the third embodiment is understood as follows. In the third embodiment, since the first motor insertion portion or the second motor insertion portion is formed by widening the inner diameter of the opening of the first casing in a step shape, thereby the step portion is formed on the inner side of the first motor insertion portion or the second motor insertion portion, and the stator core of the first motor or the stator core of the second motor is held by being interposed between the step portion and the second casing or the third casing.

In this aspect, the axial position of the stator core is positioned by the step portion of the inner peripheral surface of the first casing and the motor insertion portion, and the radial position of the stator core is positioned by the motor insertion portion. Furthermore, the motor is stably held by interposing the stator core between the step portion and the second casing (the third casing). Accordingly, there is an advantage in that the motor is stably held while being appropriately positioned with respect to the casing.

In the third embodiment, it is desirable that the stator core of the first motor or the stator core of the second motor be fitted and inserted into the first motor insertion portion or the second motor insertion portion with a gap therebetween (free fit).

In this aspect, since the fitting condition between the stator core and the motor insertion portion may be smoothly set, there is an advantage in that the motor assembly process is easily carried out. Further, even in such a case, since the stator core is held in a pressed state by the second casing (the third casing), there is an advantage in that the motor is appropriately fixed.

In the third embodiment, it is desirable that the stator core of the first motor or the stator core of the second motor include the key groove or the rotation stopper in the outer peripheral surface.

In this aspect, since the key groove or the rotation stopper of the stator core engages with the rotation stopper or the key groove in the side of the motor insertion portion, the rotational displacement of the stator core in the circumferential direction is prohibited. Accordingly, there is an advantage in that the stator core is held in a manner non-rotatable relative to the casing.

In the third embodiment, it is desirable that the second casing or the third casing include an abutting portion and the abutting portion be pressed against the stator core to hold the stator core.

In this aspect, for example, even when the axial dimension of the motor insertion portion is shorter than that of the stator core, there is an advantage in that the stator core is appropriately held.

In the third embodiment, it is desirable that the first casing include the partition wall portion dividing the first motor insertion portion and the second motor insertion portion from each other.

In this aspect, since the rigidity of the casing is appropriately ensured by the partition wall portion, there is an advantage in that the positioning state of the motor is appropriately ensured.

In the third embodiment, it is desirable that the partition wall portion include the communication hole for communicating the first motor insertion portion and the second motor insertion portion with each other.

In this aspect, for example, the output shaft of the first motor, the interconnection for power supply or signal transmission, and the pipe of lubricant or cooling oil may be disposed through the communication hole of the partition wall portion. Accordingly, there is an advantage in that the inner structure of the casing is easily disposed.

In the third embodiment, in a configuration in which the shock absorber is disposed at the outer periphery of the first casing, it is desirable that the partition wall portion be disposed directly below the shock absorber.

In this aspect, since the rigidity of the casing is appropriately ensured by the partition wall portion, even when the load of the vehicle body is transmitted from the shock absorber to the casing, there is an advantage in that the positioning state of the motor is appropriately ensured.

The configuration of the third embodiment may be appropriately applied to the embodiments below. The same configuration as that of the embodiment has the same effect.

Fourth Embodiment

Figure 27:
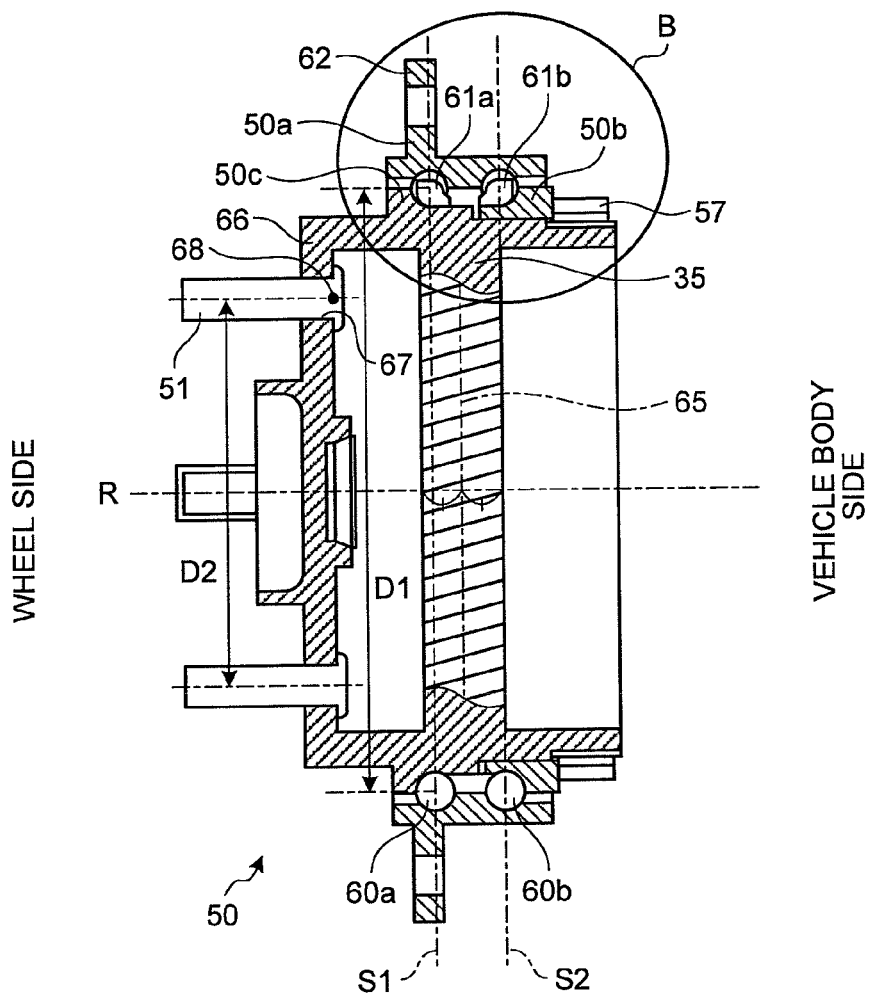
FIG. 27 is a cross-sectional view taken along the line A-A of FIG. 7 in a wheel bearing included in an electric vehicle driving device according to a fourth embodiment.
Figure 28:
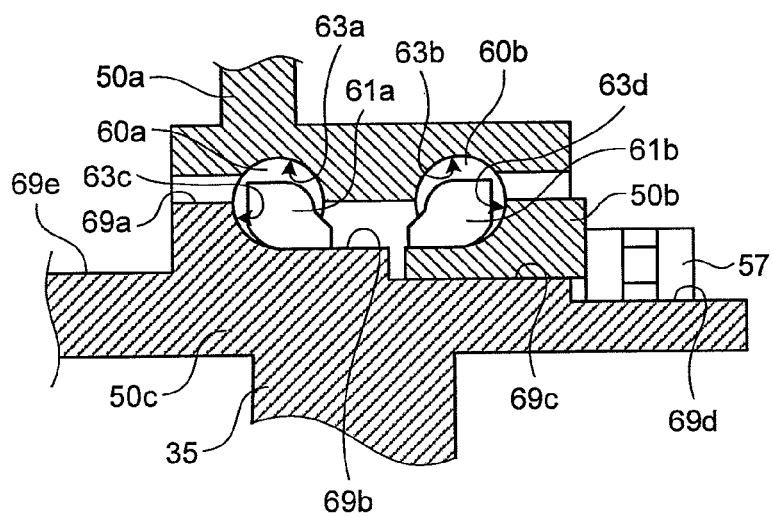
FIG. 28 is an enlarged view illustrating a part B of FIG. 27.

FIG. 27 is a cross-sectional view taken along the line A-A of FIG. 7 in a wheel bearing included in an electric vehicle driving device according to a fourth embodiment. FIG. 28 is an enlarged view illustrating a part B of FIG. 27. The electric vehicle driving device 10 includes the casing G, the first motor 11, the second motor 12, and the shift mechanism 13. The wheel bearing 50 serving as the bearing mechanism will be specifically described. The wheel bearing 50 included in the electric vehicle driving device 10 serving as the wheel hub motor according to the embodiment includes the outer race 50a, the first inner race 50c, the second inner race 50b, a plurality of first rolling elements 60a, a plurality of second rolling elements 60b, a first retainer 61a, and a second retainer 61b. An inner gear 35 formed in the first inner race 50c is a part of the second planetary gear mechanism 30 to be described later.

The outer race 50a has a cylindrical shape, and a flange portion 62 is formed at the outer periphery near the wheel-side end. The flange portion 62 is fixed to the casing G by fastening a bolt. Therefore, the outer race 50a is not rotatable.

Two rows of orbits are formed in the inner peripheral surface of the outer race 50a in the circumferential direction. The inner diameter of both ends of the outer race 50a is larger than the center portion thereof. A curved surface is formed at the boundary between the center portion and both ends in the circumferential direction. The first rolling elements 60a come into contact with the wheel-side curved surface, and the second rolling elements 60b come into contact with the vehicle-body-side curved surface of the electric vehicle. The wheel-side curved surface with which the first rolling elements 60a come into contact is a first orbit 63a, and the vehicle-body-side curved surface with which the second rolling elements come into contact is a second orbit 63b.

All of the first rolling elements 60a and the second rolling elements 60b are spherical bodies. The first rolling elements 60a and the second rolling elements 60b are separated from each other by the thick portion of the center portion of the outer race 50a, and are disposed at the same interval in the axial direction. The first retainer 61a retains the first rolling elements 60a, and the first rolling elements 60a revolve along the first orbit 63a while rotating. The second retainer 61b retains the second rolling elements 60b, and the second rolling elements 60b revolve along the second orbit 63b while rotating.

The outer peripheral surface 69e of the first inner race 50c faces the inner peripheral surface of the outer race 50a with the first rolling elements 60a and the second rolling elements 60b interposed therebetween. The outer diameter of the first inner race 50c decreases in three stages from the wheel side toward the vehicle body side. When the outer peripheral surfaces from the wheel side toward the vehicle body side are respectively assumed as a reference outer diameter surface 69a, a first-stage outer diameter surface 69b, a second-stage outer diameter surface 69c, and a minimal outer diameter surface 69d, a curved surface is formed at the boundary between the reference outer diameter surface 69a and the first-stage outer diameter surface 69b in the circumferential direction, and the first rolling elements 60a come into contact with the curved surface. The curved surface is a third orbit 63c.

The first inner race 50c includes a plurality of teeth protruding from the inner peripheral surface. The teeth are the inner gear 35. Since the inner gear 35 is integrally formed with the inner peripheral surface of the first inner race 50c, the axial length of the electric vehicle driving device 10 shown in FIGS. 7 and 8 may be shortened compared to a case in which the bearing and the gear are formed as separate members. Further, since the first inner race 50c and the inner gear 35 are integrally formed with each other instead of separate members, the strength of the first inner race 50c may improve and the dimensional precision may improve. Since the number of components of the wheel bearing 50 may be decreased, the manufacturing cost of the wheel bearing 50 may be reduced. Furthermore, the wheel bearing 50 may be decreased in size and weight.

A center 65 in the tooth width direction of the inner gear 35 is positioned between a surface S1 including the centers of the plurality of first rolling elements 60a and surface S2 including the centers of the plurality of second rolling elements 60b. Since the center 65 in the tooth width direction of the inner gear 35 is disposed in this manner, even when a load is applied to the wheel bearing 50 so that the shaft is inclined, the degree of the displacement of the inner gear 35 decreases and the load acting on the inner gear 35 may be reduced. That is, the rigidity of the wheel bearing 50 with respect to the displacement in the moment direction may be made to be large when a moment acts on the shaft.

The wheel-side end of the first inner race 50c is provided with a wheel support portion 66 which extends toward the rotary axis R of the first inner race 50c. In the embodiment, the wheel support portion 66 is formed in a shape which closes the wheel side of the first inner race 50c. As shown in FIG. 7, a plurality of bolt holes 67 are opened in the wheel support portion 66. The center of the bolt hole 67 is an attachment point 68 (refer to FIG. 7) formed in the wheel support portion 66 with respect to the wheel. The wheel is also provided with bolt holes which are provided as many as those of the wheel support portion 66. The bolt holes 67 of the wheel support portion 66 are overlapped the bolt holes of the wheel, and stud bolts 51 are inserted thereinto to be fastened by nuts. In the embodiment, although the bolt holes 67 are opened in the wheel support portion 66 and the stud bolts 51 are inserted into the bolt holes 67, the wheel support portion 66 and the stud bolts 51 may be integrally formed with each other. In this case, the center position of the stud bolt 51 is the attachment point formed in the wheel support portion 66 with respect to the wheel.

The inner peripheral surface of the second inner race 50b comes into contact with the outer peripheral surface 69e of the first inner race 50c. The second inner race 50b comes into contact with the second-stage outer diameter surface 69c in the outer peripheral surface 69e of the first inner race 50c. The outer peripheral surface of the second inner race 50b is provided with a concave curved surface which is smoothly connected to the first-stage outer diameter surface 69b of the first inner race 50c in the circumferential direction, and the second rolling elements 60b come into contact with the concave curved surface. The concave curved surface with which the second rolling elements 60b come into contact is a third orbit 63d.

A force toward the wheel is applied to the second inner race 50b by the locknut 57, so that an appropriate preload is applied to the wheel bearing 50 to improve the rigidity of the wheel bearing 50. Since the inner race is formed as two components consisted of the first inner race 50c and the second inner race 50b instead of a single component, an appropriate preload may be easily applied to the wheel bearing 50.

The pitch circle diameter D1 of the plurality of first rolling elements 60a is larger than the pitch circle diameter D2 of the plurality of attachment points 68 formed at the wheel support portion 66. In general, the pitch circle diameter D2 of the plurality of attachment points 68 may not be made to be remarkably large due to the limitation in a predetermined range in accordance with the diameter of the wheel. However, when the pitch circle diameter D1 of the plurality of first rolling elements 60a is made larger than the pitch circle diameter D2 of the plurality of attachment points 68 formed at the wheel support portion 66, the inner space of the wheel bearing 50, that is, the inner space of the first inner race 50c may be widened. As a result, a mechanism with a size which may not be easily accommodated in the past, for example, a planetary gear mechanism may be received in the inner space, and the axial length of the electric vehicle driving device 10 may be shortened. Since the clutch device 40 does not need an actuator for a driving operation, the structure of the electric vehicle driving device 10 may be simplified and the electric vehicle driving device 10 may be decreased in size.

Furthermore, the desirable aspect of the fourth embodiment is understood as follows. In the fourth embodiment, it is desirable that the pitch circle diameter of the first rolling elements be larger than the pitch circle diameter of the plurality of attachment points.

In general, the pitch circle diameter of the plurality of attachment points may not be made remarkably large due to the limitation in a predetermined range in accordance with the diameter of the wheel. However, in this aspect, when the wheel hub motor has the above-described configuration, the inner space of the wheel bearing, that is, the inner space of the first inner race may be widened. As a result, a mechanism which may not be easily accommodated in the past, for example, a planetary gear mechanism may be accommodated in the inner space, and the length in the axial direction of the electric vehicle driving device may be shortened.

In the fourth embodiment, it is desirable that the center in the tooth width direction of the inner gear be positioned between the surface including the centers of the plurality of first rolling elements and the surface including the centers of the plurality of second rolling elements.

Since the center in the tooth width direction of the inner gear is disposed in this manner, even when a load is applied to a wheel bearing so that a shaft is inclined, the degree of the displacement of the inner gear decreases, and the load acting on the inner gear may be reduced. That is, the rigidity of the wheel bearing with respect to the displacement in the moment direction when a moment acts on the shaft may be made large.

The configuration of the fourth embodiment may be appropriately applied to the embodiments below. The same configuration as that of the embodiment has the same effect.

Fifth Embodiment

Figure 29:
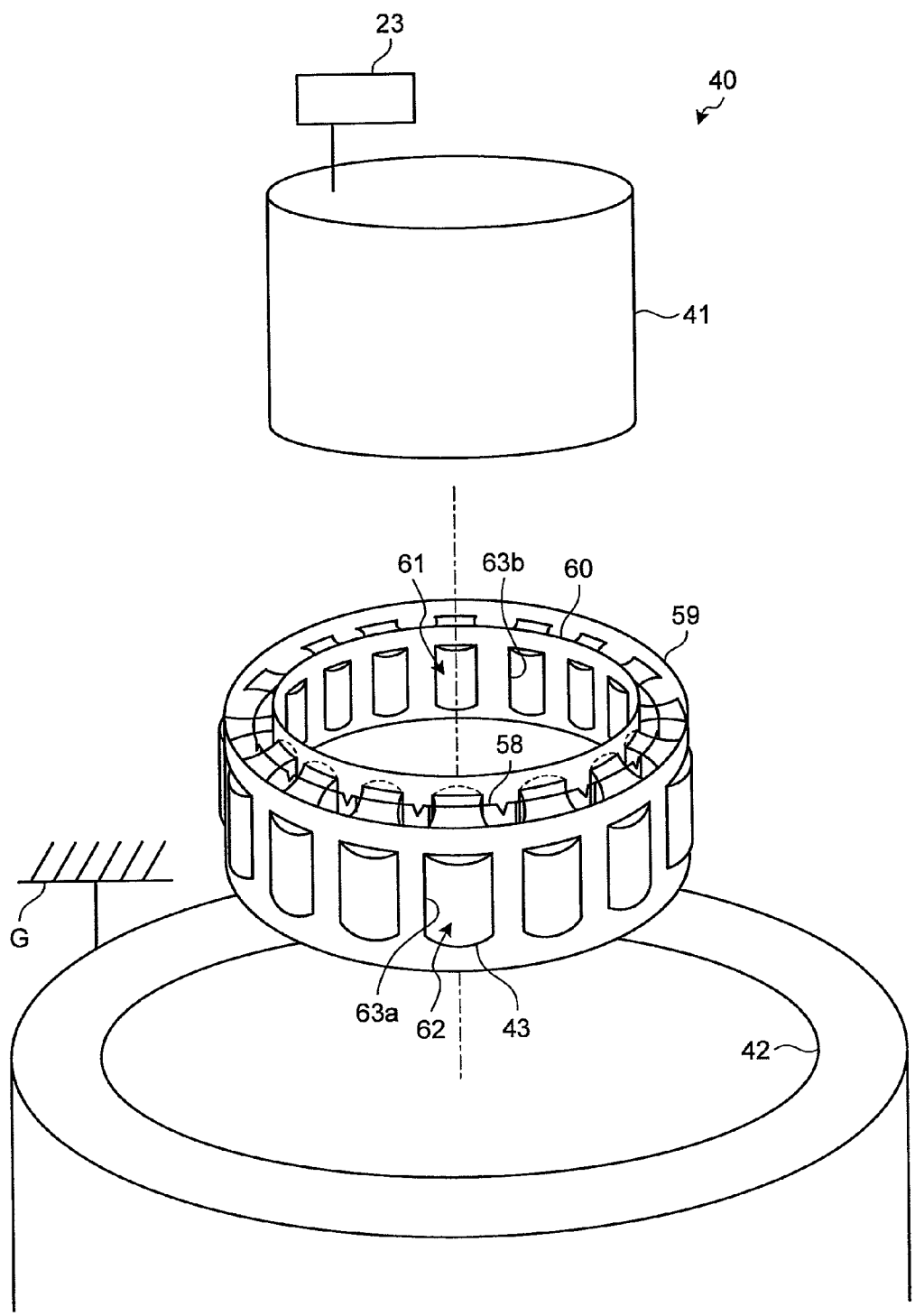
FIG. 29 is an exploded diagram illustrating a clutch device of a fifth embodiment.
Figure 30:
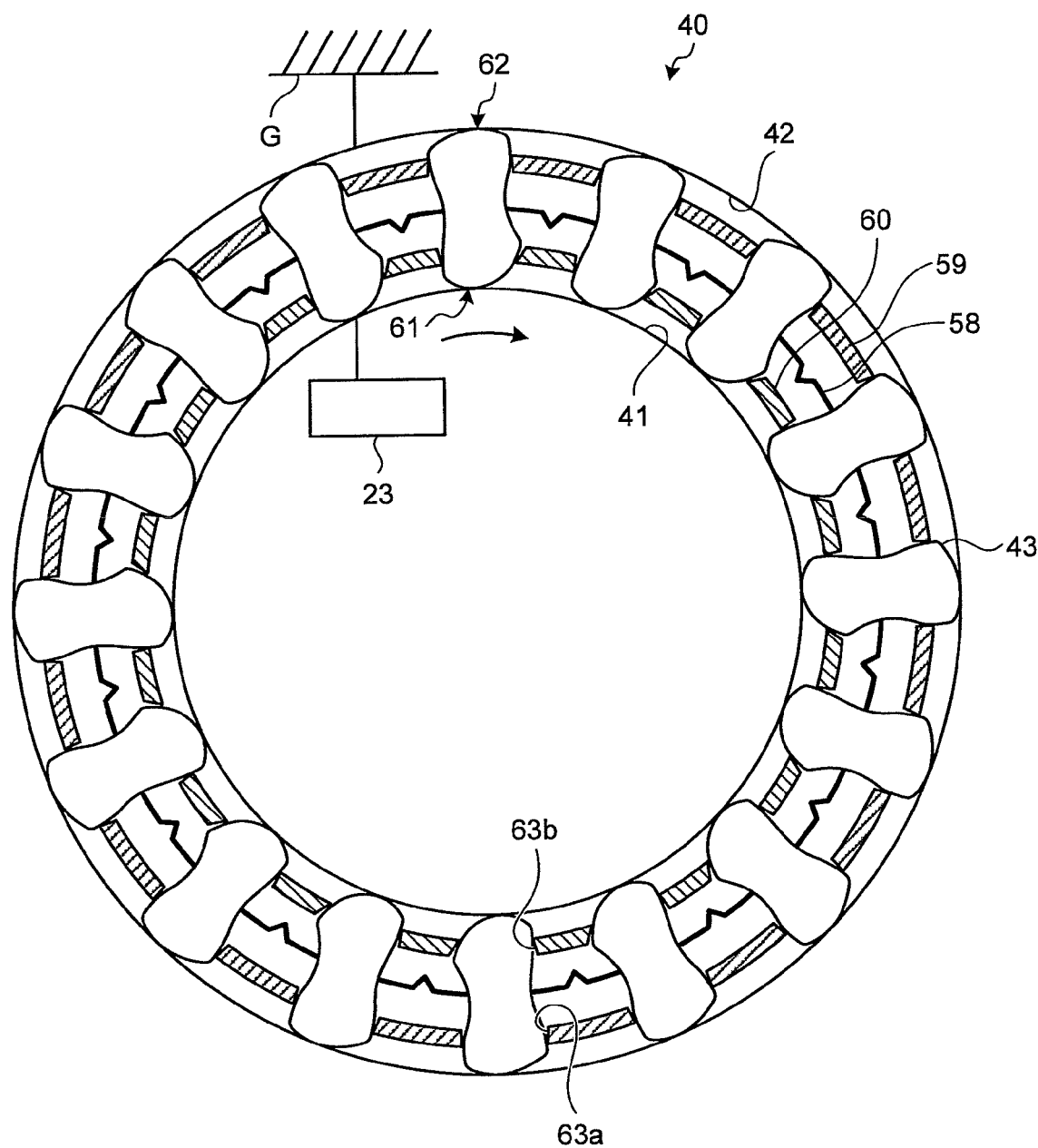
FIG. 30 is a diagram illustrating the clutch device of the fifth embodiment.
Figure 31:
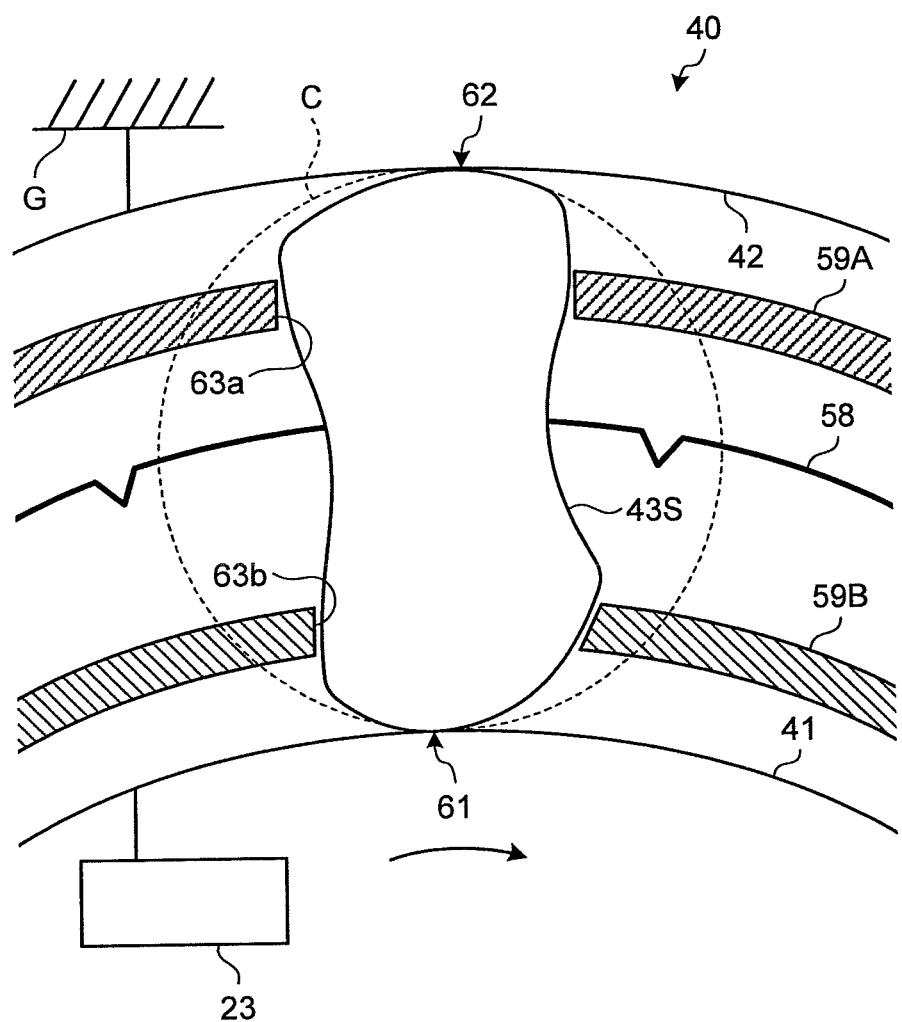
FIG. 31 is a diagram magnifying a sprag of the clutch device of the fifth embodiment.

FIG. 29 is an exploded diagram illustrating a clutch device of a fifth embodiment. FIG. 30 is a diagram illustrating the clutch device of the fifth embodiment. FIG. 31 is a diagram magnifying a sprag of the clutch device of the fifth embodiment. The clutch device 40 according to the invention is provided in the vehicle driving device 10 of the above-described first embodiment and the like. As shown in FIGS. 29 and 30, the clutch device 40 includes the inner race 41 serving as the second member, the outer race 42 serving as the first member, and a plurality of sprags 43S. The inner race 41 may serve as the first member, and the outer race 42 may serve as the second member. The inner race 41 and the outer race 42 are cylindrical members. The inner race 41 is disposed inside the outer race 42. One of the inner race 41 and the outer race 42 is connected to the first carrier 23, and the other thereof is connected to the casing G. In the embodiment, the inner race 41 is connected to the first carrier 23, and the outer race 42 is connected to the casing G.

The sprag 43S is a friction engagement member which allows the inner race 41 and the outer race 42 to engage with each other by friction. The sprag 43S is a columnar member, and is formed in a cocoon shape of which the center of the bottom surface is narrowed. The circle C shown in FIG. 31 is a circle circumscribing a figure defined by the bottom surface of the sprag 43S. In the side surface of the sprag 43S, an inner race contact surface 61 as a surface where the sprag 43S comes into contact with the inner race 41 is a curved surface with a curvature larger than the curvature of the side surface of a column having a bottom surface of the circle C. In the side surface of the sprag 43S, an outer race contact surface 62 as a surface where the sprag 43S comes into contact with the outer race 42 is also a curved surface with a curvature larger than the curvature of the side surface of a column having a bottom surface of the circle C. However, the curvature of the inner race contact surface 61 may be different from the curvature of the outer race contact surface 62. The plurality of sprags 43S are disposed between the outer peripheral portion of the inner race 41 and the inner peripheral portion of the outer race 42 at the same interval in the circumferential direction of the inner race 41 and the outer race 42.

The length of the sprag 43S in the circumferential direction of the inner race 41 and the outer race 42 is smaller than the diameter of the circle C. Therefore, the circumferential length necessary for disposing the sprag 43S between the outer peripheral portion of the inner race 41 and the inner peripheral portion of the outer race 42 is shorter than the column with a bottom surface of the circle C. As a result, it is possible to dispose many sprags 43S between the outer peripheral portion of the inner race 41 and the inner peripheral portion of the outer race 42 compared to the column with a bottom surface of the circle C.

The main factor for determining the torque capacities of the sprag type one-way clutch device, the cam clutch device, and the roller clutch device is a pressure (contact pressure) when a friction engagement member such as a sprag, a cam, and a roller comes into contact with the inner race and the outer race. When the contact pressure becomes more than a certain threshold value determined by the materials of the inner race, the outer race, and the friction engagement member, each clutch device may not maintain the acting torque. As the number of the friction engagement members constituting the clutch device increases, the torque acting on the clutch device is distributed to many friction engagement members, and the pressure when the friction engagement member comes into contact with the inner race and the outer race decreases. Therefore, the torque capacity of the clutch device increases as the number of the friction engagement members increases.

In the clutch device 40, since the sprag 43S is used as the friction engagement member, it is possible to dispose the sprags 43s which are more than the number of the cams, each of which has a bottom surface similar to the circle C, in the clutch device 40. As a result, the torque capacity of the clutch device 40 may be made larger than the torque capacity of the cam clutch device having the same attachment dimension as that of the clutch device 40. Since the torque capacity of the clutch device 40 may increase, the maximum value of the first distributed rotational force T5 output to the wheel H may be made large.

As shown in FIG. 31, the clutch device 40 includes a ribbon spring 58 (an elastic member), an outer retainer 59A (a first retainer), and an inner retainer 59B (a second retainer). The ribbon spring 58 is an elastic member that makes each sprag 43S come into contact with the inner race 41 and the outer race 42, and is formed by, for example, pressing a stainless steel sheet. The ribbon spring 58 has a shape in which a ladder-shaped member is formed in an annular shape, and may be expanded or contracted in the circumferential direction. Since the sprag 43S comes into contact with the inner race 41 and the outer race 42 in the disengagement state by the ribbon spring 58, the backlash when switching from the disengagement state to the engagement state reduces, and when a rotational force acts on the inner race 41 or the outer race 42, the sprag 43S may promptly mesh with the inner race 41 and the outer race 42. Therefore, in the clutch device 40, a time necessary for switching from the disengagement state to the engagement state may be reduced. In the disengagement state, no force is transmitted between the inner race 41 and the outer race 42. On the other hand, in the engagement state, a force is transmitted between the inner race 41 and the outer race 42.

The outer retainer 59A and the inner retainer 59B are both formed in a cylindrical shape. The side surface of the outer retainer 59A is provided with a plurality of rectangular openings 63a (first openings) disposed at the same interval in the circumferential direction. The outer retainer 59A is disposed inside the outer race 42. The outer diameter of the inner retainer 59B is smaller than the inner diameter of the outer retainer 59A, and the inner retainer 59B is disposed inside the outer retainer 59A. The side surface of the inner retainer 59B is provided with openings 63b (second openings) disposed at the same interval in the circumferential direction as many as the openings 63a formed in the outer retainer 59A in the circumferential direction. The inner retainer 59B is disposed with respect to the outer retainer 59A so that the opening 63a and the opening 63b face each other. When the sprags 43S are inserted through the opening 63a of the outer retainer 59A and the opening 63b of the inner retainer 59B, the outer retainer 59A and the inner retainer 59B holds the plurality of sprags 43S.

The plurality of openings 63a are formed at the same interval in the outer retainer 59A in the circumferential direction, and the plurality of openings 63b are formed at the same interval in the inner retainer 59B in the circumferential direction. As a result, the plurality of sprags 43S are disposed at the same interval in the circumferential direction of the outer retainer 59A, that is, in the circumferential direction of the inner retainer 59B. The outer race contact surface 62 protrudes from the opening 63a formed in the outer retainer 59A toward the outside of the outer retainer 59A in the radial direction. The inner race contact surface 61 protrudes from the opening 63b formed in the inner retainer 59B toward the inside of the inner retainer 59B in the radial direction.

In this manner, since the outer retainer 59A and the inner retainer 59B hold the plurality of sprags 43S, the plurality of sprags 43S are disposed at the same interval in the circumferential direction, and the motions of the plurality of sprags 43S are synchronized with each other. As a result, all torques acting on the clutch device 40 are applied to the respective sprags 43S while being equally divided. For this reason, the torque capacity of the clutch device 40 may be made large compared to the clutch device without the outer retainer 59A and the inner retainer 59B.

The clutch device 40 is a one-way clutch device. The one-way clutch device transmits only the rotational force in the first direction, but does not transmit the rotational force in the second direction opposite to the first direction. That is, the one-way clutch device becomes the engagement state when the first carriers 23 shown in FIGS. 1 and 3 rotate in the first direction, and becomes the disengagement state when the first carrier 23 rotates in the second direction. In the clutch device 40, when a rotational force acts on the inner race 41 in the first direction (in the direction indicated by the arrow in FIGS. 30 and 31), the sprag 43S meshes with the inner race 41 and the outer race 42. Accordingly, the rotational force is transmitted between the inner race 41 and the outer race 42, and the first carrier 23 receives a reaction force from the casing G. Therefore, the clutch device 40 may regulate the rotation of the first carrier 23. In the clutch device 40, when a rotational force acts on the inner race 41 in the second direction, the sprag 43S does not mesh with the inner race 41 and the outer race 42. Accordingly, the rotational force is not transmitted between the inner race 41 and the outer race 42, and the first carrier 23 does not receive a reaction force from the casing G. Therefore, the clutch device 40 does not regulate the rotation of the first carrier 23. In this manner, the clutch device 40 realizes a function as the one-way clutch device.

In the case of the embodiment, the clutch device 40 becomes an engagement state when the inner race 41 turns in a direction in which the first carrier 23 shown in FIG. 1 turns (rotates), in the case of a first speed change state, that is, a state where the second motor 12 is not operated and the first motor 11 outputs a rotational force so as to advance the electric vehicle. That is, the above-described first direction is a direction in which the inner race 41 serving as the second member rotates when the first motor 11 outputs a rotational force so as to advance the electric vehicle and the second motor is not operated. In this state, when the second motor 12 is operated, as described below, the rotation direction of the second carrier 33 is reversed. Accordingly, the clutch device 40 becomes a disengagement state, in the case of a second speed change state, that is, the second motor 12 is operated and the first motor 11 outputs a rotational force so as to advance the electric vehicle. Accordingly, the clutch device 40 may switch to the engagement state and the disengagement state in accordance with whether the second motor 12 is operated or not.

Since the clutch device 40 is a one-way clutch device, a mechanism for moving a piston is not needed and electric power for operating an electromagnetic actuator is not needed, compared to a clutch device of a type in which a piston inside a cylinder is moved by a hydraulic fluid so as to allow two rotary members to engage with each other or an electromagnetic actuator allows two rotary members to engage with each other. In the clutch device 40, since the engagement state and the disengagement state may be switched by switching the direction of the rotational force acting on the inner race 41 or the outer race 42 (in the embodiment, the inner race 41), the number of components may be decreased and the size (of the clutch device 40) may be decreased.

The clutch device 90 (refer to FIG. 11) included in the electric vehicle driving device 60 according to the above-described second embodiment may be a sprag type one-way clutch device in which the sprag 43S is disposed as the friction engagement member as in the clutch device 40. In the clutch device 90, the second carrier 83 is connected to the inner race. The other configurations of the clutch device 90 are the same as those of the clutch device 40. Since the clutch device 90 has such a configuration, the maximal rotational force output to the wheel H may be made large.

The desirable aspect of the fifth embodiment is understood as follows. In the fifth embodiment, it is desirable that the clutch device include an elastic member which makes the sprag come into contact with the first member and the second member. Accordingly, it is possible to reduce a time necessary for switching the clutch device from the disengagement state to the engagement state.

In the fifth embodiment, it is desirable that the clutch device include the first retainer and the second retainer holding the plurality of sprags at the same interval. Accordingly, all torques acting on the clutch device are applied to the sprags while being equally divided. For this reason, the torque capacity of the clutch device according to the invention may be made larger compared to the clutch device without the retainer.

In the fifth embodiment, the first retainer is the cylinder having the plurality of first openings disposed at the same interval on the side surface thereof. The second retainer is the cylinder having the second openings disposed at the same interval on the side surface thereof as many as those of the first retainer and having an outer diameter smaller than the inner diameter of the first retainer. The second retainer is disposed inside the first retainer so that the first opening and the second opening face each other, and the sprags are inserted through the first openings and the second openings facing each other.

The configuration of the fifth embodiment may be appropriately applied to the embodiments below. The same configuration as that of the embodiment has the same effect.

Sixth Embodiment

Figure 32:
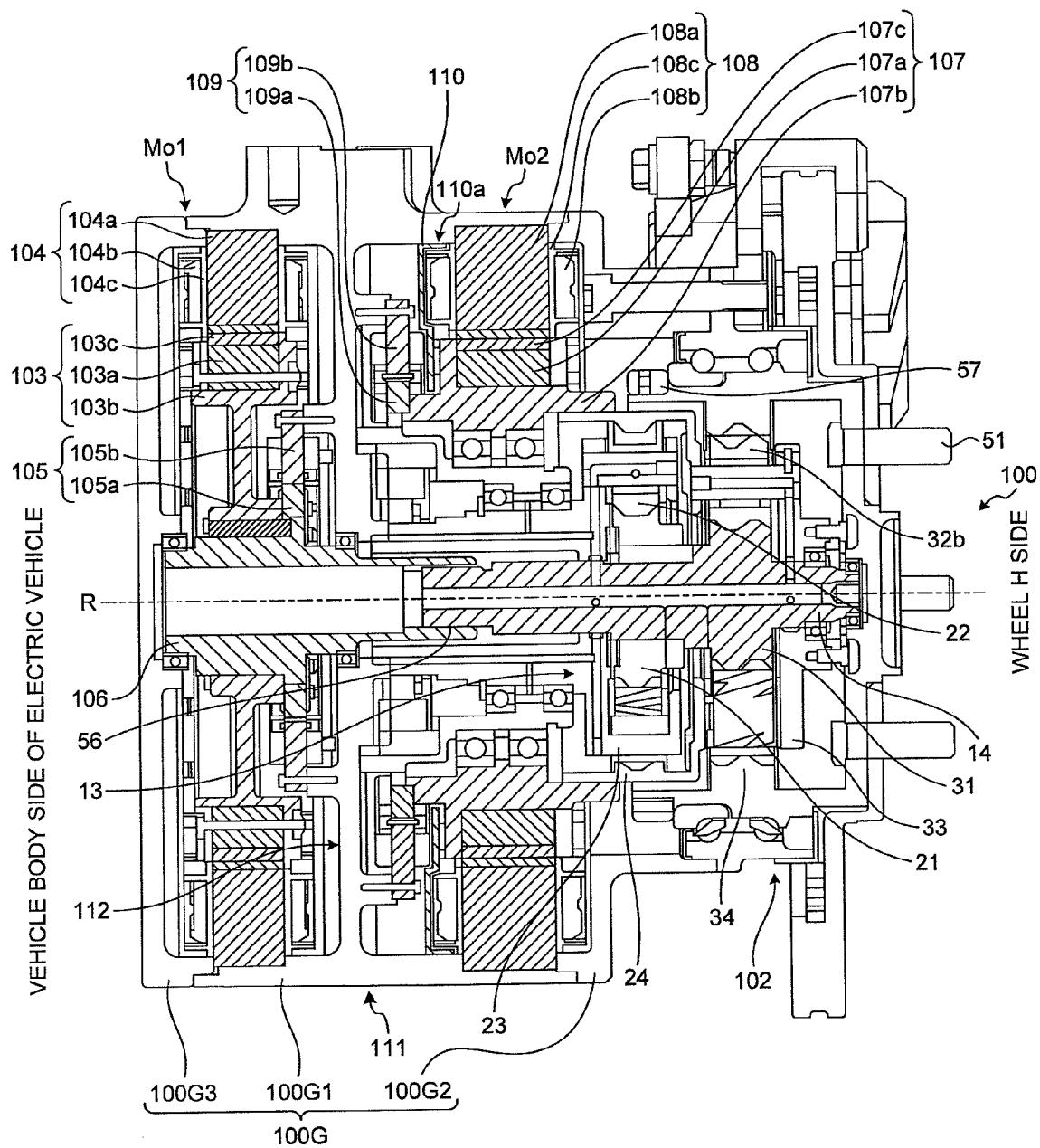
FIG. 32 is a cross-sectional view illustrating an electric vehicle driving device of a sixth embodiment.

FIG. 32 is a cross-sectional view illustrating an electric vehicle driving device of a sixth embodiment. FIG. 32 illustrates a cross-section when cutting the electric vehicle driving device along a plane including the rotary axis R. As shown in FIG. 32, the electric vehicle driving device 100 serving as the wheel hub motor includes a first motor Mo1 and a second motor Mo2. The first motor Mo1 may output a first rotational force TA. The second motor Mo2 may output a second rotational force TB. The shift mechanism 13 is connected to the first motor Mo1 and the second motor Mo2. Since the shift mechanism 13 has the same configuration as that of the first embodiment, the description thereof will not be repeated. The shift mechanism 63 of the second embodiment may be used instead of the shift mechanism 13. The third pinion gear 32b of the shift mechanism 13 meshes with the second ring gear 34. The second ring gear 34 is connected to the wheel bearing 102. When the second ring gear 34 rotates, the wheel bearing 102 rotates.

The first motor Mo1 includes a first rotor 103, a first motor stator 104, and a first resolver 105. The first motor stator 104 includes a first stator core 104a, a first coil 104b, and a first insulator 104c. The first stator core 104a is a cylindrical member composed of a magnetic body, and is formed by, for example, laminating magnetic steel sheets. The first coil 104b is provided at a plurality of positions in the first stator core 104a. The first coil 104b is wound on the first stator core 104a through the first insulator 104c.

The first rotor 103 includes a first rotor core 103a and a first rotor disk 103b. The first rotor core 103a is a cylindrical member, and is disposed coaxially with the first stator core 104a with a gap in the radial direction on the inside of the first stator core 104a in the radial direction. That is, the first motor stator 104 is disposed on the outside of the first rotor core 103a in the radial direction. The first rotor core 103a is a magnetic body, and is formed by, for example, laminating magnetic steel sheets. A plurality of first magnets 103c are buried inside the first rotor core 103a. The disk-shaped first rotor disk 103b is disposed on the inside of the first rotor core 103a in the radial direction, and the first rotor disk 103b supports the first rotor core 103a. The first rotor disk 103b includes an annular member and a disk member having a cylindrical portion with a flange assembled to the periphery. In the cylindrical portion, the cross-section including the axis is formed in an L-shape. The side surface in the axial direction of the first rotor core 103a abuts on the flange of the disk member. The first rotor core 103a is interposed between the annular member and the flange of the disk member, and the annular member and the flange of the disk member are fixed by threading, so that the first rotor core 103a is supported at the first rotor disk 103b.

The first motor output shaft 106 is fixed to the center of the first rotor disk 103b, particularly the center of the disk member, using a connection member such as a key, and the output of the first motor Mo1 is output to the first motor output shaft 106. The configuration of the first rotor disk 103b or the configuration of coupling the first rotor disk 103b and the first rotor core 103a is not limited to the description above. The first rotor disk 103b may be configured to support the first rotor core 103a.

The first rotor disk 103b is a non-magnetic body, and is composed of a material having a property of hardly causing an interaction with respect to a magnetic field. The first rotor disk 103b is composed of, for example, austenite stainless steel, aluminum, and resin. When the first rotor disk 103b needs to have strength, it is desirable that the first rotor disk 103b be composed of austenite stainless steel. In order to decrease the weight of the first rotor disk 103b, it is desirable that the first rotor disk 103b be composed of aluminum.

The first resolver 105 detects the rotary angle of the first rotor core 103a. A first resolver rotor 105a is fixed by threading to the first rotor disk 103b so as to be close to the first motor output shaft 106. A first resolver stator 105b is disposed so as to face the first resolver rotor 105a. The first resolver rotor 105a and the first resolver stator 105b are coaxially disposed with a gap in the radial direction. Since the first resolver rotor 105a is fixed to the first rotor disk 103b, the first resolver rotor 105a integrally rotates with the first rotor core 103a. Therefore, the rotary angle of the first rotor core 103a may be detected by detecting a magnetic relation between the first resolver rotor 105a and the first resolver stator 105b. When the magnetic relation between the first resolver rotor 105a and the first resolver stator 105b is detected, it is desirable that a strong external magnetic field be not present near the first resolver 105 in order to improve the detection precision of the first resolver 105. Since the first rotor disk 103b is composed of the non-magnetic body, a part of a magnetic flux from the first magnet 103c provided in the first rotor core 103a is suppressed from flowing to the first resolver stator 105b through the first rotor disk 103b, so that the detection precision of the first resolver 105 may improve. As a result, since the first resolver 105 may be disposed close to the first rotor disk 103b, the axial dimension of the electric vehicle driving device 100 may be shortened.

The second motor Mo2 includes a second rotor 107, a second motor stator 108, and a second resolver 109. The second motor stator 108 includes a second stator core 108a, a second coil 108b, and a second insulator 108c. The second stator core 108a is a cylindrical member composed of a magnetic body, and is formed by, for example, laminating magnetic steel sheets. The second coil 108b is provided at a plurality of positions of the second stator core 108a. The second coil 108b is wound on the second stator core 108a through the second insulator 108c. The second rotor 107 includes a second rotor core 107a and a second rotor disk 107b. The second rotor core 107a is a cylindrical member, and is disposed inside the second stator core 108a in the radial direction. That is, the second motor stator 108 is disposed outside the second rotor core 107a in the radial direction. The second rotor core 107a is a magnetic body, and formed by, for example, laminating magnetic steel sheets. A plurality of second magnets 107c are buried in the second rotor core 107a. The disk-shaped second rotor disk 107b is disposed inside the second rotor core 107a in the radial direction, and the second rotor disk 107b supports the second rotor core 107a. The second rotor disk 107b includes an annular member and a cylindrical member provided with a flange. In the cylindrical member, the cross-section including the axis is an L-shape. The side surface in the axial direction of the second rotor core 107a abuts on the flange of the cylindrical member. The second rotor core 107a is interposed between the flange of the cylindrical member and the annular member, and the flange of the cylindrical member and the annular member are fixed by threading, thereby the second rotor core 107a is supported at the second rotor disk 107b. The configurations of the second rotor disk 107b or the configuration of coupling the second rotor disk 107b and the second rotor core 107a to each other is not limited to the description above. The second rotor disk 107b may be configured to support the second rotor core 107a.

The second rotor disk 107b is a non-magnetic body. The second rotor disk 107b is composed of, for example, austenite stainless steel, aluminum, and resin. When the second rotor disk 107b needs to have strength, it is desirable that the second rotor disk 107b be composed of austenite stainless steel. In order to decrease the weight of the second rotor disk 107b, it is composed that the second rotor disk 107b be formed of aluminum.

The second resolver 109 detects the rotary angle of the second rotor core 107a. A second resolver rotor 109a is fixed to the second rotor disk 107b. A second resolver stator 109b is disposed so as to face the second resolver rotor 109a. The second resolver rotor 109a and the second resolver stator 109b are coaxially disposed with a gap in the radial direction. Since the second resolver rotor 109a is fixed to the second rotor disk 107b, the second resolver rotor 109a integrally rotates with the second rotor core 107a. Therefore, the rotary angle of the second rotor core 107a may be detected by detecting a magnetic relation between the second resolver rotor 109a and the second resolver stator 109b. When the magnetic relation between the second resolver rotor 109a and the second resolver stator 109b is detected, it is desirable that a strong external magnetic field be not present near the second resolver 109 in order to improve the detection precision of the second resolver 109. Since the second rotor disk 107b is composed of a non-magnetic body, a part of a magnetic flux from the second magnet 107c provided in the second rotor core 107a is suppressed from flowing to the second resolver stator 109b through the second rotor disk 107b, so that the detection precision of the second resolver 109 may improve. As a result, since the second resolver 109 may be disposed close to the second rotor disk 107b, the dimension in the axial direction of the electric vehicle driving device 100 may be shortened.

The shift mechanism 13 is disposed at the inner diameter side of the second rotor disk 107b, and it is difficult to dispose the resolver on the inner diameter side of the rotor disk as in the first motor Mo1. For this reason, when the second resolver 109 is fixed to the second rotor disk 107b, the second resolver 109 is disposed at a position facing respective side surfaces of the second rotor core 107a and the second stator core 108a. A plate-shaped magnetic shield member 110 (a plate-shaped member) composed of a magnetic body is provided so as to spatially interrupt the side surfaces of the second resolver 109 and the second rotor core 107a facing each other, and the side surfaces of the second resolver 109 and the second stator core 108a facing each other. Specifically, the magnetic shield member 110 is a donut-shaped plate member, and is formed by, for example, press molding of a magnetic steel sheet. A radial outer end 110a of the magnetic shield member 110 is disposed at a position magnetically communicating with the second stator core 108a. Even when the radial outer end 110a of the magnetic shield member 110 does not come into contact with the second stator core 108a, if it is disposed at a position which is very close to the second stator core 108a, the magnetic shield member 110 may magnetically communicate with the second stator core 108a.

In the embodiment, the radial outer end 110a of the magnetic shield member 110 is disposed so as to be very close to the second stator core 108a, and the radial outer end 110a of radial outer of the magnetic shield member 110 is fixed to a first casing 100G1 to be specifically described later. However, a member to which the magnetic shield member 110 is fixed and a member to which the second motor stator 108 is fixed are both composed of a magnetic body, and the magnetic shield member 110 and the second stator core 108a may magnetically communicate with each other so as to form a loop in which a magnetic flux easily passes by the magnetic shield member 110 and the second motor stator 108. The magnetic shield member 110 magnetically shields the second resolver 109 and the second rotor core 107a, and the second resolver 109 and the second motor stator 108 from each other, respectively, and the radial outer end 110a composed of a magnetic body is disposed at a position magnetically communicating with the second motor stator 108. Therefore, a leakage magnetic flux generated between the second rotor 107 and the second motor stator 108 flows into the magnetic shield member 110. As a result, an influence of a leakage magnetic flux with respect to the second resolver 109 may be reduced, and the detection precision of the second resolver 109 may improve. As a result, the second resolver 109 may be provided to be close to the second motor Mo2, and the dimension in the axial direction of the electric vehicle driving device 100 may be shortened.

In the embodiment, although the first motor Mo1 is not provided with the magnetic shield member, the first motor Mo1 may be provided with a magnetic shield member which magnetically shields the first resolver 105 from the first rotor core 103a and the first motor stator 104 and is composed of a magnetic body, the end of which is disposed at a position magnetically communicating with the first motor stator 104. Accordingly, an influence of a leakage magnetic flux with respect to the first resolver 105 may be reduced, and the detection precision of the first resolver 105 may improve.

The first motor Mo1 and the second motor Mo2 are accommodated in the casing 100G. The casing 100G includes a first casing 100G1, a second casing 100G2, and a third casing 100G3. The first casing 100G1 (the non-magnetic member) is a cylindrical member, and a disk-shaped disk 112 (a resolver stator fixing portion and a non-magnetic member) fixing the first resolver stator 105b and the second resolver stator 109b is formed inside a cylindrical portion 111 (a motor stator fixing portion and a non-magnetic member) fixing the first motor stator 104 and the second motor stator 108. In the embodiment, the cylindrical portion 111 and the disk portion 112 are integrated with each other, and are composed of a non-magnetic body. Therefore, the first motor stator 104 and the first resolver stator 105b are coupled to each other and the second motor stator 108 and the second resolver stator 109b are coupled to each other, through the first casing 100G1 which is the non-magnetic member, respectively. In this manner, since the first motor stator 104 and the first resolver stator 105b are coupled to each other and the second motor stator 108 and the second resolver stator 109b are coupled to each other, through the first casing 100G1 which is the non-magnetic member, it is possible to suppress the magnetic flux of the first motor Mo1 or the second motor Mo2 from flowing into the first resolver 105 or the second resolver 109 through the casing 100G. As a result, the detection precision of the first resolver 105 or the second resolver 109 may improve.

The second casing 100G2 is a cylindrical member. The second casing 100G2 is disposed in the side of the wheel H in relation to the first casing 100G1. The first casing 100G1 and the second casing 100G2 are fastened by, for example, four bolts.

The third casing 100G3 is provided at the opening end opposite to the second casing 100G2 in two opening ends of the first casing 100G1, that is, at the vehicle-body-side opening end of the electric vehicle of the first casing 100G1. The first casing 100G1 and the third casing 100G3 are fastened by, for example, four bolts. Accordingly, the third casing 100G3 closes the opening of the first casing 100G1.

The shift mechanism 13 is accommodated in the casing 100G. The first sun gear 21 is supported inside the casing 100G so as to turn (rotate) about the rotary axis R. The first carrier 23 is supported inside the casing 100G so as to turn (rotate) about the rotary axis R. The second sun gear 31 is supported inside the casing 100G so as to turn (rotate) about the rotary axis R. The second carrier 33 is supported inside the casing 100G so as to turn (rotate) about the rotary axis R. Regarding the path for transmitting the rotational force when the electric vehicle driving device 100 is in the first speed change state and the path for transmitting the rotational force when the electric vehicle driving device 100 is in the second speed change state, since those paths are the same as those of the first embodiment except that the casing 100G is used instead of the casing G and the wheel bearing 102 is used instead of the wheel bearing 50, the description thereof will not be repeated.

First Modified Example

Figure 33:
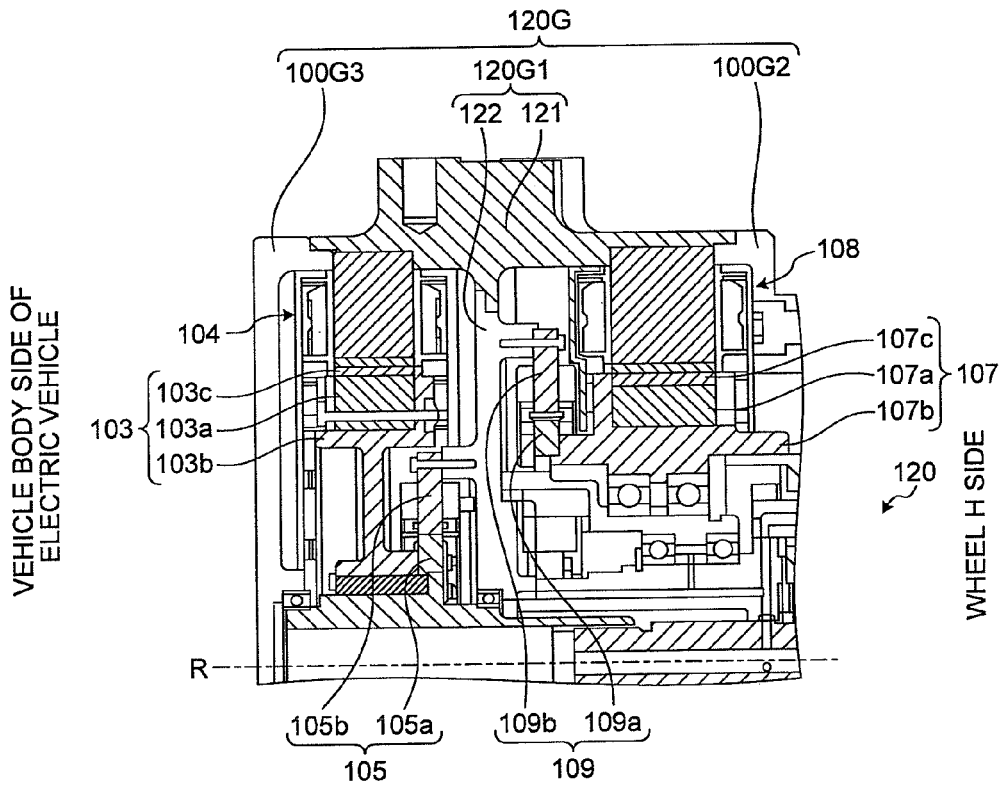
FIG. 33 is a partial cross-sectional view illustrating an electric vehicle driving device according to a first modified example of the sixth embodiment.

FIG. 33 is a partial cross-sectional view illustrating an electric vehicle driving device according to a first modified example of the sixth embodiment. FIG. 33 illustrates the vicinities of the first motor Mo1 and the second motor Mo2 of the electric vehicle driving device 120. In the electric vehicle driving device 120 serving as the wheel hub motor, the casing 120G is used instead of the casing 100G. The casing 120G includes a first casing 120G1, a second casing 100G2, and a third casing 100G3. The first casing 120G1 includes two members. Therefore, a cylindrical portion (a motor stator fixing portion) fixing the first motor stator 104 and the second motor stator 108 and a disk portion 122 (a resolver stator fixing portion) fixing the first resolver stator and the second resolver stator are formed as different members. In the embodiment, the cylindrical portion 121 is composed of a magnetic body, and the disk portion 122 is composed of a non-magnetic body. For this reason, the first motor stator 104 and the first resolver stator 105b are coupled to each other and the second motor stator 108 and the second resolver stator 109b are coupled to each other, through the disk portion 122 which is the non-magnetic member, respectively. As a result, the magnetic flux of the first motor Mo1 or the second motor Mo2 may be suppressed from flowing into the first resolver 105 or the second resolver 109 through the casing 120G, and the detection precision of the first resolver 105 or the second resolver 109 may improve.

Even when a cylindrical portion 121 is composed of a non-magnetic body, and a disk portion 122 is composed of a non-magnetic body, the same effect is obtained. That is, the first motor stator 104 and the first resolver stator 105b are coupled to each other and the second motor stator 108 and the second resolver stator 109b are coupled to each other, through the disk portion 122 which is the non-magnetic member. As a result, the magnetic flux of the first motor Mo1 or the second motor Mo2 may be suppressed from flowing into the first resolver 105 or the second resolver 109 through the casing 120G, and the detection precision of the first resolver 105 or the second resolver 109 may improve.

Regarding the path for transmitting the rotational force when the electric vehicle driving device 120 is in the first speed change state, and the path for transmitting the rotational force when the electric vehicle driving device 120 is in the second speed change state, since those paths are the same as those of the first embodiment except that the casing 102G is used instead of the casing G and the wheel bearing 102 is used instead of the wheel bearing 50, the description thereof will not be repeated.

Second Modified Example

Figure 34:
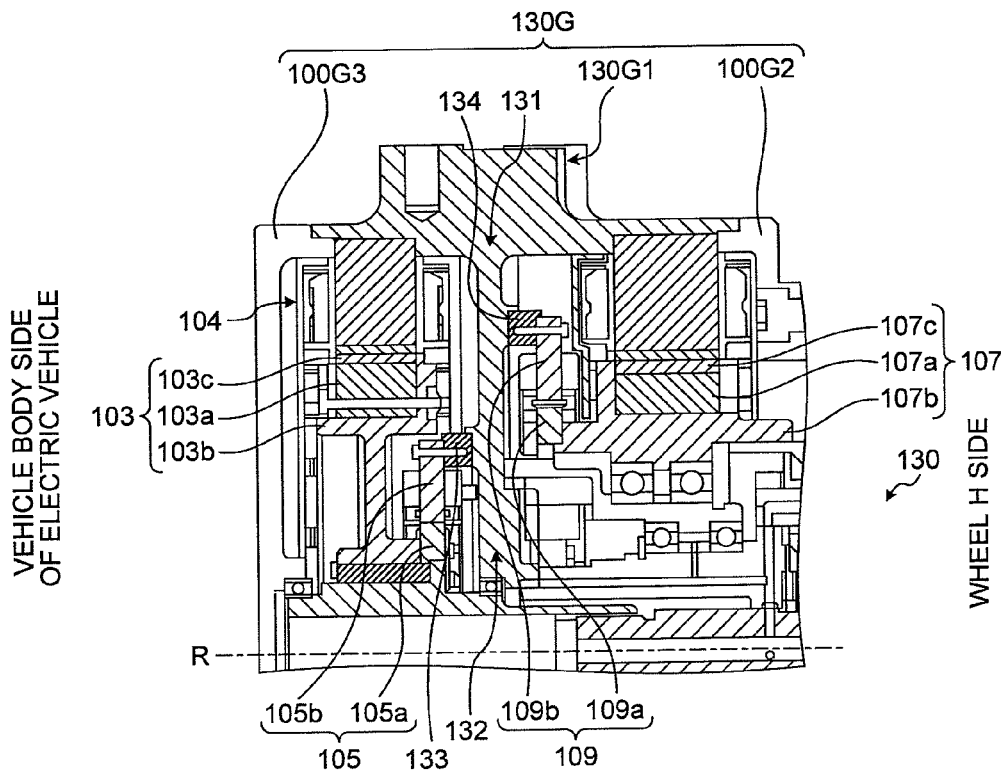
FIG. 34 is a partial cross-sectional view illustrating an electric vehicle driving device according to a second modified example of the sixth embodiment.

FIG. 34 is a partial cross-sectional view illustrating an electric vehicle driving device according to a second modified example of the sixth embodiment. FIG. 34 illustrates the vicinities of a first motor Mo1 and a second motor Mo2 of an electric vehicle driving device 130. In the electric vehicle driving device 130 serving as the wheel hub motor, the cylindrical portion 131 (the motor stator fixing portion) fixing the first motor stator 104 and the second motor stator 108, and the disk portion 132 (the resolver stator fixing portion) fixing the first resolver stator 105b and the second resolver stator 109b are integrated with each other respectively so as to form a first casing 130G1. The first casing 130G1 is composed of a magnetic body. The magnetic body is a material having a property of allowing a magnetic flux to easily pass therethrough, and is for example, a ferromagnetic body. The disk portion 132 of the first casing 130G1 fixes the first resolver stator 105*b* to a casing 130G through a first spacer 133, and fixes the second resolver stator 109*b* to the casing 130G through a second spacer 134. The first spacer 133 and the second spacer 134 are composed of a non-magnetic body. The first spacer 133 comes into contact with the first resolver stator 105*b*, and the second spacer 134 comes into contact with the second resolver stator 109*b*. In this manner, since the first resolver stator 105*b* is fixed to the disk portion 132 (the resolver stator fixing portion) through the first spacer 133 composed of the non-magnetic body and the second resolver stator 109*b* is fixed to the disk portion 132 through the second spacer 134 formed of a non-magnetic body, the first motor stator 104 and the first resolver stator 105*b* are coupled to each other and the second motor stator 108 and the second resolver stator 109*b* are coupled to each other, through the first spacer 133 or the second spacer 134 which is the non-magnetic member. As a result, the magnetic flux of the first motor Mo1 or the second motor Mo2 may be suppressed from flowing into the first resolver 105 or the second resolver 109 through the casing 130G, and the detection precision of the first resolver 105 or the second resolver 109 may improve. Further, since the casing 130G1 may be composed of the magnetic body, the material of the casing 130G1 may be selected from many options.

The casing 130G includes a first casing 130G1, a second casing 100G2, and a third casing 100G3. Regarding the path for transmitting the rotational force when the electric vehicle driving device 130 is in the first speed change state, and the path for transmitting the rotational force when the electric vehicle driving device 130 is in the second speed change state, since those paths are the same as those of the first embodiment except that the casing 130G is used instead of the casing G and the wheel bearing 102 is used instead of the wheel bearing 50, the description thereof will not be repeated.

The desirable aspects of the sixth embodiment and the modified example thereof are understood as follows. In the sixth embodiment and the modified example thereof, it is desirable that the rotor disk be composed of at least one type of austenite stainless steel, aluminum, and resin.

In the sixth embodiment and the modified example thereof, it is desirable that at least one of the first motor and the second motor be further provided with a plate-shaped member which magnetically shields the resolver from the rotor core and the motor stator and is composed of a magnetic body. It is desirable that the end of the plate-shaped member be disposed at a position magnetically communicating with the motor stator.

Accordingly, an influence of a leakage magnetic flux with respect to the resolver may be suppressed, and the detection precision of the resolver may improve. As a result, the resolver may be provided to be next to the first motor or the second motor, and the axial dimension of the electric vehicle driving device may be shortened.

In the sixth embodiment and the modified example thereof, it is desirable that the resolver stator and the motor stator be magnetically interrupted from each other. Accordingly, the magnetic flux of the first motor or the second motor may be suppressed from flowing into the resolver through the casing. As a result, the detection precision of the resolver may improve.

In the sixth embodiment and the modified example thereof, it is desirable that the resolver stator and the motor stator be coupled to each other through the non-magnetic member. Accordingly, the magnetic interruption between the resolver stator and the motor stator is realized.

In the sixth embodiment and the modified example thereof, it is desirable that the motor stator fixing portion for fixing the motor stator and the resolver stator fixing portion for fixing the resolver stator be provided, and at least one of the motor stator fixing portion and the resolver stator fixing portion be a non-magnetic body. Accordingly, the magnetic interruption between the resolver stator and the motor stator is realized.

In the sixth embodiment and the modified example thereof, it is desirable that the spacer composed of a non-magnetic body and coming into contact with the resolver stator and the resolver stator for fixing portion fixing the resolver stator through the spacer be provided. Accordingly, the magnetic interruption between the resolver stator and the motor stator is realized.

The configuration of the sixth embodiment and the configuration of the modified example thereof may be appropriately applied to the embodiments below. The same configuration as that of the embodiment has the same effect.

Seventh Embodiment

Figure 35:
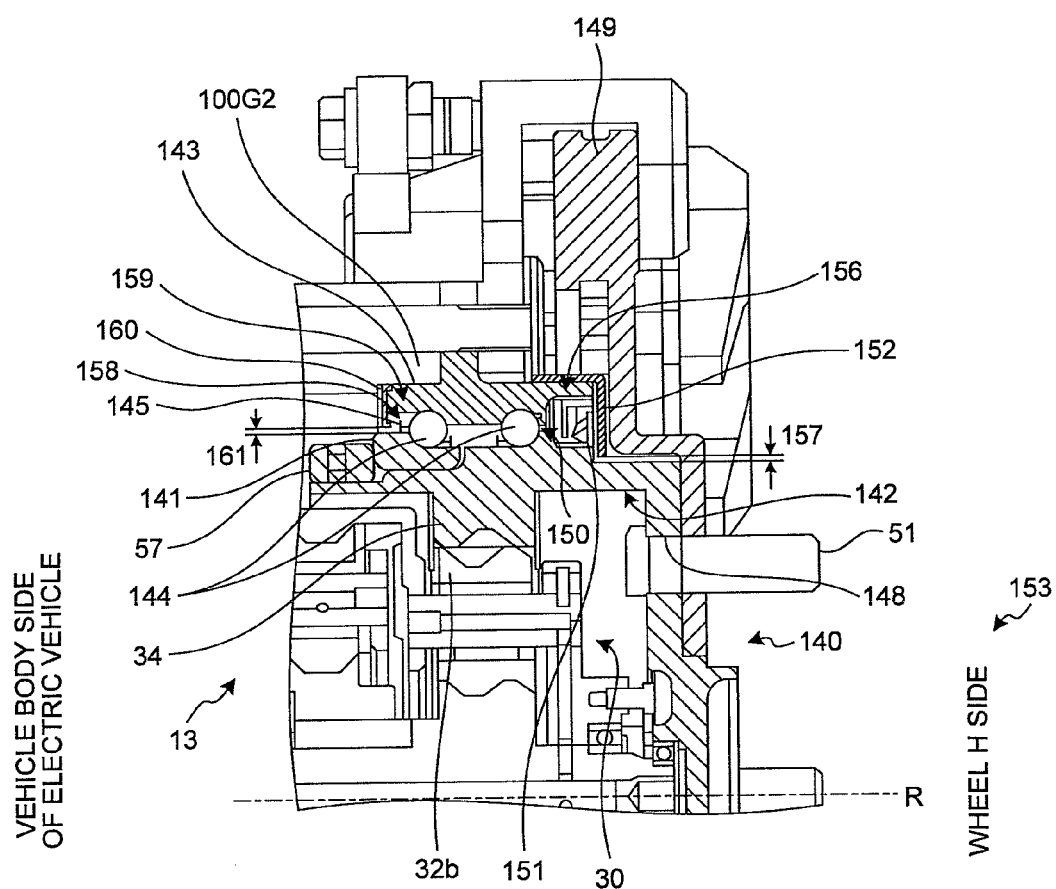
FIG. 35 is a partial cross-sectional view illustrating an electric vehicle driving device according to a seventh embodiment.

FIG. 35 is a partial cross-sectional view illustrating an electric vehicle driving device according to a seventh embodiment. FIG. 35 illustrates a cross-section including the rotary axis R of the electric vehicle driving device 153 serving as the wheel hub motor, and illustrates the vicinity of a wheel bearing 140. In the description below, FIG. 32 may be also referred to. The wheel bearing 140 according to the embodiment includes a first inner race 141 (a first bearing inner race), a second inner race 142 (a second bearing inner race), and an outer race 143 (a bearing outer race). The first inner race 141, the second inner race 142, and the outer race 143 have a cylindrical shape. The second inner race 142 is provided on the inside of the first inner race 141 (the rotary axis R side) in the radial direction. The second inner race 142 is provided so as to cover the second planetary gear mechanism 30. The outer race 143 is provided outside the first inner race 141 and the second inner race 142 in the radial direction so as to surround the first inner race 141 and the second inner race 142.

A plurality of rolling elements 144 are disposed between the outer peripheral portion of the first inner race 141 and inner periphery of the outer race 143, and between the outer peripheral portion of the second inner race 142 and the inner periphery of the outer race 143. Orbit surfaces are formed in the outer peripheral portion of the first inner race 141, the outer peripheral portion of the second inner race 142, and the inner peripheral portion of the outer race 143. The rolling elements 144 (steel balls) retained by the retainer 145 while being interposed between the orbit surfaces roll on the orbit surfaces, so that the first inner race 141 and the second inner race 142 are rotatable relative to the outer race 143. The first inner race 141 is positioned by being preloaded by the locknut 57 (the bearing nut). The inner periphery of the second inner race 142 is provided with the second ring gear 34. The third pinion gear 32*b* meshes with the second ring gear 34. The second inner race 142 coaxially rotates along with the second ring gear 34 in an integrated manner. When the shift mechanism 63 is used instead of the shift mechanism 13, the inner periphery of the second inner race 142 is provided with the first ring gear 74, which meshes with the first pinion gear 72. In the embodiment, the second ring gear 34 and the second inner race 142 are the same member. However, these may be formed as separate members. For example, the second ring gear and the second inner race 142 may be formed as separate members, and may be fixed to each other by welding or the like or may be connected and fixed by a connection member such as a key.

Stud bolt 51, for example, four stud bolts 51 are provided at the flange portion of the second inner race 142. The stud bolts 51 are inserted into holes 148 provided in the brake disk. Accordingly, the brake disk 149 is attached to the wheel bearing 140. A wheel H (not shown) is also attached to the wheel bearing 140.

A gap 150 is present between the second inner race 142 and the outer race 143, and is opened toward the brake disk 149. A seal portion 151 is provided so as to close the gap 150. The seal portion 151 is composed of, for example, steel core metal and rubber, and is accommodated in the annular gap 150 formed by the second inner race 142 and the outer race 143. Due to the seal portion 151, external dust, water, or the like is suppressed from intruding into the inside of the wheel bearing 140 (that is, the gaps between the outer race 143 and the second inner race 142, and between the outer race 143 and the first inner race 141). The seal portion 151 is disposed so as to face the brake disk 149. A first shield portion 152 is provided between the seal portion 151 and the brake disk 149 so as to cover the seal portion 151 and the end in the side of the brake disk 149 of the outer race 143.

Generally, the brake disk generates a braking force from the friction between the brake disk and the brake pad. At this time, heat is generated by the friction, so that the brake disk becomes hot. In general, since the wheel hub motor uses a limited space within the wheel, it is desirable that the axial dimension of the wheel hub motor be as short as possible. For this reason, the inner race of the wheel bearing is formed in a cylindrical shape, and the shift mechanism is disposed at the inner-diameter-side space. Even in the electric vehicle driving device 153 of the embodiment, the rolling element orbit diameter of the wheel bearing 140 is larger than that of the wheel bearing generally used in the vehicle. As a result, in the embodiment, the brake disk 149 and the rolling element orbit portion of the wheel bearing 140 are disposed to be close to each other. In the embodiment, since the first shield portion 152 is provided between the seal portion 151 and the brake disk 149, heat of the brake disk 149 is not directly transmitted to the seal portion 151, and the seal portion 151 is suppressed from being degraded due to the heat of the brake disk 149.

Figure 36:
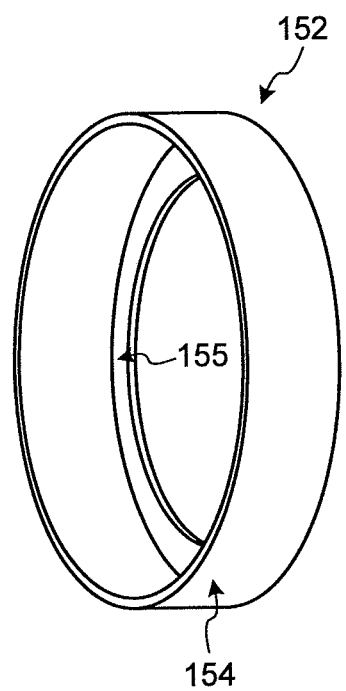
FIG. 36 is a perspective view illustrating a first shield portion according to the seventh embodiment.

FIG. 36 is a perspective view illustrating a first shield portion according to the seventh embodiment. The first shield portion 152 is a cylindrical member in which one edge of a cylinder 154 is provided with a donut-shaped disk portion 155 and the cross-section including the axis is formed in a substantially L-shape and desirably L-shape. The first shield portion 152 is fixed to an end 156 in the side of the brake disk 149 of the outer race 143. Further, the first shield portion 152 is formed in a shape along the second inner race 142 so as not to come into contact with the second inner race 142 The first shield portion 152 is disposed with a predetermined gap 157 with respect to the second inner race 142 in a degree that the rotation of the second inner race 142 is not disturbed. It is desirable that the gap 157 be as narrow as possible. Accordingly, large dust particles or the like may be suppressed from intruding into the wheel bearing 140. The first shield portion 152 is composed of various materials. For example, the shield portion is formed of an SPCC steel sheet (a cold rolled steel sheet) and various resins. In order to improve heat resistance of the first shield portion 152, it is desirable that the first shield portion 152 be composed of steel, particularly an SPCC steel sheet.

An opening 158 is formed between the first inner race 141 and the outer race 143 at the opposite side of the brake disk 149, that is, the vehicle body side. The opening 158 and an end 159 of the outer race 143 opposite to the brake disk 149 are covered by a second shield portion 160. Generally, the wheel bearing is filled with grease for lubrication. The second shield portion 160 suppresses the grease filled therein from flowing into a space inside the casing accommodating the shift mechanism 13 from the opening 158 opposite to the brake disk 149, and maintains satisfactory lubrication of the wheel bearing 140. The inside of the casing is a space that lubricant supplied for the lubrication of the shift mechanism 13 scatters, and the second shield portion 160 suppresses the scattering lubricant from intruding into the wheel bearing 140.

Figure 37:
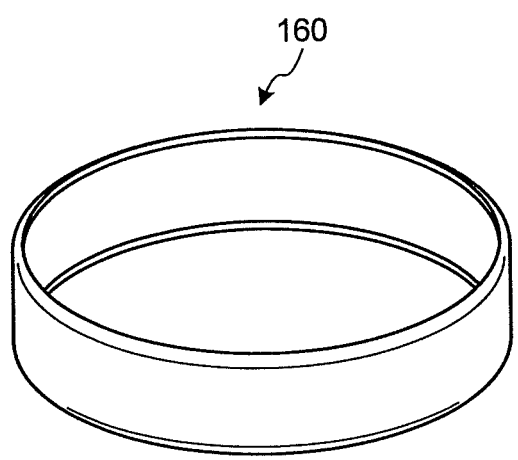
FIG. 37 is a perspective view illustrating a second shield portion according to the seventh embodiment.

FIG. 37 is a perspective view illustrating a second shield portion according to the seventh embodiment. The second shield portion 160 is a member formed in a shape in which both ends of a short cylinder are wrinkled in the axial direction, and has a cross-section formed in a substantially U-shape and desirably U-shape. The second shield portion 160 is fixed by being interposed between the outer race 143 and the second casing 100G2. The second shield portion 160 is formed in a shape along the outer periphery of the first inner race 141 so as not to come into contact with the outer periphery of the first inner race 141, and the second shield portion 160 is disposed with a predetermined gap with respect to the first inner race 141 in a degree that the rotation of the first inner race 141 is not disturbed. It is desirable that the gap 161 be as narrow as possible. Since the second shield portion 160 is disposed with the predetermined gap 161 with respect to the first inner race 141 and is formed in a shape along the outer periphery of the first inner race 141, satisfactory lubrication of the wheel bearing 140 may be maintained by further suppressing the outflow of grease. Scattering lubricant may be further suppressed from intruding into the wheel bearing 140.

The second shield portion 160 are composed of various materials. For example, the shield portion is formed of an SPCC steel sheet (a cold rolled steel sheet) and various resins. In order to improve heat resistance of the second shield portion 160, it is desirable that the second shield portion 160 be composed of steel, particularly an SPCC steel sheet.

The desirable aspect of the seventh embodiment is understood as follows. In the seventh embodiment, it is desirable that the second shield portion be provided so as to cover the end of the outer race opposite to the brake disk and the opening formed between the first inner race and the outer race and opened toward the opposite side of the brake disk. Accordingly, the grease filled in the wheel bearing may be suppressed from flowing from the opening opposite to the brake disk into the space inside the casing accommodating the shift mechanism, so that satisfactory lubrication of the wheel bearing is maintained. Further, the lubricant scattering inside the casing may be suppressed from intruding into the wheel bearing.

In the seventh embodiment, it is desirable that the first shield portion be disposed with a predetermined gap with respect to the second inner race and have a shape along the second inner race.

In the seventh embodiment, it is desirable that the second shield portion be disposed with a predetermined gap with respect to the first inner race and have a shape along the first inner race.

The configuration of the seventh embodiment may be appropriately applied to the embodiments below. The same configuration as that of the embodiment has the same effect.

Eighth Embodiment

Figure 38:
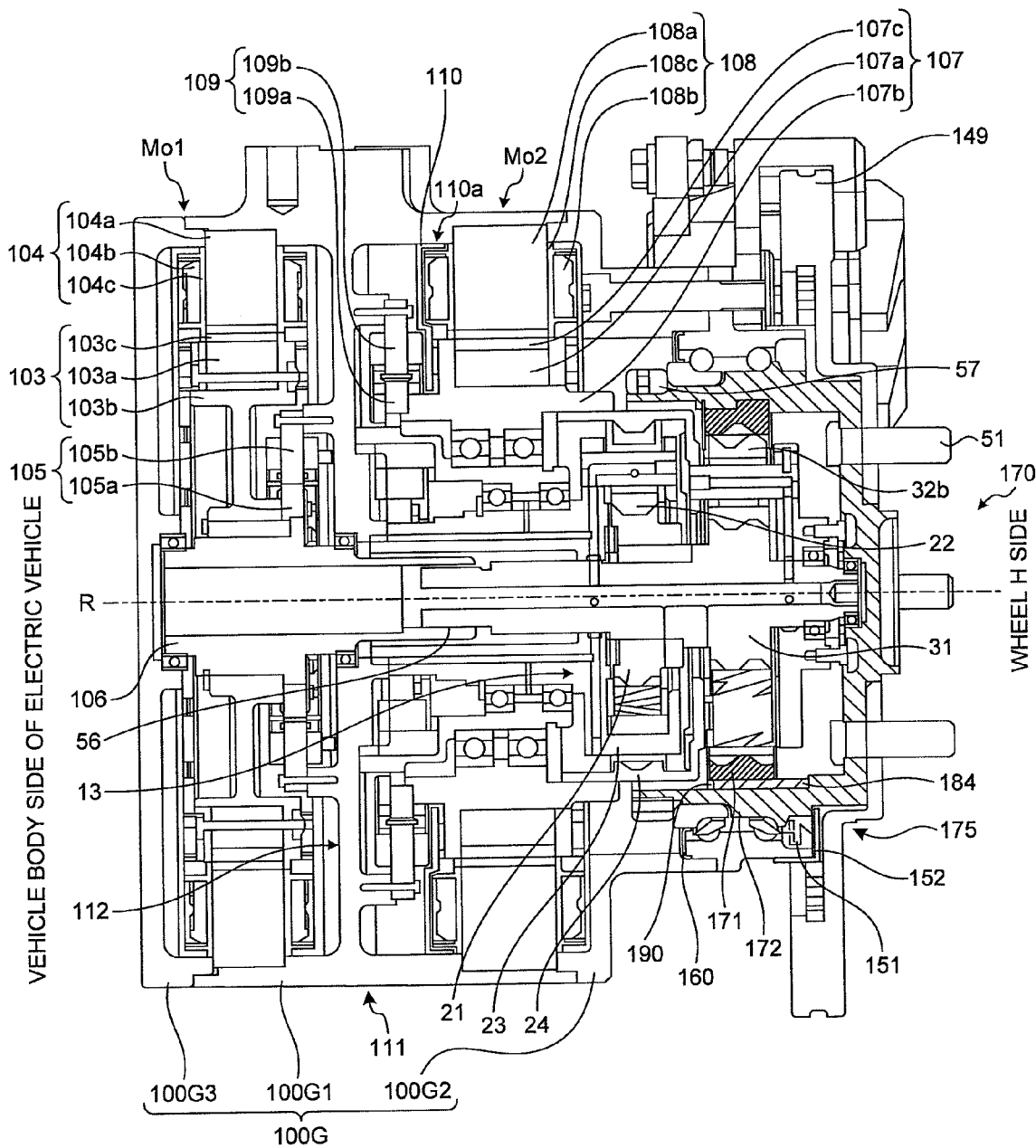
FIG. 38 is a cross-sectional view illustrating an electric vehicle driving device according to an eighth embodiment.
Figure 39:
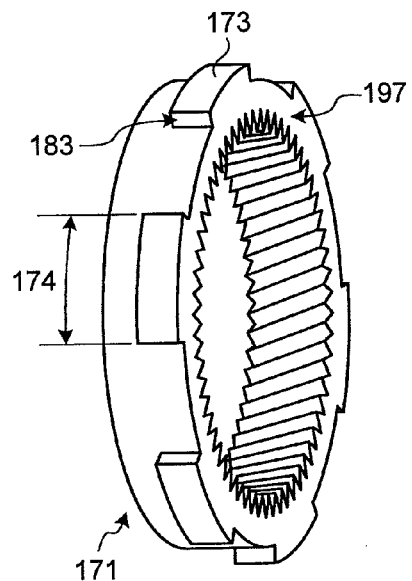
FIG. 39 is a perspective view illustrating a second ring gear according to the eighth embodiment.

FIG. 38 is a cross-sectional view illustrating an electric vehicle driving device according to an eighth embodiment. FIG. 39 is a perspective view illustrating a second ring gear according to the eighth embodiment. In the description below, FIG. 32 may be appropriately referred to. A second ring gear 171 is fixed to a wheel bearing 175 of an electric vehicle driving device 170 serving as a wheel hub motor. The second ring gear 171 has the same function as that of the second ring gear 34, and meshes with the third pinion gear 32b. The second ring gear 171 is a helical gear. Since the second ring gear 171 is formed as the helical gear, the allowable transmission torque may be increased in the same tooth width as that of a spur gear compared to the case of the spur gear. The second ring gear 171 is formed as a member separated from the second inner race 172. Since the tooth shape of the helical gear has a helical angle, an axial load is generated when transmitting a torque. When the second ring gear 171 and the second inner race 172 are formed as separate members, there is a need to provide a structure receiving the axial load. Therefore, a simple retaining member such as a C type retaining ring (C-ring) may not be used.

The second ring gear 171 and the second inner race 172 may support the axial load by the following configuration. A plurality of protrusions 173 are provided in the outer periphery of the second ring gear 171 at the same interval in the circumferential direction. In the embodiment, six protrusions 173 are formed. The protrusions 173 are not formed at the entire part of the axial length of the second ring gear 171, but are formed in a part thereof. The circumferential length 174 of the protrusion 173 will be described later. In the embodiment, the protrusions 173 are formed only at one end of the second ring gear 171, but may be formed at the axial center of the second ring gear 171. In this case, the cross-section of the protrusion is formed in a substantially convex shape and desirably a convex shape. In the embodiment, the shift mechanism 13 is connected to the wheel bearing 175. On the other hand, when the shift mechanism 63 is connected, the first ring gear 74 meshing with the first pinion gear 72 is formed in the same shape as that of the second ring gear, and is connected to the wheel bearing 175.

Figure 40:
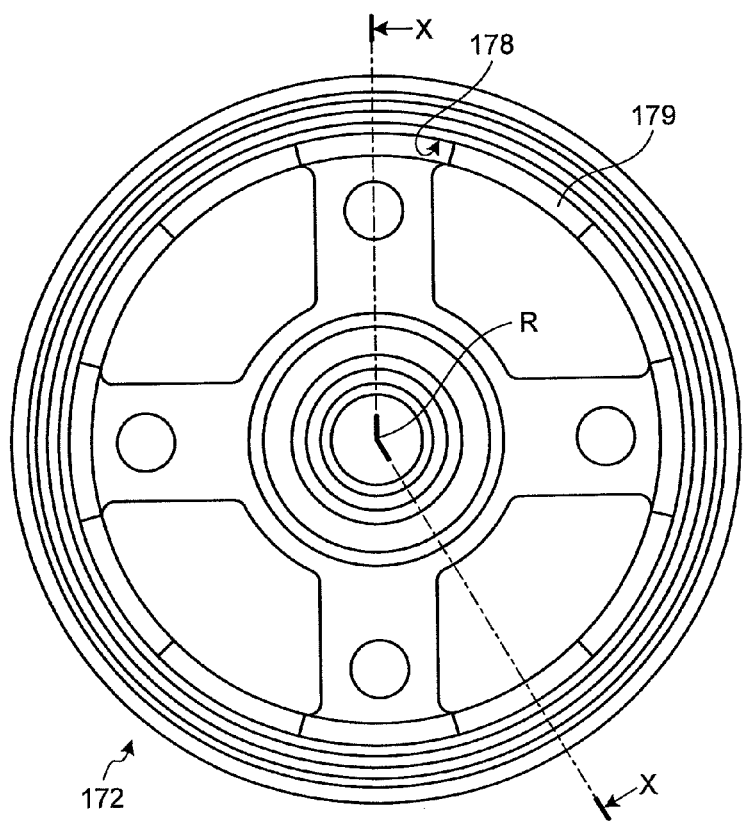
FIG. 40 is a front view illustrating a second inner race according to the eighth embodiment.
Figure 41:
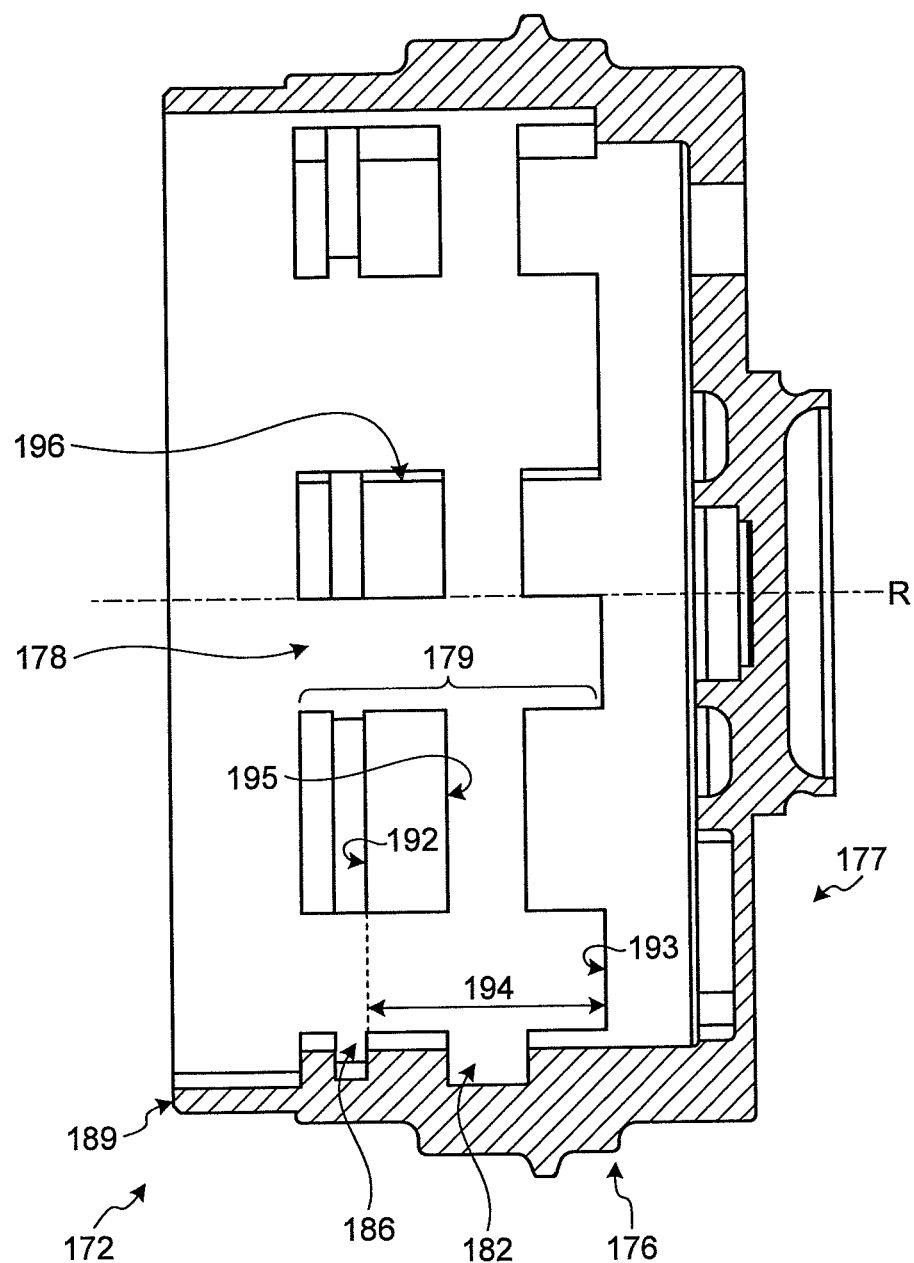
FIG. 41 is a cross-sectional view taken along the line X-X of FIG. 40.
Figure 42:
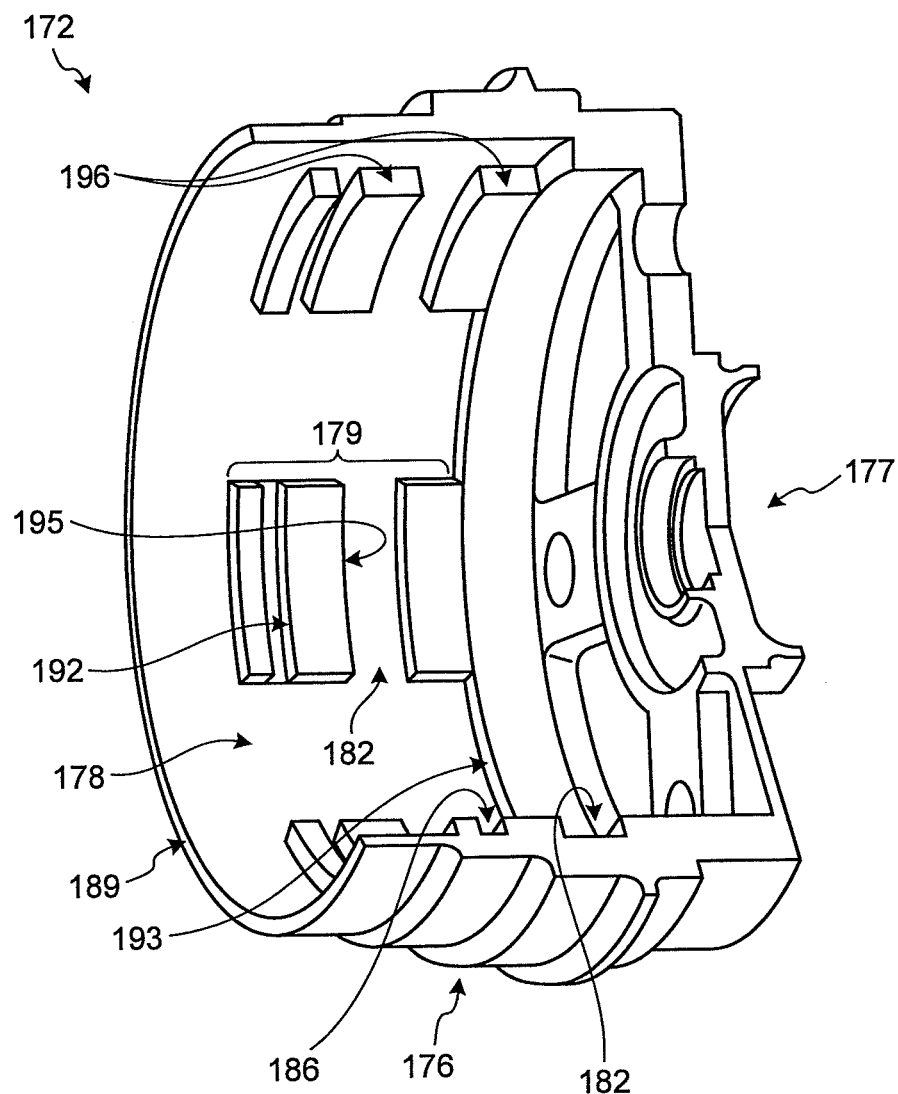
FIG. 42 is a cut model perspective view illustrating the second inner race according to the eighth embodiment.
Figure 43:
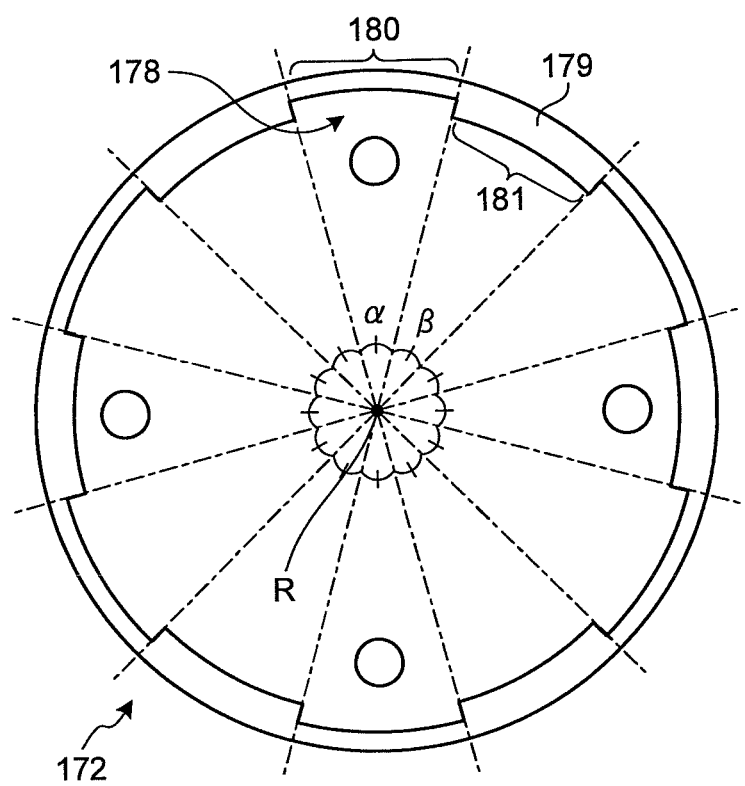
FIG. 43 is a diagram illustrating a shape of the second inner race and simply illustrates a cross-section when cutting the second inner race along a plane perpendicular to an axis.
Figure 44:
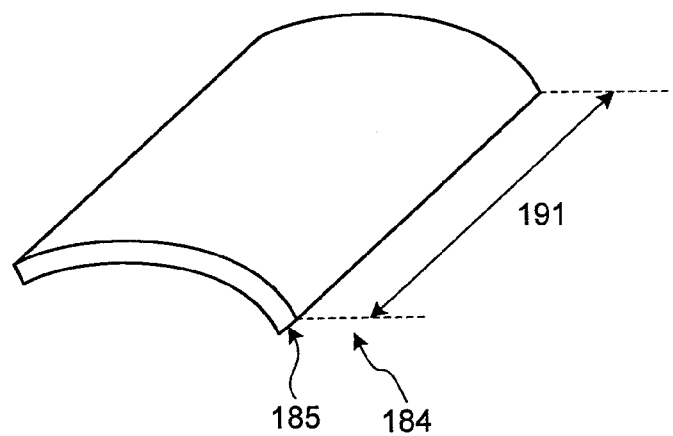
FIG. 44 is a perspective view illustrating a key member according to the eighth embodiment.
Figure 45:
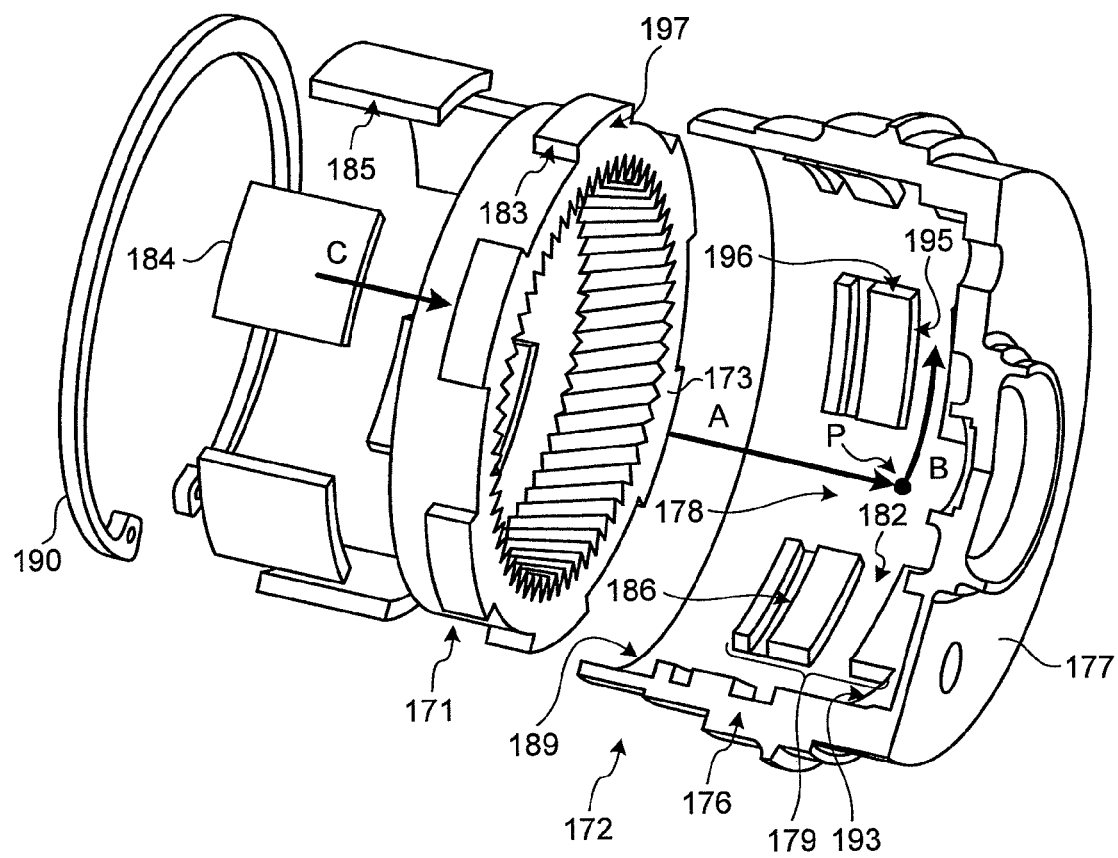
FIG. 45 is a diagram illustrating a method of assembling a part of a wheel bearing according to the fifth embodiment.
Figure 46:
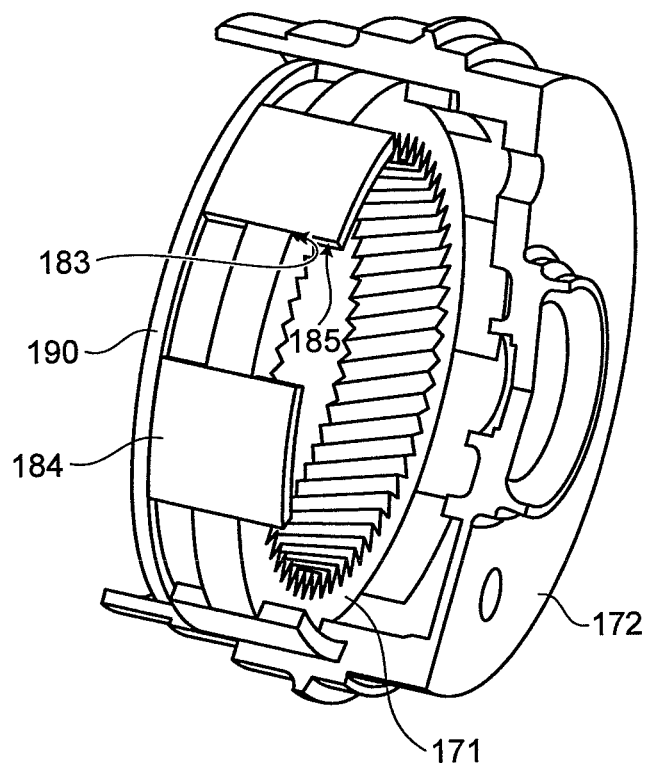
FIG. 46 is a diagram illustrating a part of the wheel bearing according to the eighth embodiment.

FIG. 40 is a front view illustrating a second inner race according to the eighth embodiment. FIG. 41 is a cross-sectional view taken along the line X-X of FIG. 40. FIG. 42 is a cut model perspective view illustrating the second inner race according to the eighth embodiment. FIG. 43 is a diagram illustrating a shape of the second inner race and simply illustrates a cross-section when cutting the second inner race along a plane perpendicular to an axis. FIG. 44 is a perspective view illustrating a key member according to the eighth embodiment. FIG. 45 is a diagram illustrating a method of assembling a part of a wheel bearing according to the fifth embodiment. FIG. 46 is a diagram illustrating a part of the wheel bearing according to the eighth embodiment.

The second inner race 172 (the inner race) includes a cylindrical portion 176 having a cylindrical shape and a wheel attachment portion 177 closing one opening of the cylindrical portion. The inner periphery of the cylindrical portion 176 is provided with concave portions 178 (key grooves) which extends in the axial direction of the second ring gear 171 and are provided as many as the protrusions 173. In the embodiment, six concave portions 178 are formed. The concave portions 178 are formed at the inner periphery of the cylindrical portion 176, and convex portions 179 as many as the protrusions 173 are also formed at the inner periphery of the cylindrical portion 176. The concave portions 178 are formed such that the center angles α are equal to each other when the circumferential length 180 of each concave portion 178 is set to an arc and the axis R is set to a center. The convex portions 179 are formed such that the center angles β are equal to each other when the circumferential length 181 of each convex portion 179 is set to an arc and the axis R is set to a center. The concave portion 178 and the convex portion 179 are formed respectively so that the center angle α and the center angle β are equal to each other.

In the embodiment, the center angle α and the center angle β are 30°. The center angle α and the center angle β are appropriately changed in accordance with the number of the concave portions 178 and the convex portions 179. The circumferential length 180 of the concave portion 178 is formed to be larger than the circumferential length 174 of the protrusion 173. That is, the circumferential length 174 of the protrusion 173 is formed to be smaller than the circumferential length 180 of the concave portion 178. That is, the outer diameter of the protrusion 173 is formed to be smaller than the inner diameter of the concave portion 178. As a result, the protrusion 173 may be inserted into the concave portion 178 in the axial direction. It is desirable that the circumferential length 180 of the concave portion 178 is formed to be larger than the circumferential length 174 of the protrusion 173 in a degree that the protrusion 173 may be sufficiently inserted into the concave portion 178. A difference between the inner radius of the concave portion 178 and the inner radius of the convex portion 179 is related to the size of the surface supporting the protrusions 173. That is, the number and the radial dimension of the protrusion 173 are appropriately determined in accordance with the radial load and the axial load generated in the second ring gear 171 at the time of transmitting the torque.

In order to easily process the concave portion 178, the axial end of the concave portion 178 may be provided with a groove in the radial direction, and be processed by a machining tool such as a slotter.

The inner periphery of the cylindrical portion 176 of the second inner race 172 is provided with an annular concave portion 182 (a first annular concave portion and a groove step portion) formed in an annular shape in the circumferential direction. The inner diameter of the annular concave portion 182 is equal to the inner diameter of the concave portion 178 or larger than the inner diameter of the concave portion 178. The annular concave portion 182 has a portion continuous to the concave portion 178. In the embodiment, the concave portion 178 is formed up to the vicinity of the wheel attachment portion 177 in relation to the annular concave portion 182. Therefore, a continuous cross-shaped groove is formed by the annular concave portion 182 and the concave portion 178. When the second ring gear 171 is operated, the radial load is applied to a circumferential end surface 183 of the protrusion 173, and is received by a circumferential end surface 185 of a key member 184 that is described hereinafter (the circumferential direction in relation to the key member 184 indicates the circumferential direction of the second inner race 172 after combining the second ring gear 171, the second inner race 172 and the key member 184, and the axial direction in relation to the key member 184 indicates the axial direction of the second inner race 172 after combining the second ring gear 171, the second inner race 172, and the key member 184, and the same applies to below). Since the concave portion 178 is formed up to the vicinity of the wheel attachment portion 177 in relation to the annular concave portion 182, the circumferential end surface 185 of the key member 184 may receive the radial load at both sides of the intersection position between the annular concave portion 182 and the concave portion 178. When the circumferential end surface 185 of the key member 184 may receive the radial load at one side of the position of the annular concave portion 182, the concave portion 178 may be formed only up to the annular concave portion 182.

The inner periphery of the cylindrical portion 176 of the second inner race 172 is provided with an annular C-ring groove 186 (a second annular concave portion) formed in an annular shape in the circumferential direction. The C-ring groove 186 is formed at a position close to the end surface 189 opposite to the wheel attachment portion 177 of the second inner race 172 in relation to the annular concave portion 182. A C-ring 190 is fitted into the C-ring groove 186 so as to retain the key member 184 after assembling the second inner race 172, the second ring gear 171, and the key member 184. Since the key member 184 is retained by the C-ring, the second inner race 172 and the second ring gear 171 may be simply coupled to each other. Instead of the C-ring 190, for example, an annular retaining member may be press-inserted into the groove.

As shown in FIG. 44, the key member 184 is a curved plate-shaped member. The key member 184 is formed to have a dimension fitted to the concave portion 178 with a slight gap therebetween. The curved surface of the key member 184 has a shape corresponding to the bottom surface of the concave portion 178, and the curvature radius of the curved surface is substantially equal to and desirably equal to the curvature radius of the concave portion 178. The axial length 191 of the key member 184 is formed to be equal to the length 194 from the axial end surface 192 in the side of the wheel attachment portion 177 of the C-ring groove 186 to the axial end surface 193 of the concave portion 178. The concave portion 178 in the side of the wheel attachment portion 177 in relation to the annular concave portion 182 is formed in a substantially tapered shape of which the tip is narrowed, and a part of the key member 184 may be formed in a substantially tapered shape of which the tip is narrow, so that the key member 184 may be fitted to the tapered portion of the concave portion 178.

Next, a procedure of assembling the second inner race 172, the second ring gear 171, and the key member 184 will be described by using FIGS. 45 and 46. First, the protrusion 173 of the second ring gear 171 is inserted into the concave portion 178 of the second inner race 172 from the opposite side of the wheel attachment portion up to the position of the annular concave portion 182 (arrow A). When the protrusion 173 of the second ring gear 171 is inserted up to the position P where the concave portion 178 and the annular concave portion 182 intersect each other, the second ring gear 171 is rotated so that the protrusion 173 is supported by the axial end surface 195 of the annular concave portion 182, and the protrusion 173 is rotated at the position of the annular concave portion 182 (arrow B). When the second ring gear 171 is rotated by one pitch, that is, 30°, the concave portion 178 blocked by the protrusion 173 becomes empty, so that the protrusion 173 is fitted to the annular concave portion 182. The key member 184 is inserted into the empty concave portion 178 until bumping into the axial end surface 193 of the concave portion 178 (arrow C). When the key member 184 is inserted into the concave portion 178, the second ring gear 171 is not rotatable relative to the second inner race 172. After the key member 184 is inserted into the concave portion 178, the C-ring 190 is fitted into the C-ring groove 186 so as to retain the key member 184.

The radial load when operating the second ring gear 171 is transmitted from the circumferential end surface 183 of the protrusion 173 of the second ring gear 171 to the circumferential end surface 185 of the key member 184, and is transmitted from the circumferential end surface 185 of the key member 184 to the circumferential side surface 196 of the concave portion 178 to be received thereon. The axial load when operating the second ring gear 171 is transmitted from the axial end surface 197 of the protrusion 173 of the second ring gear 171 to the axial end surface 195 of the annular concave portion 182 to be received thereon. Since the key member 184 does not receive the axial load, a member for retaining the key member 184 may be enough as a member such as the C-ring 190.

In the wheel bearing 175 according to the embodiment, the second ring gear 171 and the second inner race 172 are formed as separate members. In general, in the structure in which one opening of the cylindrical portion is closed as in the second inner race 172 of the embodiment, it is difficult to process a gear on the inner periphery thereof. It is desirable to carry out highly precise finishing by grinding a gear in order to reduce noise in the gear or improve torque transmission. However, it is difficult to carry out the grinding in the structure in which one opening of the cylindrical portion is closed. In the embodiment, since the second ring gear 171 and the second inner race 172 are formed as separate members, the second ring gear 171 may be easily formed with high precision.

Since the wheel bearing 175 according to the embodiment includes the second ring gear 171, the second inner race 172, and the key member 184 as described above, even when the second ring gear 171 and the second inner race 172 are formed as separate members, the radial load and the axial load may be received.

Furthermore, the desirable aspect of the eighth embodiment is understood as follows. In the eighth embodiment, it is desirable that the concave portion be formed up to a position near the wheel attachment portion in relation to the annular concave portion. Accordingly, the key member may receive the radial load at both sides of the intersection position between the annular concave portion and the concave portion.

In the eighth embodiment, it is desirable that the second annular concave portion serving as the concave portion be formed at the opposite side of the wheel attachment portion of the cylindrical portion so as to have an annular shape in the circumferential direction, and the C-ring be fitted to the annular concave portion after the key member is inserted into the concave portion so that the key member is fixed. Accordingly, the inner race and the first ring gear or the second ring gear are coupled to each other by a simple method.

The configuration of the eighth embodiment may be appropriately applied to the embodiments below. The same configuration as that of the embodiment has the same effect.

Ninth Embodiment

Figure 47:
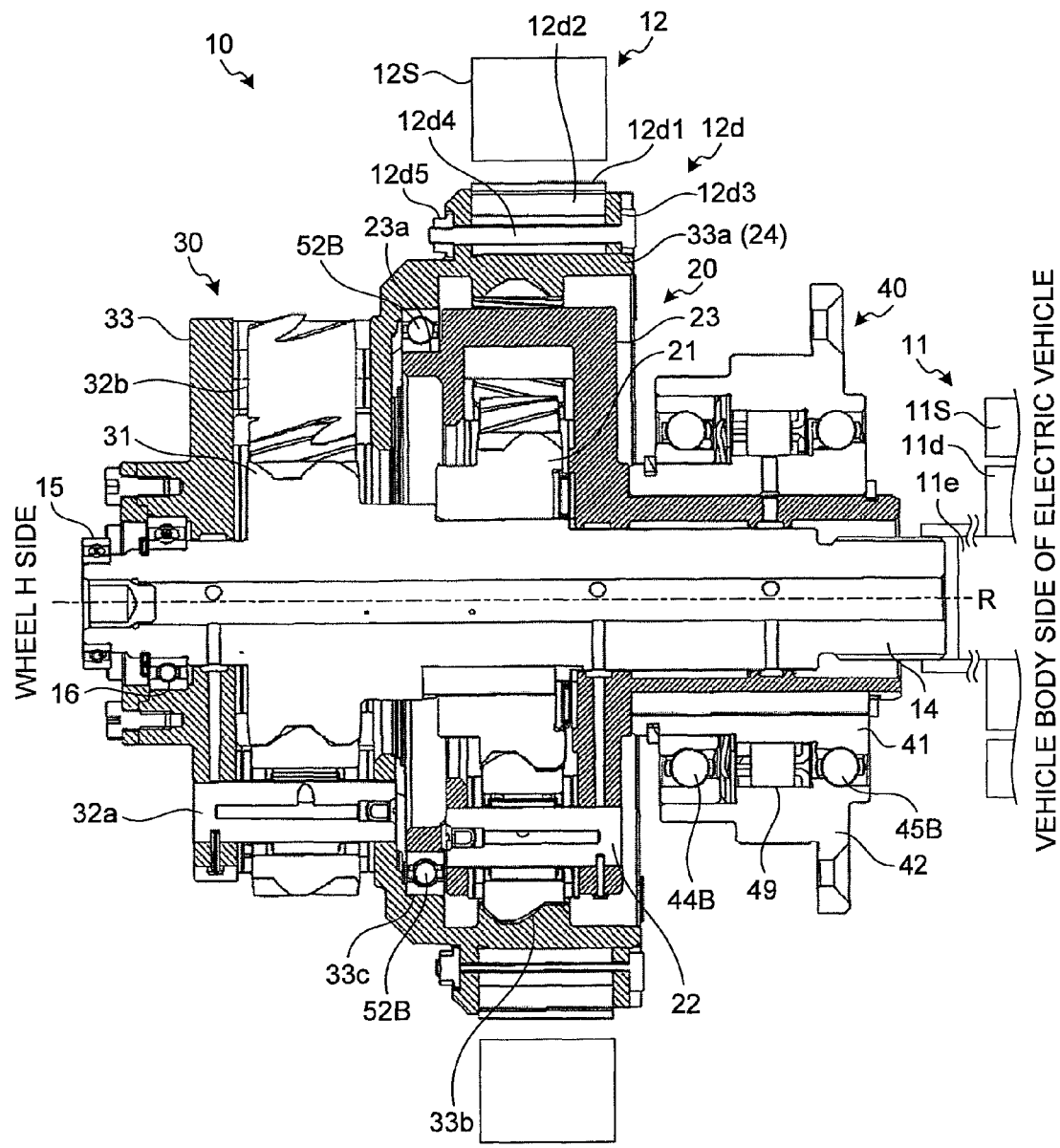
FIG. 47 is a cross-sectional view schematically illustrating a configuration of a shift mechanism of an electric vehicle driving device of a ninth embodiment.
Figure 48:
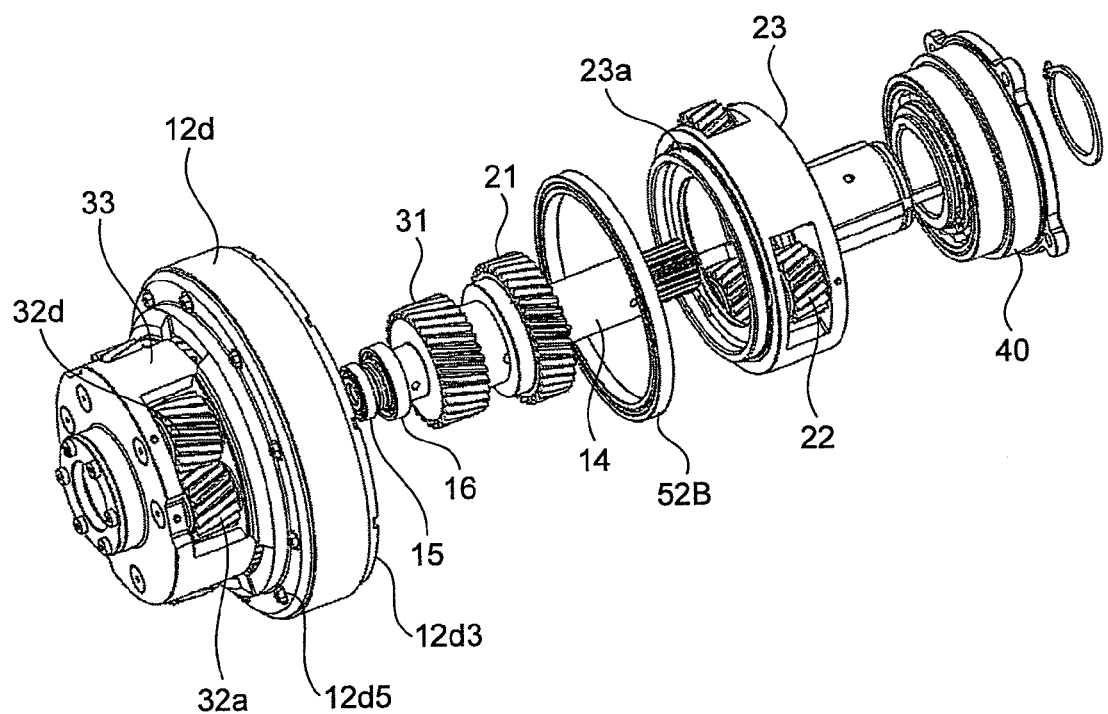
FIG. 48 is a diagram illustrating a disassembled shift mechanism of the electric vehicle driving device of the ninth embodiment.

FIG. 47 is a cross-sectional view schematically illustrating a configuration of a shift mechanism of an electric vehicle driving device of a ninth embodiment. FIG. 48 is a diagram illustrating a disassembled shift mechanism of the electric vehicle driving device of the ninth embodiment. An example of the shift mechanism 13 of the electric vehicle driving device 10 will be described by using FIGS. 47 and 48. Hereinafter, in the above-described components, the same description is not repeated, and the same reference signs indicate the components. FIG. 47 also illustrates the first motor 11, the second motor 12, and the sun gear shaft 14. The electric vehicle driving device 10 serving as the wheel hub motor includes a bearing 15a, a bearing 15b, and a carrier bearing 52B.

As shown in FIG. 47, the first motor 11 includes a first stator 11S, a first rotor 11d, and a first motor output shaft 11e. The first stator 11S is a cylindrical member, and the outer radial side is fixed to the casing G. In the first stator 11S, a plurality of first coils are wound on the first stator core through the first insulator. The first rotor lid is disposed inside the first stator 11S in the radial direction. The first rotor lid includes a first rotor core and a first magnet. The first rotor core is a cylindrical member. A plurality of first magnets are provided in the outer periphery of the first rotor core. The first motor output shaft 11e is a bar-shaped member. The first motor output shaft 11e is connected to the first rotor core of the first rotor 11d. In the first motor 11, the first rotor core is provided with a first resolver which detects the rotary angle of the first rotor core.

The second motor 12 includes a second stator 12S and a second rotor 12d. The second stator 12S is a cylindrical member, and the outer radial side thereof is fixed to the casing G. In the second stator 12S, a plurality of second coils are disposed on the second stator core wound through the second insulator.

The second rotor 12d is disposed inside the second stator 12S in the radial direction. The second rotor 12d is supported by the casing G along with the clutch device 40 so as to be rotatable about the rotary axis R. The second rotor 12d includes a second rotor core 12d1, a second magnet 12d2, a balance disk 12d3, a bolt 12d4, and a nut 12d5. The second rotor core 12d1 is a cylindrical member. A plurality of second magnets 12d2 are provided in the outer periphery of the second rotor core 12d1. The balance disk 12d3 is a member for adjusting a non-uniform rotation of the second rotor 12d, and is disposed at both ends of the second rotor core 12d1 in the axial direction. The second magnet 12d2 and the balance disk 12d3 are fixed to the second rotor core 12d1 by the bolt 12d4 and the nut 12d5. In the second motor 12, the second rotor core 12d1 is provided with a second resolver which detects the rotary angle of the first rotor core 12d1.

The sun gear shaft 14 is connected to the first motor output shaft 11e, and rotates along with the first motor output shaft 11e. The sun gear shaft 14 is inserted into the shift mechanism 13, and is connected to the first sun gear 21 and the second sun gear 31. Further, the sun gear shaft 14 supports the first carrier 23 and the second carrier 33 so as to be relatively rotatable. Further, the wheel H side of the sun gear shaft 14 is provided with a bearing 15 and a bearing 16. The bearing 15 is a rolling ball bearing, and supports the sun gear shaft 14 and a housing of a hub bearing (not shown) so as to be relatively rotatable. The bearing 16 supports the sun gear shaft 14 and the second carrier 33 of the second planetary gear mechanism 30 so as to be relatively rotatable.

The shift mechanism 13 includes the first planetary gear mechanism 20, the second planetary gear mechanism 30, and the clutch device 40 as described above. The first planetary gear mechanism 20 is disposed in the vehicle body side of the electric vehicle in relation to the second planetary gear mechanism 30. That is, the second planetary gear mechanism 30 is disposed in the wheel H side in relation to the first planetary gear mechanism 20. Further, in the second planetary gear mechanism 30, a second ring gear (not shown) is disposed at the outer periphery of the third pinion gear 32b. The second ring gear is connected to the wheel bearing 50 as described above. The shift mechanism 13 transmits the rotation of the first motor 11 and the second motor 12, and rotates the second ring gear and the wheel bearing 50, so that the wheel H is rotated.

The second carrier 33 of the second planetary gear mechanism 30 includes a protrusion 33a which extends to the outer periphery of the first planetary gear mechanism 20. The protrusion 33a is disposed at a position facing the first carrier 23 of the first planetary gear mechanism 20. That is, the protrusion 33a of the second carrier 33 is disposed at a position overlapping with the first carrier 23, the first sun gear 21, and the like of the first planetary gear mechanism 20 in the direction of the rotary axis. The protrusion 33a has a function of the first ring gear 24. The respective components of the second rotor 12d of the second motor 12 are fixed to the outer peripheral surface of the protrusion 33a, and the inner gear 33b is formed in the inner peripheral surface of the protrusion 33a. The inner gear 33b of the protrusion 33a engages with the first pinion gear 22.

In the second carrier 33, the radial inner surface of the base end of the protrusion 33a is provided with a bearing attachment portion 33c. Even in the first carrier 23, the outer surface facing the bearing attachment portion 33c in the radial direction is provided with a bearing attachment portion 23a.

The carrier bearing 52B is disposed between the bearing attachment portion 23a and the bearing attachment portion 33c. The carrier bearing 52B is a rolling ball bearing. The inner peripheral surface and the surface in the vehicle body side of the electric vehicle (the surface in the first sun gear 21 side) of the carrier bearing 52B come into contact with the bearing attachment portion 23a, and the outer peripheral surface and the surface in the wheel H side (the surface in the second sun gear 31 side) of the carrier bearing 52B come into contact with the bearing attachment portion 33c. The carrier bearing 52B supports a radial load, an axial load, and a moment load generated between the first carrier 23 and the second carrier 33, and supports the first carrier 23 and the second carrier 33, coaxially with the sun gear shaft 14 in a rotatable state. The gap between the first carrier 23 and the second carrier 33 is maintained in the rotatable state, so that the positions of the first carrier 23 and the second carrier 33 do not deviate with respect to the rotary axis.

Figure 49:
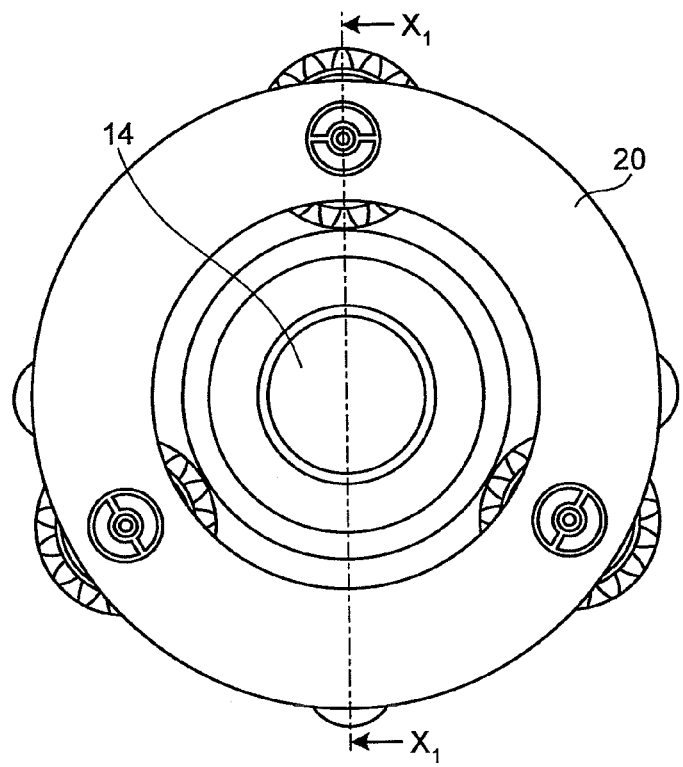
FIG. 49 is a diagram schematically illustrating an appearance of a first planetary gear mechanism and a clutch device of the ninth embodiment.
Figure 50:
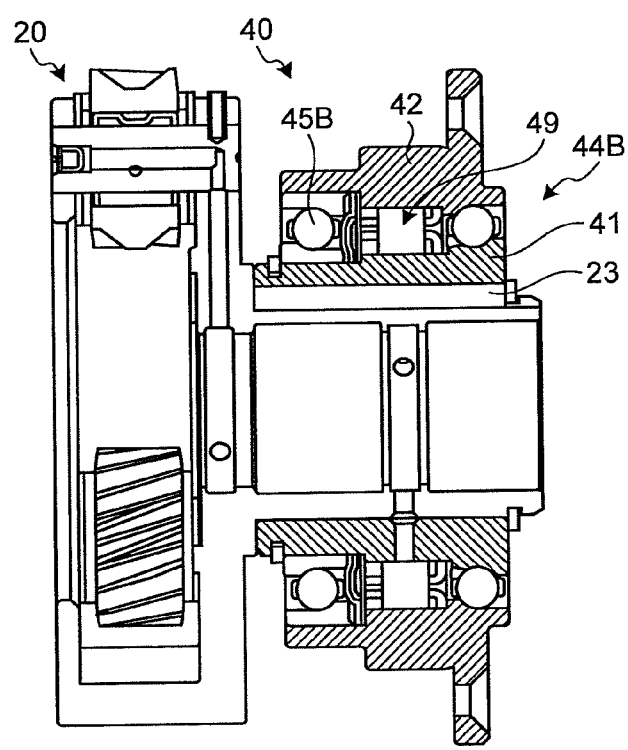
FIG. 50 is a cross-sectional view taken along the line $X_1$-$X_1$ of FIG. 49.
Figure 51:
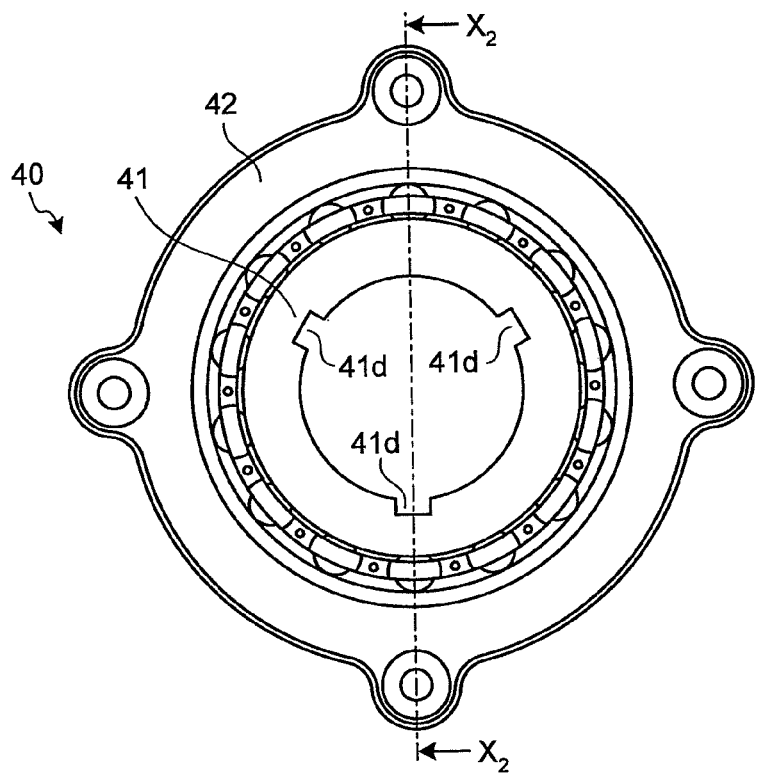
FIG. 51 is a diagram schematically illustrating an appearance of the clutch device of the ninth embodiment.
Figure 52:
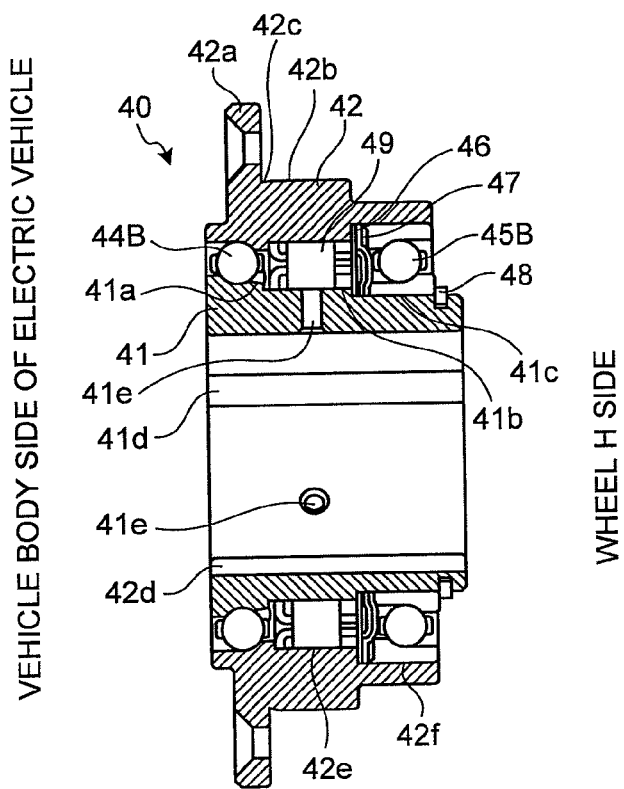
FIG. 52 is a cross-sectional view taken along the line $X_2$-$X_2$ of FIG. 51.
Figure 53:
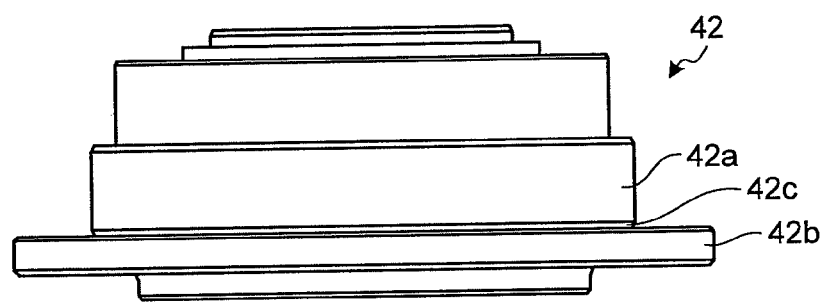
FIG. 53 is a plan view schematically illustrating an appearance of a clutch device of the ninth embodiment.
Figure 54:
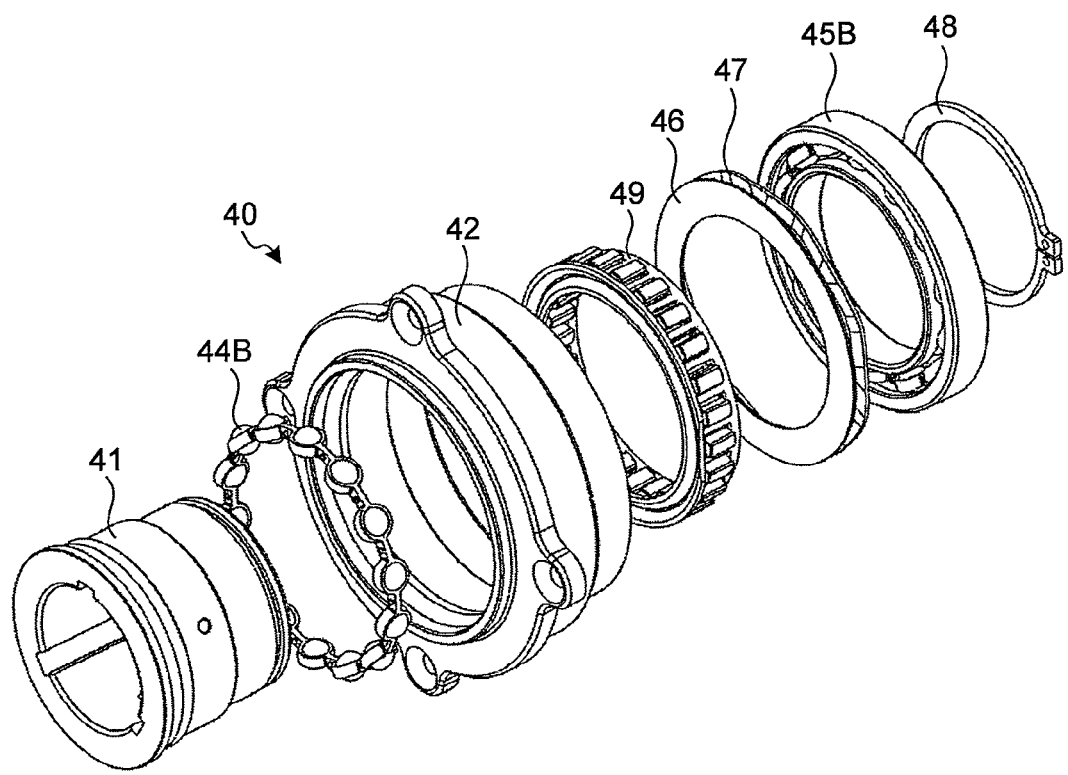
FIG. 54 is a diagram illustrating a disassembled clutch device of the ninth embodiment.

FIG. 49 is a diagram schematically illustrating an appearance of a first planetary gear mechanism and a clutch device of the ninth embodiment. FIG. 50 is a cross-sectional view taken along the line $X_1$-$X_1$ of FIG. 49. FIG. 51 is a diagram schematically illustrating an appearance of the clutch device of the ninth embodiment. FIG. 52 is a cross-sectional view taken along the line $X_2$-$X_2$ of FIG. 51. FIG. 53 is a plan view schematically illustrating an appearance of a clutch device of the ninth embodiment. FIG. 54 is a diagram illustrating a disassembled clutch device of the ninth embodiment. FIG. 52 illustrates the clutch device 40 in the direction opposite to that of FIG. 50. The clutch device 40 of the embodiment will be described by using FIGS. 49 to 54.

As shown in FIGS. 49 and 50, the clutch device 40 is disposed at the outer periphery of the first carrier 23 of the first planetary gear mechanism 20, and regulates the rotation of the first carrier 23. The clutch device 40 is a sprag type one-way clutch, and includes the first inner race (the second member) 41, the first outer race (the first member) 42, a clutch mechanism 49, a first bearing 44B, a second bearing 45B, a clutch support portion 46, an elastic body 47, and a retaining ring 48.

The first inner race 41 is formed in a cylindrical shape, the inner surface in the radial direction (the inner peripheral surface) is connected to the first carrier 23, and the outer surface in the radial direction (the outer peripheral surface) is connected to the clutch mechanism 49, the first bearing 44B, and the second bearing 45B. In the first inner race 41, the radial outer surface (the outer peripheral surface) has different diameters (a state in which a distance from the rotary axis R is different) at a first surface 41a coming into contact with the first bearing 44B, a second surface 41b coming into contact with the clutch mechanism 49, and a third surface 41c coming into contact with the second bearing 45B. In the first inner race 41, the diameter of the first surface 41a is larger than that of the second surface 41b, and the diameter of the second surface 41b is larger than that of the third surface 41c. That is, the diameter of the outer peripheral surface of the first inner race 41 becomes smaller as it moves from the vehicle body side of the electric vehicle to the wheel H side. In the first inner race 41, a step is formed at the boundary between the first surface 41a and the second surface 41b, and a step is formed at the boundary between the second surface 41b and the third surface 41c. The first surface 41a, as shown in FIG. 52, is a curved surface which is convex toward the rotary axis R, of which the diameter becomes smaller as an area coming into contact with the first bearing 44B moves toward the wheel H in a part of the vehicle body side of the electric vehicle. Further, a key groove 41d is formed in the inner peripheral surface of the first inner race 41. The key groove 41d is a groove extending in the direction parallel to the rotary axis R, and three grooves are formed at the same interval in the circumferential direction. The key grooves 41d are formed at the same interval as that of the key grooves formed in the sun gear shaft 14, and when the key is inserted thereinto, the first inner race 41 may be fixed to the sun gear shaft 14 in the rotation direction. Further, in the first inner race 41g, an oil supply hole 41e is formed in the inner peripheral surface so as to supply hydraulic oil to the clutch mechanism 43.

The first outer race 42 is disposed outside the first inner race 41 in the radial direction. The first outer race 42 is formed in a cylindrical shape, and the inner peripheral surface thereof is connected to the clutch mechanism 49, the first bearing 44B, and the second bearing 45B. As shown in FIGS. 51 to 54, the radial outer surface (the outer peripheral surface) of the first outer race 42 includes a flange 42a and a circumferential portion 42b. The flange 42a is fixed to the casing G. The circumferential portion 42b has a shape in which two columnar shapes with different diameters are connected to each other. Further, the connection portion between the flange 42a and the circumferential portion 42b is provided with a recess 42c having a diameter smaller than that of the circumferential portion 42b. In the first outer race 42, the radial inner surface (the inner peripheral surface) have different diameters from each other (a state in which a distance is different from the rotary axis R) at a first surface 42d coming into contact with the first bearing 44B, a second surface 42e coming into contact with the clutch mechanism 49, and a third surface 42f coming into contact with the second bearing 45B. In the first outer race 42, the diameter of the first surface 42d is smaller than that of the second surface 42e, and the diameter of the second surface 42e is smaller than that of the third surface 42f. That is, the diameter of the inner peripheral surface of the first outer race 42 becomes larger as it moves from the vehicle body side of the electric vehicle to the wheel H side. In the first outer race 42, a step is formed at the boundary between the first surface 42d and the second surface 42e, and a step is formed at the boundary between the second surface 42e and the third surface 42f. The first surface 41a, as shown in FIG. 52, is a curved surface which is convex toward the outer diameter side, of which the diameter becomes larger as an area coming into contact with the first bearing 44B moves toward the vehicle body of the electric vehicle in a part of the wheel H side. Furthermore, the clutch mechanism 49, the first bearing 44B, and the second bearing 45B are all members capable of relatively rotating the inner peripheral surface and the outer peripheral surface, and the first inner race 41 and the first outer race 42 are disposed so as to be relatively rotatable.

The clutch mechanism 49 is a sprag type one-way clutch, and includes a transmission portion disposed between the first inner race 41 and the first outer race 42. The clutch mechanism 49 is disposed between the second surface 41b and the second surface 42e. The transmission portion includes a plurality of sprags. The sprags are friction engagement members that allow the first inner race 41 and the first outer race 42 to engage with each other due to the friction. The sprag is a columnar member, and is formed in a cocoon shape of which the center of the bottom surface is narrowed. In the side surfaces of the sprag, an inner race contact surface is the surface where the sprag comes into contact with the first inner race 41, and is a curved surface having a curvature larger than a curvature of a side surface of a column with a circular bottom surface. In the side surfaces of the sprag, an outer race contact surface is the surface where the sprag comes into contact with the first outer race 42, and is also a curved surface having a curvature larger than a curvature of a side surface of a column with a circular bottom surface. However, the curvature of the inner race contact surface and the curvature of the outer race contact surface may be different from each other. The plurality of sprags are disposed between the outer periphery of the first inner race 41 and the inner periphery of the first outer race 42 at the same interval in the circumferential direction of the first inner race 41 and the first outer race 42.

The clutch mechanism 49 is a mechanism in which the first inner race 41 and the second outer race 42 are relatively rotatable only in one direction. In the clutch mechanism 49, when a rotational force acts on the first inner race 41 in the first direction, the transmission portion meshes with the first inner race 41 and the first outer race 42. Accordingly, the rotational force is transmitted between the first inner race 41 and the first outer race 42. Accordingly, a force is transmitted between the first inner race 41 and the first outer race 42 through the clutch mechanism 49, so that the first carrier 23 receives a reaction force from the casing G. Therefore, the clutch mechanism 49 may regulate the rotation of the first carrier 23. Further, in the clutch mechanism 49, when a rotational force acts on the first inner race 41 in the second direction, the transmission portion does not mesh with the first inner race 41 and the first outer race 42. Accordingly, the rotational force is not transmitted between the first inner race 41 and the first outer race 42, so that the first carrier 23 does not receive a reaction force from the casing G. Therefore, the clutch mechanism 49 does not regulate the rotation of the first carrier 23. In this manner, the clutch mechanism 49 realizes a function as the one-way clutch device. In the clutch mechanism 49, the first inner race 41 is used as the first member, and the first outer race 42 is used as the second member. However, a second inner race may be provided between the first inner race 41 and the transmission portion, and a second outer race may be provided between the first outer race 42 and the transmission portion.

Here, the clutch mechanism 49 may use various mechanisms as the mechanism of the transmission portion, and is not limited to a configuration using the sprag as in the embodiment. The roller clutch device or the cam clutch device may be used. However, the capacity of the rotational force (torque) of the cam clutch device is larger than that of the roller clutch device. That is, in the cam clutch device, the magnitude of the force transmitted between the first inner race 41 and the first outer race 42 is larger than that of the roller clutch device. Therefore, the clutch device 40 may transmit the larger rotational force in the case of the cam clutch device. Further, when the clutch mechanism 49 uses the sprag as the friction engagement member, the plurality of sprags more than the number of the cams, each of which has a bottom surface similar to a circle, may be disposed. As a result, the torque capacity of the clutch mechanism 49 may be made to be larger than the torque capacity of the cam clutch device having the same attachment dimension as that of the clutch mechanism 49.

Since the clutch mechanism 49 is formed as the one-way clutch device, a mechanism for moving a piston is not needed, and electric power for operating an electromagnetic actuator is not also needed. Since the clutch mechanism 49 is formed as the one-way clutch device, the engagement state and the disengagement state may be switched by switching the direction of the rotational force acting on the first inner race 41 or the first outer race 42 (in the embodiment, the first inner race 41). Therefore, since the clutch device 40 is formed as the one-way clutch device, the number of the components may be decreased, and the size (of the clutch device 40) may be decreased.

The first bearing 44B is a rolling ball bearing disposed in the wheel side in relation to the clutch mechanism 49, and supports the inner race 41 and the outer race 42 so as to be relatively rotatable. The first bearing 44B is disposed between the first surface 41a and the first surface 42d. In the first bearing 44B, the inner race 41 is the inner race of the first bearing 44B, and the outer race 42 is the outer race of the first bearing 44B. That is, the inner race of the first bearing 44B and the first inner race 41 of the clutch device 40 are integrated with each other, and the outer race of the first bearing 44B and the first outer race 42 of the clutch device 40 are integrated with each other. That is, the first bearing 44B has a shape in which the ball portion of the rolling ball bearing comes into direct contact with the first inner race 41 and the first outer race 42, and the housing is not provided.

The second bearing 45B is a rolling ball bearing which is disposed in the wheel H side in relation to the clutch mechanism 49, and supports the first inner race 41 and the first outer race 42 so as to be relatively rotatable. The second bearing 45B includes the ball portion of the rolling ball bearing, the inner race housing, and the outer race housing, in which the inner race housing faces the first inner race 41, and the outer race housing faces the first outer race 42. The second bearing 45B is disposed between the third surface 41c and the third surface 42f. The first bearing 44B and the second bearing 45B of the embodiment are angular contact ball bearings.

The clutch support portion (clutch retainer) 46 is an annular plate-shaped member, and is disposed between the clutch mechanism 49 and the second bearing 45B. The clutch support portion 46 is disposed facing the surface of the clutch mechanism 49 in the second bearing 45B side. The clutch support portion 46 is formed in an annular shape having a width larger than that of the line connecting the second surface 41b and the second surface 42e and having a width smaller than the line connecting the third surface 41c and the third surface 42f. The clutch support portion 46 is pushed toward the clutch mechanism 49 by the elastic body 47 so as to regulate the movement of the clutch mechanism 49 to the elastic body 47 side. That is, the clutch support portion 46 supports the clutch mechanism 49 between the second surface 41b and the second surface 42e.

The elastic body 47 is disposed between the clutch support portion 46 and the second bearing 45B, and pushes the clutch support portion 46 toward the clutch mechanism 49. A wave washer may be used as the elastic body 47. The elastic body 47 has a natural length larger than the space of the clutch support portion 46 and the second bearing 45B, and is contracted by being disposed between the clutch support portion 46 and the second bearing 45B, so that it exerts a force in a direction in which the clutch support portion 46 and the second bearing 45B are separated from each other. Accordingly, the clutch support portion 46 is pushed toward the clutch mechanism 49, and the second bearing 45B is pushed toward the wheel H.

The retaining ring 48 is a C-shaped retaining ring, and is fitted into a groove formed at a position of the wheel H side in relation to the third surface 41c of the inner race 41. A part of the retaining ring 48 protrudes toward the outer periphery, and faces the second bearing 45B. The retaining ring 48 regulates the movement of the second bearing 45B toward the wheel H.

With the above-described configuration, the electric vehicle driving device 10 holds the wheel H, and transmits the rotational force output from the first motor 11 and the second motor 12 to the wheel H, thereby the electric vehicle may run.

In the clutch device 40, the first bearing 44B and the second bearing 45B are disposed at both sides of the clutch mechanism 49. That is, the clutch mechanism 49 is interposed between the first bearing 44B and the second bearing 45B. Accordingly, the clutch device 40 may receive the radial load, the axial load, the moment load, and the like concerned with the clutch device 40 using the first bearing 44B and the second bearing 45B. Since the bearing and the clutch mechanism are integrated with each other, the attachment volume may be decreased, and the device may be decreased in size and weight.

Further, in the clutch device 40, the arrangement area for the first bearing 44B, the clutch mechanism 49, and the second bearing 45B gradually increases, so that the device may be manufactured by sequentially fitting members from a small member at the time of the manufacturing. Accordingly, the manufacturing may be simply carried out.

In the clutch device 40, a portion contacting the first bearing 44B in the outer race 42 is formed as a curved surface which decreases in size toward the inner diameter side as it moves to the second bearing 45B, and a portion contacting the first bearing 44B in the inner race 41 is formed as a curved surface which increases in size toward the outer diameter side as it moves to the second bearing 45B. Therefore, the center of the contact area with the outer race 42 in the first bearing 44B may be deviated toward the second bearing 45B in relation to the center of the contact area with the inner race 41. In this manner, since the contact axis of the first bearing 44B is deviated, the load with respect to each direction may be received. It is desirable that the center of the contact area with the outer race 42 in the second bearing 45B be deviated toward the first bearing 44B in relation to the center of the contact area with the inner race 41. In this manner, since both axial directions are set to a direction different from the axis perpendicular to the rotary axis R, each bearing may receive a force in the direction parallel to the rotary axis R, and thus, durability of the device may improve.

Since the clutch device 40 includes the clutch support portion 46, the elastic body 47, and the retaining ring 48, the clutch mechanism 49, the first bearing 44B, and the second bearing 45B may be supported at a predetermined position, and an excessive load may be suppressed from being applied to the respective members. The structure of the clutch device is not limited to the above-described embodiments.

Figure 55:
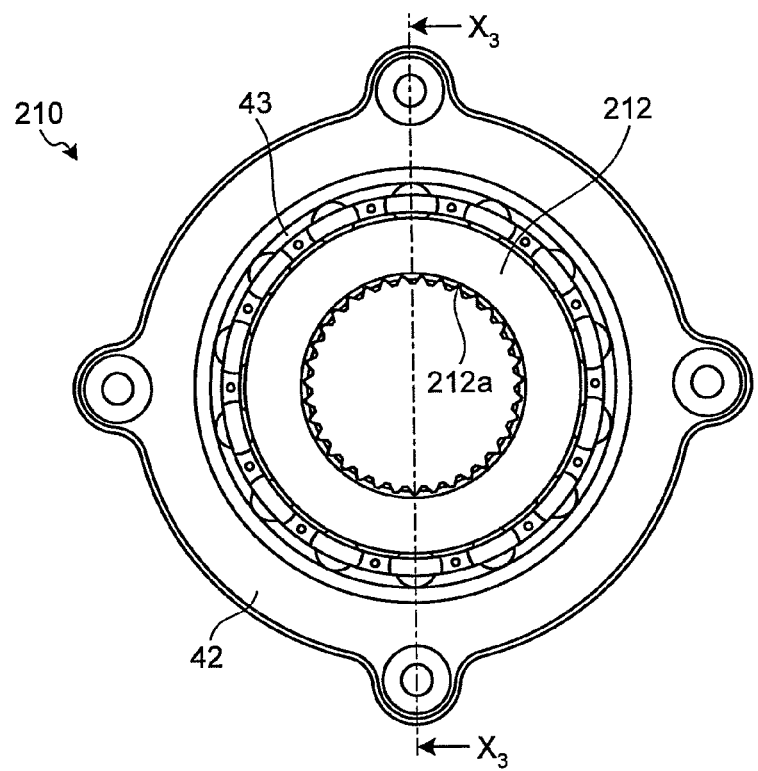
FIG. 55 is a diagram schematically illustrating an appearance of another clutch device.
Figure 56:
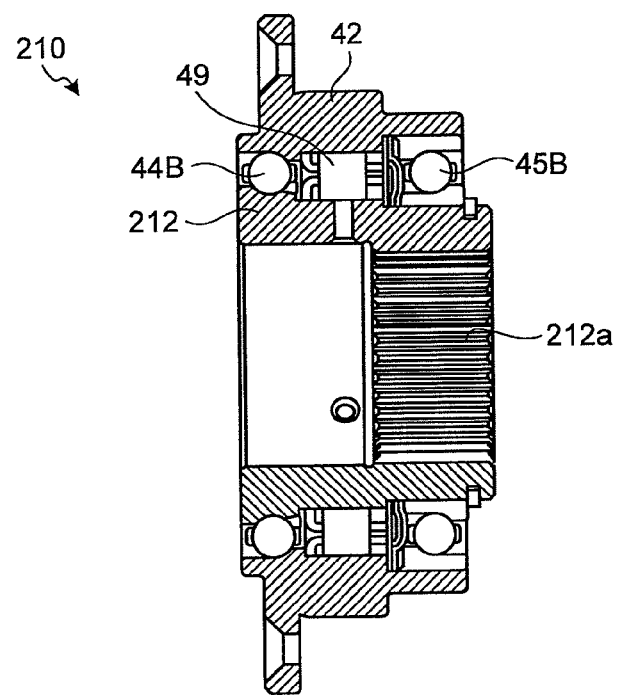
FIG. 56 is a cross-sectional view taken along the line $X_3$-$X_3$ of FIG. 55.

FIG. 55 is a diagram schematically illustrating an appearance of another clutch device. FIG. 56 is a cross-sectional view taken along the line X3-X3 of FIG. 55. A basic configuration of a clutch device 210 shown in FIGS. 55 and 56 is the same as that of the clutch device 40. Hereinafter, the characteristic point of the clutch device 210 will be described. In an inner race 212 of the clutch device 210, the inner peripheral surface thereof is provided with a serration 212a. The inner race 212 becomes a state where the inner race 212 and the sun gear shaft 14 integrally rotate in a manner such that the serration 212a engages with the serration formed in the sun gear shaft 14. That is, the rotational forces of the inner race 212 and the sun gear shaft 14 are transmitted from one side to the other side through the engaging serrations. In this manner, even when the serration is formed instead of the key groove, the above-described effect is obtained. When a recess is provided at the end of the serration in the case of providing the serration, it may be suppressed that the end of the serration exceeds a predetermined area when manufacturing.

Figure 57:
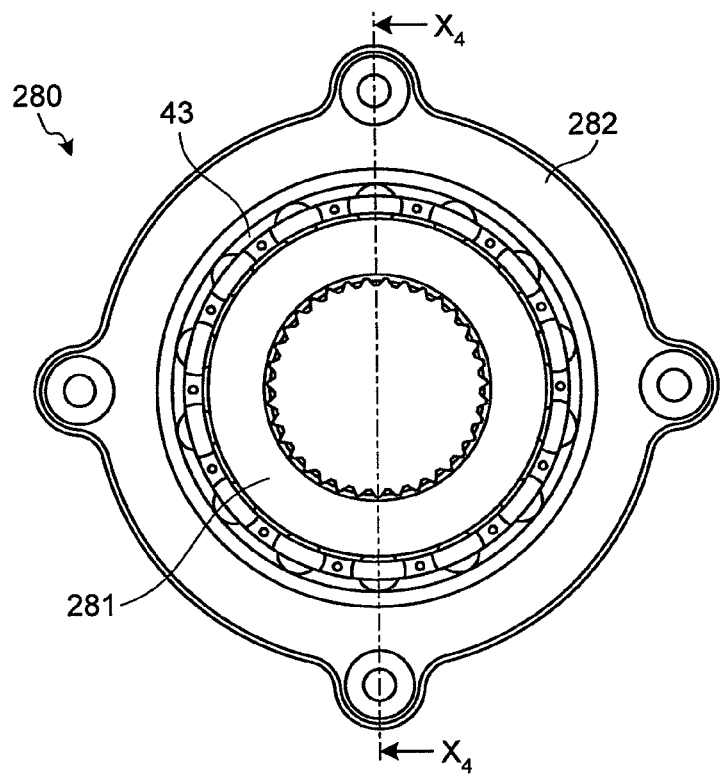
FIG. 57 is a diagram schematically illustrating an appearance of another clutch device.
Figure 58:
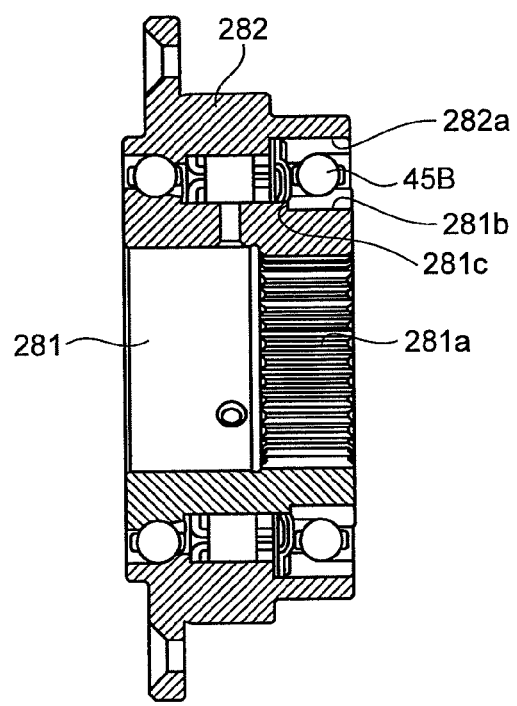
FIG. 58 is a cross-sectional view taken along the line $X_4$-$X_4$ of FIG. 57.

FIG. 57 is a diagram schematically illustrating an appearance of another clutch device. FIG. 58 is a cross-sectional view taken along the line $X_4$-$X_4$ of FIG. 57. Furthermore, a basic configuration of a clutch device 280 shown in FIGS. 57 and 58 is the same as that of the clutch device 210. Hereinafter, the characteristic point of the clutch device 280 will be described. In an inner race 281 of the clutch device 280, the inner peripheral surface thereof is provided with a serration 281a. The second bearing 45B of the clutch device 280 is fixed between the third surface 281b of the inner race 281 and the third surface 282a of the outer race 282 by press-inserting. The inner race 281 is provided with a step 281c for positioning the second bearing 45B. In this manner, since the second bearing 45B is fixed by press-inserting, the second bearing 45B may be fixed without using the retaining ring.

Further, in the electric vehicle driving device 60 shown in FIG. 11, the same configuration as that of the clutch device 40 is used as the clutch device 90, so that the same effect as that of the above-described embodiment may be obtained.

The desirable aspect of the ninth embodiment is understood as follows. In the ninth embodiment, it is desirable that the bearing mechanism be provided so as to be disposed between the outer peripheral surface of the first carrier and the inner peripheral surface of the second carrier, and to support the first carrier and the second carrier in a relatively rotatable manner. Accordingly, whirling may be suppressed from being generated between the rotor and the stator of the second motor, and power transmission may be appropriately carried out.

In the ninth embodiment, it is desirable that the first carrier and the second carrier be disposed at an overlapping position in the direction of the rotary axis. With the above-described configuration, the second motor and the second carrier may be disposed to close to each other, and the device may be decreased in size and weight.

The configuration of the ninth embodiment may be appropriately applied to the embodiments below. The same configuration as that of the embodiment has the same effect.

Tenth Embodiment

The clutch device 40 of the tenth embodiment will be described by using FIGS. 49 to 54. The clutch device 40 is a sprag type one-way clutch, and includes the first inner race 41, the first outer race 42, the clutch mechanism 49, the first bearing 44B, and the second bearing 45B.

The first inner race 41 has a cylindrical shape, where the radial inner surface (the inner peripheral surface) is connected to the first carrier 23, and the radial outer surface (the outer peripheral surface) is connected to the clutch mechanism 49, the first bearing 44B, and the second bearing 45B. The first outer race 42 is disposed outside the first inner race 41 in the radial direction. The first outer race 42 has a cylindrical shape, where the inner peripheral surface is connected to the clutch mechanism 49, the first bearing 44B, and the second bearing 45B. The first outer race 42 is fixed to the casing G. Furthermore, the clutch mechanism 49, the first bearing 44B, and the second bearing 45B are members capable of relatively rotating the inner peripheral surface and the outer peripheral surface, and the first inner race 41 and the first outer race 42 are disposed so as to be relatively rotatable.

The clutch mechanism 49 is a sprag type one-way clutch, and includes a transmission portion disposed between the first inner race 41 and the first outer race 42. The transmission portion includes a cam, a sprag, and the like. The clutch mechanism 49 is a mechanism in which the first inner race 41 and the second outer race 42 are relatively rotatable only in one direction. In the clutch mechanism 49, when a rotational force acts on the first inner race 41 in the first direction, the transmission portion meshes with the first inner race 41 and the first outer race 42. Accordingly, the rotational force is transmitted between the first inner race 41 and the first outer race 42. Accordingly, a force is transmitted between the first inner race 41 and the first outer race 42 through the clutch mechanism 49, so that the first carrier 23 receives a reaction force from the casing G. Therefore, the clutch mechanism 49 may regulate the rotation of the first carrier 23. Further, in the clutch mechanism 49, when a rotational force acts on the first inner race 41 in the second direction, the transmission portion does not mesh with the first inner race 41 and the first outer race 42. Accordingly, the rotational force is not transmitted between the first inner race 41 and the first outer race 42, so that the first carrier 23 does not receive a reaction force from the casing G. Therefore, the clutch mechanism 49 does not regulate the rotation of the first carrier 23. In this manner, the clutch mechanism 49 realizes a function as the one-way clutch device. In the clutch mechanism 49, the first inner race 41 is used as the first member, and the first outer race 42 is used as the second member. However, a second inner race may be provided between the first inner race 41 and the transmission portion, and a second outer race may be provided between the first outer race 42 and the transmission portion.

The clutch mechanism 49 may uses various mechanisms as the mechanism of the transmission portion, and the roller clutch device or the cam clutch device may be used. However, the capacity of the rotational force (torque) of the cam clutch device is larger than that of the roller clutch device. That is, in the cam clutch device, the magnitude of the force transmitted between the inner race 41 and the outer race 42 is larger than that of the roller clutch device. Therefore, the clutch device 40 may transmit the larger rotational force in the case of the cam clutch device.

The clutch mechanism 49 may be a clutch mechanism of a type in which a piston inside a cylinder is moved by a hydraulic fluid so as to allow two rotary members to engage with each other or an electromagnetic actuator is used to allow two rotary members to engage with each other instead of the one-way clutch device. However, such a clutch mechanism needs a mechanism for moving the piston or electric power for operating the electromagnetic actuator. On the other hand, when the clutch mechanism 49 is formed as the one-way clutch device, a mechanism for moving the piston is not needed and electric power for operating the electromagnetic actuator is not needed. When the clutch mechanism 49 is the one-way clutch device, the engagement state and the disengagement state may be switched by switching the direction of the rotational force acting on the first inner race 41 or the first outer race 42 (in the embodiment, the first inner race 41). Therefore, the clutch device 40 may decrease the number of components and decrease the size (of the clutch device 40) in the case of the one-way clutch device.

The first bearing 44B is a rolling ball bearing which is disposed in the wheel side in relation to the clutch mechanism 49, and supports the inner race 41 and the outer race 42 so as to be relatively rotatable. In the first bearing 44B, the first inner race 41 is the inner race of the first bearing 44B, and the first outer race 42 is the outer race of the first bearing 44B. That is, the inner race of the first bearing 44B and the first inner race 41 of the clutch device 40 are integrated with each other, and the outer race of the first bearing 44B and the first outer race 42 of the clutch device 40 are integrated with each other. The second bearing 45B is a rolling ball bearing which is disposed in the vehicle body side of the electric vehicle in relation to the clutch mechanism 49, and supports the inner race 41 and the outer race 42 so as to be relatively rotatable.

In this manner, in the clutch device 40, the first bearing 44B and the second bearing 45B are disposed at both sides of the clutch mechanism 49. That is, the clutch mechanism 49 is interposed between the first bearing 44B and the second bearing 45B. Accordingly, the clutch device 40 may receive the radial load, the axial load, and the like concerned with the clutch device 40 using the first bearing 44B and the second bearing 45B.

With the above-described configuration, the electric vehicle driving device 10 holds the wheel, and transmits the rotational force output from the first motor 11 and the second motor 12 to the wheel, so that the electric vehicle may run.

In the electric vehicle driving device 10, the protrusion 33a is provided at the second carrier 33 of the shift mechanism 13, and the protrusion 33a is disposed at the outer peripheral surface side of the first carrier 23 so as to be used as the first ring gear 24, that is, the functions of the second carrier 33 and the first ring gear 24 are realized by one member and the second motor 12 is disposed at the outer periphery side of the second carrier 33, so that the size of the shift mechanism 13 in the axial direction may be decreased, and the device may be decreased in size and weight. Since the rotor 12d of the second motor 12 is connected to the second carrier 33, a member for transmitting power output from the second motor 12 to the second carrier 33 may not be provided, and the device may be decreased in size and weight.

In the electric vehicle driving device 10, since the carrier bearing 52B is provided between the first carrier 23 and the second carrier 33, the first carrier 23 and the second carrier 33 may be suppressed from whirling with respect to the sun gear shaft 14. Accordingly, the rotor 12d of the second motor 12 fixed to the second carrier 33 may be appropriately supported with respect to the sun gear shaft 14, and the rotor 12d may be suppressed from whirling with respect to the sun gear shaft 14. Accordingly, the rotation precision of the stator 12a fixed to the casing G and the rotor 12d fixed to the second carrier 33 may be suppressed from being degraded, and the motor torque may be appropriately transmitted.

Even in the electric vehicle driving device 60, the first carrier 73 of the first planetary gear mechanism 70 disposed closer to the wheel is disposed at a position facing the second motor 12 (the motor which is not connected to the sun gear shaft), and the rotor of the second motor is fixed to the outer periphery of the first carrier by forming the first carrier 73 and the second ring gear 84 as an integrated member, so that the effect of decreasing the size and the weight of the device may be obtained in the same manner as above. In this manner, in the electric vehicle driving device, since the second motor 12 (the motor which is not connected to the sun gear shaft) is disposed at the outer peripheral surface of the carrier disposed in the wheel side regardless of the configuration of the shift mechanism, the same effect may be obtained.

The desirable aspect of the tenth embodiment is understood as follows. In the tenth embodiment, it is desirable that the bearing mechanism be provided so as to be disposed between the outer peripheral surface of the first carrier and the inner peripheral surface of the second carrier, and to support the first carrier and the second carrier in a relatively rotatable manner. Accordingly, whirling may be suppressed from being generated between the rotor and the stator of the second motor, and power transmission may be appropriately carried out.

In the tenth embodiment, it is desirable that the first carrier and the second carrier be disposed at an overlapping position in the direction of the rotary axis. With the above-described configuration, the second motor and the second carrier may be disposed to close to each other, and the device may be decreased in size and weight.

REFERENCE SIGNS LIST 10, 60, 100, 120, 130, 153, 170, 201: ELECTRIC VEHICLE DRIVING DEVICE
11, 203: FIRST MOTOR
12, 204: SECOND MOTOR
13, 205: SHIFT MECHANISM
20, 70: FIRST PLANETARY GEAR MECHANISM
21, 71: FIRST SUN GEAR
22, 72: FIRST PINION GEAR
23, 73: FIRST CARRIER
24, 74: FIRST RING GEAR
30, 80: SECOND PLANETARY GEAR MECHANISM
31, 81: SECOND SUN GEAR
32a, 82a: SECOND PINION GEAR
32b, 82b: THIRD PINION GEAR
33, 83: SECOND CARRIER
34, 84, 171: SECOND RING GEAR
35: INNER GEAR
40, 90, 210, 230, 280: CLUTCH DEVICE
41: INNER RACE
42: FIRST OUTER RACE
43: CAM
43S: SPRAG
46: CLUTCH SUPPORT PORTION
47: ELASTIC BODY
49, 253: CLUTCH MECHANISM
50a, 143, 261: OUTER RACE
50b: SECOND INNER RACE
50c: FIRST INNER RACE
51: STUD BOLT
59A: OUTER RETAINER
59B: INNER RETAINER
60a: FIRST ROLLING ELEMENT
60b: SECOND ROLLING ELEMENT
61: INNER RACE CONTACT SURFACE
61a: FIRST RETAINER
61b: SECOND RETAINER
62: OUTER RACE CONTACT SURFACE
63: SHIFT MECHANISM
63a: FIRST ORBIT
63b: SECOND ORBIT
63c: THIRD ORBIT
62d: FOURTH ORBIT
68: ATTACHMENT POINT
100G, 120G, 130G, 202: CASING
105: FIRST RESOLVER
109: SECOND RESOLVER
110: MAGNETIC SHIELD MEMBER
141: FIRST INNER RACE 142, 172: SECOND INNER RACE
144: ROLLING ELEMENT
145, 264: RETAINER
149: BRAKE DISK
151: SEAL PORTION
152, 160: SHIELD PORTION
202A: FIRST MOTOR CHAMBER
202B: SECOND MOTOR CHAMBER
251: FIRST GEAR MECHANISM
252: SECOND GEAR MECHANISM

The invention claimed is:

1. A wheel hub motor comprising:
a first motor;
a second motor;
a first sun gear connected to the first motor;
a first pinion gear that meshes with the first sun gear;
a first carrier that, rotatably and revolvably about the first sun gear, holds the first pinion gear;
a clutch device capable of regulating a rotation of the first carrier;
a first ring gear that meshes with the first pinion gear, the first ring gear being connected to the second motor;
a second sun gear connected to the first motor;
a second pinion gear that meshes with the second sun gear;
a third pinion gear that meshes with the second pinion gear;
a second carrier that, individually rotatably and revolvably about the second sun gear, holds the second pinion gear and the third pinion gear, the second carrier being connected to the first ring gear; and
a second ring gear that meshes with the third pinion gear, the second ring gear being connected to a wheel of an electric vehicle.

2. A wheel hub motor comprising:
a first motor;
a second motor;
a first sun gear connected to the first motor;
a first pinion gear that meshes with the first sun gear;
a first carrier that, rotatably and revolvably about the first sun gear, holds the first pinion gear;
a first ring gear that meshes with the first pinion gear, the first ring gear being connected to a wheel of an electric vehicle;
a second sun gear connected to the first motor;
a second pinion gear that meshes with the second sun gear;
a third pinion gear that meshes with the second pinion gear;
a second carrier that, individually rotatably and revolvably about the second sun gear, holds the second pinion gear and the third pinion gear;
a clutch device capable of regulating a rotation of the second carrier; and
a second ring gear that meshes with the third pinion gear, the second ring gear being connected to the first carrier, the second ring gear being connected to the second motor.

3. The wheel hub motor according to claim 1,
wherein the first motor and the second motor are assembled in a casing,
wherein the casing includes a first casing having a first motor insertion portion for positioning the first motor and a second motor insertion portion for positioning the second motor, and includes a second casing and a third casing attached to the first casing, the first motor insertion portion and the second motor insertion portion being separated from each other,
wherein a stator core of the first motor is inserted into the first motor insertion portion so as to be positioned, and is held in a pressed state by the second casing, and
wherein a stator core of the second motor is inserted into the second motor insertion portion so as to be positioned, and is held in a pressed state by the third casing.

4. The wheel hub motor according to claim 1, further comprising:
an outer race fixed to a casing where the first motor and the second motor are assembled, and including a first orbit and a second orbit formed in a circumferential direction in an inner peripheral surface;
a plurality of first rolling elements that roll on the first orbit;
a plurality of second rolling elements that roll on the second orbit;
a first retainer that supports the first rolling elements;
a second retainer that supports the second rolling elements;
a first inner race that includes a third orbit formed in a circumferential direction in an outer peripheral surface of the first inner race and an inner gear formed in an inner peripheral surface of the first inner race, the first rolling elements rolling on the third orbit;
a wheel support portion formed at an end of the first inner race, and provided with a plurality of attachment points for attaching the wheel; and
a second inner race that includes a forth orbit formed in a circumferential direction in an outer peripheral surface of the second inner race, an inner peripheral surface of the second inner race contacting the outer peripheral surface of the first inner race, the second rolling elements rolling on the forth orbit.

5. The wheel hub motor according to claim 1,
wherein the clutch device includes:
a first member,
a second member rotatable relative to the first member, and
a plurality of sprags that transmit a rotational force between the first member and the second member when a rotational force in a first direction acts on the second member and do not transmit a rotational force between the first member and the second member when a rotational force in a second direction opposite to the first direction acts on the second member, the clutch device being capable of regulating the rotation of the first carrier, and
wherein the first direction is a direction in which the second member rotates when the first motor outputs a rotational force so as to advance the electric vehicle and the second motor does not operate.

6. The wheel hub motor according to claim 2,
wherein the clutch device includes:
a first member,
a second member rotatable relative to the first member, and
a plurality of sprags that transmit a rotational force between the first member and the second member when a rotational force in a first direction acts on the second member and do not transmit a rotational force between the first member and the second member when a rotational force in a second direction opposite to the first direction acts on the second member, the clutch device being capable of regulating the rotation of the second carrier, and
wherein the first direction is a direction in which the second member rotates when the first motor outputs a rotational force so as to advance the electric vehicle and the second motor does not operate.

7. The wheel hub motor according to claim 1,
wherein each of the first motor and the second motor includes:
a rotor core,
a motor stator disposed outside the rotor core in a radial direction,
a rotor disk disposed inside the rotor core in the radial direction so as to support the rotor, and
a resolver having a resolver rotor fixed to the rotor disk and a resolver stator disposed facing the resolver rotor, and
wherein the rotor core is a magnetic body, and the rotor disk is a non-magnetic body.

8. The wheel hub motor according to claim 7,
wherein at least one of the first motor and the second motor further includes a plate member magnetically shielding the resolver from the rotor core and the motor stator, the plate member being composed of a magnetic body and disposed at a position where an end of the plate member magnetically communicates with the motor stator.

9. The wheel hub motor according to claim 7, further comprising:
a spacer composed of a non-magnetic body, and contacting the resolver stator; and
a resolver stator fixing portion that fixes the resolver stator through the spacer.

10. The wheel hub motor according to claim 1, further comprising:
a first bearing inner race of a cylinder shape;
a second bearing inner race disposed inside the first bearing inner race in a radial direction, and rotating integral with the second ring gear and coaxially with the second ring gear;
a bearing outer race that surrounds an outside in the radial direction of the first bearing inner race and the second bearing inner race;
a plurality of rolling elements disposed between the first bearing inner race and the bearing outer race, and between the second bearing inner race and the bearing outer race;
a seal portion disposed facing a brake disk of the electric vehicle so as to close a gap between the second bearing inner race and the bearing outer race; and
a first shield portion disposed between the seal portion and the brake disk so as to cover the seal portion and an end portion of the bearing outer race in a side of the brake disk.

11. The wheel hub motor according to claim 2, further comprising:
a first bearing inner race of a cylinder shape;
a second bearing inner race disposed inside the first bearing inner race in the radial direction, and rotating integrally with the first ring gear and coaxially with the first ring gear;
a bearing outer race that surrounds an outside in the radial direction of the first bearing inner race and the second bearing inner race;
a plurality of rolling elements disposed between the first bearing inner race and the bearing outer race, and between the second bearing inner race and the bearing outer race;
a seal portion disposed facing a brake disk of the electric vehicle so as to close a gap between the second bearing inner race and the bearing outer race; and
a first shield portion disposed between the seal portion and the brake disk so as to cover the seal portion and an end of the bearing outer race in a side of the brake disk.

12. The wheel hub motor according to claim 1,
wherein a plurality of protrusions are provided in an outer periphery of the second ring gear at an equal interval in a circumferential direction, and
wherein the wheel hub motor further comprises:
an inner race that includes a cylindrical portion of a cylinder shape and a wheel attachment portion closing one opening of the cylindrical portion, concave portions extending in an axial direction and convex portions extending in the axial direction and an annular concave portion of an annular shape in the circumferential direction being formed in an inner periphery of the cylindrical portion, respectively, the concave portions being as many as the protrusions, the convex portions being as many as the protrusions, the annular concave portion being continuous to the concave portions, center angles of the concave portions being equal to each other when a circumferential length of each of the concave portions is set to an arc and an axis thereof is set to a center, center angles of the convex portions being equal to each other when a circumferential length of each of the convex portions is set to an arc and an axis thereof is set to a center, the center angles of the concave portions when the circumferential length of the concave portion is set to the arc and the axial is set to the center and the center angles of the convex portions when the circumferential length of the convex portion is set to the arc and the axial is set to the center are equal to each other, the circumferential length of the concave portion being larger than the circumferential length of the protrusion; and
a key member formed in a curved plate shape corresponding to a bottom surface of the concave portion, and inserted into each of the concave portions so as to disable a rotation of the second ring gear relative to the inner race, after the protrusions are inserted up to a position of the annular concave portion into the concave portions and the second ring gear is rotated so that the protrusions are fitted to the annular concave portion.

13. The wheel hub motor according to claim 2,
wherein a plurality of protrusions are provided in an outer periphery of the first ring gear at an equal interval in a circumferential direction, and
wherein the wheel hub motor further comprises:
an inner race that includes a cylindrical portion of a cylinder shape and a wheel attachment portion closing one opening of the cylindrical portion, concave portions extending in an axial direction and convex portions extending in the axial direction and an annular concave portion of an annular shape in the circumferential direction being formed in an inner periphery of the cylindrical portion, respectively, the concave portions being as many as the protrusions, the convex portions being as many as the protrusions, the annular concave portion being continuous to the concave portions, center angles of the concave portions being equal to each other when a circumferential length of each of the concave portions is set to an arc and an axis thereof is set to a center, center angles of the convex portions being equal to each other when a circumferential length of each of the convex portions is set to an arc and an axis thereof is set to a center, the center angles of the concave portions when the circumferential length of the concave portion is set to the arc and the axial is set to the center and the center angles of the convex portions when the circumferential length of the convex portion is set to the arc and the axial is set to the center are equal to each other, the circumferential length of the concave portion being larger than the circumferential length of the protrusion; and a key member formed in a curved plate shape corresponding to a bottom surface of the concave portion, and inserted into each of the concave portions so as to disable a rotation of the first ring gear relative to the inner race, after the protrusions are inserted up to a position of the annular concave portion into the concave portions and the first ring gear is rotated so that the protrusions are fitted to the annular concave portion.

14. The wheel hub motor according to claim 1,
wherein the clutch device includes:
   a first member,
   a second member disposed facing an inner peripheral surface of the first member, rotatably relative to the first member,
   a transmission portion that transmits a rotational force between the first member and the second member when a rotational force in a first direction acts on the second member, and that does not transmit a rotational force between the first member and the second member when a rotational force in a second direction opposite to the first direction acts on the second member,
   a first bearing portion disposed at a side of the first motor of the transmission portion, and rotatably supporting the first member and the second member, and
   a second bearing portion disposed at a side opposite to the first bearing portion of the transmission portion, and rotatably supporting the first member and the second member, the clutch device being capable of regulating the rotation of the first carrier, and
wherein the first direction is a direction in which the second member rotates when the first motor outputs a rotational force so as to advance the electric vehicle and the second motor does not operate.

15. The wheel hub motor according to claim 2,
wherein the clutch device includes:
   a first member,
   a second member disposed facing an inner peripheral surface of the first member, rotatably relative to the first member,
   a transmission portion that transmits a rotational force between the first member and the second member when a rotational force in a first direction acts on the second member, and that does not transmit a rotational force between the first member and the second member when a rotational force in a second direction opposite to the first direction acts on the second member,
   a first bearing portion disposed at a side of the first motor of the transmission portion, and rotatably supporting the first member and the second member, and
   a second bearing portion disposed at a side opposite to the first bearing portion of the transmission portion, and rotatably supporting the first member and the second member, the clutch device being capable of regulating the rotation of the second carrier, and
wherein the first direction is a direction in which the second member rotates when the first motor outputs a rotational force so as to advance the electric vehicle and the second motor does not operate.

16. The wheel hub motor according to claim 1,
wherein the clutch device is capable of regulating the rotation of the first carrier, and
wherein the second carrier is integrally formed with the first ring gear, a rotor of the second motor being fixed to an outer peripheral surface of the second carrier.

17. The wheel hub motor according to claim 2,
wherein the clutch device is capable of regulating the rotation of the second carrier, and
wherein the first carrier is integrally formed with the second ring gear, a rotor of the second motor being fixed to an outer peripheral surface of the first carrier.

18. The wheel hub motor according to claim 2,
wherein the first motor and the second motor are assembled in a casing,
wherein the casing includes a first casing having a first motor insertion portion for positioning the first motor and a second motor insertion portion for positioning the second motor, and includes a second casing and a third casing attached to the first casing, the first motor insertion portion and the second motor insertion portion being separated from each other,
wherein a stator core of the first motor is inserted into the first motor insertion portion so as to be positioned, and is held in a pressed state by the second casing, and
wherein a stator core of the second motor is inserted into the second motor insertion portion so as to be positioned, and is held in a pressed state by the third casing.

19. The wheel hub motor according to claim 2, further comprising:
   an outer race fixed to a casing where the first motor and the second motor are assembled, and including a first orbit and a second orbit formed in a circumferential direction in an inner peripheral surface;
   a plurality of first rolling elements that roll on the first orbit;
   a plurality of second rolling elements that roll on the second orbit;
   a first retainer that supports the first rolling elements;
   a second retainer that supports the second rolling elements;
   a first inner race that includes a third orbit formed in a circumferential direction in an outer peripheral surface of the first inner race and an inner gear formed in an inner peripheral surface of the first inner race, the first rolling elements rolling on the third orbit;
   a wheel support portion formed at an end of the first inner race, and provided with a plurality of attachment points for attaching the wheel; and
   a second inner race that includes a forth orbit formed in a circumferential direction in an outer peripheral surface of the second inner race, an inner peripheral surface of the second inner race contacting the outer peripheral surface of the first inner race, the second rolling elements rolling on the forth orbit.

20. The wheel hub motor according to claim 2,
wherein each of the first motor and the second motor includes:
   a rotor core,
   a motor stator disposed outside the rotor core in a radial direction,
   a rotor disk disposed inside the rotor core in the radial direction so as to support the rotor, and
   a resolver having a resolver rotor fixed to the rotor disk and a resolver stator disposed facing the resolver rotor, and
wherein the rotor core is a magnetic body, and the rotor disk is a non-magnetic body.

21. The wheel hub motor according to claim 20,
wherein at least one of the first motor and the second motor further includes a plate member magnetically shielding the resolver from the rotor core and the motor stator, the plate member being composed of a magnetic body and disposed at a position where an end of the plate member magnetically communicates with the motor stator.

22. The wheel hub motor according to claim 20, further comprising:
a spacer composed of a non-magnetic body, and contacting the resolver stator; and
a resolver stator fixing portion that fixes the resolver stator through the spacer.

* * * * *